United States Patent
Schlueter et al.

(10) Patent No.: US 8,024,076 B2
(45) Date of Patent: Sep. 20, 2011

(54) VOLTAGE COLLAPSE DIAGNOSTIC AND ATC SYSTEM

(75) Inventors: Robert Schlueter, Holt, MI (US); Benjamin Ashton Minshall, Mason, MI (US); Ryan Joseph Hunt, East Lansing, MI (US)

(73) Assignee: Intelilcon, Inc., Holt, MI (US)

( * ) Notice: Subject to any disclaimer, the term of this patent is extended or adjusted under 35 U.S.C. 154(b) by 1603 days.

(21) Appl. No.: 11/247,388

(22) Filed: Oct. 11, 2005

(65) Prior Publication Data

US 2006/0030972 A1 Feb. 9, 2006

Related U.S. Application Data

(63) Continuation-in-part of application No. 10/879,236, filed on Jun. 28, 2004, now Pat. No. 7,194,338.

(60) Provisional application No. 60/483,244, filed on Jun. 27, 2003.

(51) Int. Cl.
*G05D 5/00* (2006.01)

(52) U.S. Cl. ........ 700/286; 700/292; 700/295; 702/182; 703/18

(58) Field of Classification Search .................. 700/286, 700/292, 293, 295; 702/182; 703/18
See application file for complete search history.

(56) References Cited

U.S. PATENT DOCUMENTS

| | | | |
|---|---|---|---|
| 5,594,659 A | 1/1997 | Schlueter | |
| 5,610,834 A | 3/1997 | Schlueter | |
| 5,642,000 A * | 6/1997 | Jean-Jumeau et al. | 307/31 |
| 5,745,368 A | 4/1998 | Ejebe et al. | |
| 5,796,628 A | 8/1998 | Chiang et al. | |
| 6,249,719 B1 * | 6/2001 | Vu et al. | 700/292 |
| 6,496,757 B1 | 12/2002 | Flueck et al. | |
| 6,625,520 B1 | 9/2003 | Chen et al. | |
| 7,398,194 B2 * | 7/2008 | Evans et al. | 703/18 |
| 7,519,506 B2 * | 4/2009 | Trias | 702/182 |
| 7,603,203 B2 * | 10/2009 | Zhang et al. | 700/295 |
| 2004/0158417 A1 | 8/2004 | Bonet | |
| 2005/0033480 A1 | 2/2005 | Schlueter et al. | |

OTHER PUBLICATIONS

A.S. Quintela and C.A. Castro, "Improved Branch-based Voltage Stability Proximity Indices Part II: Application in Security Analysis", Proceedings of the 2002 Large Engineering Systems Conference on Power Engineering, 2002, pp. 115-119 (IEEE).

(Continued)

*Primary Examiner* — Albert Decady
*Assistant Examiner* — Douglas S Lee
(74) *Attorney, Agent, or Firm* — Young & Basile, P.C.

(57) ABSTRACT

A plurality of buses of an electrical power system are grouped into agents, family lines of agents and families of agents based on the reactive reserves depleted when the buses are loaded. Contingencies are applied and the reactive reserves are monitored to determine an exhaustion factor for one or more family lines in one or more families. A boundary case solution exists for each outage that has no solution when the outage is removed in small steps and an additional step has no solution and is used to assess where, why, and how the contingency causes voltage instability, voltage collapse and local blackout. Based on this information, the voltage rescheduling, active rescheduling, unit commitment and load shedding is determined that can be used as preventive, corrective or emergency controls in system design and planning, operation planning, reactive and voltage management, real time control, and Special Protection System Control.

82 Claims, 22 Drawing Sheets

OTHER PUBLICATIONS

S. Liu and R. A. Schlueter, "Structure of an Improved Intelligent Control for a Power System in a Deregulated Environment", Proceedings of the 1996 IEEE Int'l Conference on Control Applications, Dearborn, MI, Sep. 15-18, 1996, pp. 456-461 (IEEE).

I. Musirin and T.K.A. Rahman, "On-Line Voltage Stability Based Contingency Ranking Using Fast Voltage Stability Index (FVSI)", 2002, pp. 1118-1123 (IEEE).

H. Li and Y.H. Song, "Identification of Weak Busbars in Large Scale Power System", 2002, pp. 1700-1704 (IEEE).

X. Xu, et al., "Assessment of Voltage Stability and Real and Reactive Margins Using Advanced Analytical Tools," 2002, pp. 2047-2051 (IEEE).

M.M. Othman, et al., "Available Transfer Capability Assessment of the Malaysian Power System", 2002 Student Conference on Research and Development Proceedings, Shah Alam, Malaysia, 2002, pp. 184-187 (IEEE).

Y. Ou and C. Singh, "Calculation of risk and statistical indices associated with available transfer capability", IEE Proc.-Gener. Transm. Distrib., vol. 150, No. 2, Feb. 6, 2003, pp. 239-244 (IEE).

Y. Chan, et al., "Optimal Strategy to Split Firm and Recallable Available Transfer Capability in the Deregulated Environment", 2002, pp. 881-885 (IEEE).

R.A. Schlueter, "Summary of Work Performed on Investigation of Voltage Problems and their Solution on the Detroit Edison System", approx. 1987.

J. Dorsey and R.A. Schlueter, "Global and Local Dynamic Equivalents Based on Structural Archetypes for Coherency", IEEE Trans. on Power App. & Sys., vol. PAS-102, Jun. 1983, pp. 1793-1801 (IEEE).

T.T. Lie and R.A. Schlueter, "Strong Local Observability and Controllability of Power Systems", IEEE Trans. on Power Systems, 1992 (IEEE).

R.A. Schlueter, "Unification and Classification of Algebraic Tests for Loss of Voltage Stability", Elec. Mach. & Power Sys., Sep.-Oct. 1993, vol. 21, No. 5, pp. 557-590.

T. Lie, et al., "Method of Identifying Weak Transmission Network Stability Boundaries", IEEE Trans. of Power Systems, vol. 8, No. 1, 1992, pp. 293-301 (IEEE).

T. Guo and R.A. Schlueter, "Identification of Generic Bifurcation and Stability Problems in Power System Differential-Algebraic Model", 93 SM 513-2 PWRS, IEEE Trans. on Power Sys., vol. 9, No. 2, 1993, pp. 1032-1044 (IEEE).

M.G. Lauby, et al., "Contingency Selection of Branch Outages Causing Voltage Problems", 83 SM 340-7, 1983 (IEEE).

R.A. Schlueter, et al., "Preventive and corrective open access system dispatch based on the voltage stability security assessment and diagnosis", Electric Power Systems Research 60 (2001), pp. 17-28.

R.A. Schlueter, et al., "Reactive Supply Voltage Stability on EHV Transmission Networks", Proc. of WVU/EPRI Work. on High Volt. Tra. in the Mid-Atl. Reg., EPRI Rep., Aug. 1990, pp. 1990-2010.

R.A. Schlueter and I. Hu, "Types of voltage instability and the associated modeling for transient/mid-term stability simulation", Electric Power Systems Research 29 (1994), pp. 131-145.

R.A. Schlueter, et al., "Contingency Selection", Feb. 1991.

D.E. Bradley, "VAR Reserves and Requirements", 1987 (IEEE).

J.F. Christensen, et al., "Planning against voltage collapse", Electra No. 111, 1987, pp. 55-75.

R.A. Schlueter, et al., Voltage Stability and Security Assessment, EPRI Report, EL-5967, RP-1999-8, Aug. 1988 (attached in three parts).

C. Aumiller and T.K. Saha, "Analysis and Assessment of Large Scale Power System Voltage Stability by a Novel Sensitivity Based Method", 2002, pp. 1621-1626 (IEEE).

* cited by examiner

VOLTAGE COLLAPSE DIAGNOSTIC AND ATC SYSTEM

RELATED APPLICATIONS

This application is a continuation-in-part of U.S. application Ser. No. 10/879,236, filed Jun. 28, 2004, which claims the benefit of U.S. provisional application Ser. No. 60/483,244, filed Jun. 27, 2003.

TECHNICAL FIELD

This invention relates generally to system design and planning, scheduling operation, real time control, and protection of electrical power systems, and more particularly, this invention relates to methods for predicting actual or imminent electrical power system failure due to voltage collapse, local blackout, or voltage instability.

BACKGROUND

A number of problems can arise when outages occur within an electrical power system. One kind of problem, called voltage collapse, is a cascading loss of stability. The loss of stability typically originates in one or more subsystems of the electrical power system (caused by an equipment outage or increased load), which in turn overloads additional power system components. Voltage collapse can also be caused by an equipment outage due to relaying actions, failure of equipment, or failure of control. Typically, voltage collapse leads to a blackout or brownout where customers are no longer provided with the power they desire. Another type of voltage problem, called loss of voltage stability, is the inability of the generation, transmission, and distribution system to supply enough power to satisfy customer demand after a disturbance, increased load, or a change in operating conditions without an uncontrollable and progressive decrease in voltage. The source of these instability problems is within and between components in the electrical power system that delivers electrical power to customers. A third problem, called local blackout, occurs when the power network is pushed to its physical limits. This phenomenon can be caused by numerous factors, some of which are 1) exhaustion or depletion of reactive supply in the voltage control or reactive supply devices serving the local region or 2) outages of equipment or 3) increased power flow into or within a local region.

In an attempt to prevent voltage instability, methods have been developed that are directed toward identifying and rectifying weaknesses in the electrical power system before those weaknesses result in voltage instability. One such method is disclosed in U.S. Pat. No. 5,594,659 ('659 patent) entitled Method for Performing a Voltage Stability Security Assessment for a Power Transmission System.

While the '659 patent does provide a method directed toward identifying weak subsystems that evidence coherent behavior for the electrical power system, some drawbacks exist in its disclosed methods. Specifically, the '659 methods are intended to solely assess proximity to voltage instability in a coherent subsystem of a high voltage portion (i.e. transmission level) of a power network. The proximity measures developed in the '659 patent are not intended to assess the vulnerability to voltage collapse or local blackout; or more importantly, to determine when the network has experienced voltage collapse and local blackout. The '659 patent does not address the structure within the transmission, sub-transmission and distribution networks responsible for producing sequential exhaustion of reactive reserves, sequential instability, voltage collapse, local blackout or inability to obtain a loadflow solution. The '659 patent does not teach a "divide and conquer" method of finding contingencies that cause sequential exhaustion of reactive reserves, cascading instability, voltage collapse, local blackout or that have no loadflow solution. The present invention was developed in light of these and other drawbacks. In a preferred embodiment of the present invention, the Voltage Collapse Diagnostic, Preventive, Corrective and Emergency Control, and Available Transfer Capability is described. The present invention defines the structure responsible for producing sequential exhaustion of reserves, sequential instability, voltage collapse, local blackout or conditions that give rise to no loadflow solution.

SUMMARY

The present invention provides a method for analyzing an electrical power system whereby a plurality of buses are grouped into agents, family lines of agents, and families of agents based on reactive reserves depleted when the buses are loaded to a predetermined state. Simulated single contingencies are then applied to the electrical power system and the reactive reserves are monitored and an exhaustion factor is determined for each set of one or more agents. The present invention, in one aspect, seeks single outages (bus-branch or breaker-node) that have no solution and then single outages that in combination produce double outages that have no loadflow solution. In an embodiment, the present invention finds loadflow solutions by removing the equipment associated with the outage in small steps and finds outages that have solution but are close to voltage collapse or local blackout. The process of removing equipment in small steps rather than removing it in one large step is to find the family lines of agents in one or more families that could experience voltage collapse, or local blackout and the Predicted Control Region that is composed of those agents that are impacted by an outage.

Based on this information, preventive (before the outage occurs), corrective (actions that arrest the blackout without disconnection of equipment or load) and emergency controls (actions that arrest the blackout and include disconnection of equipment or load) are developed to obtain solutions to the load flow equations that attempt to track and ameliorate the sequential impacts on family lines of agents and the agents in a Predicted Control Region. Other preventive, corrective and emergency control measures set forth herein are effective for reversing the sequential impacts or terminate the sequential impact within family lines and the Predicted Control Region. These controls include unit commitment, voltage rescheduling and/or active power rescheduling of generators in the Predicted Control Region and/or load shedding (Emergency Control) on buses in load bearing agents (load pockets) in the Predicted Control Region.

The present invention provides Available Transfer Capability, which is an active power constraint that indicates when the electrical power system has too much power being imported into a load bearing agent or the control region used to arrest blackouts after single and double outages. The present invention also provides Voltage Collapse Diagnostic and Preventive Control, which indicates the single and single outage components of double outages that could cause blackout for any control region, the control region agents where Preventive Control may be preventing the blackouts for these outages, and the maximum amount of power that can be imported into the control region without causing blackout for any of the single equipment outages. All of the above including the control region, the outages, and how power can be imported to improve or reduce reliability in the control region can be obtained from the Voltage Collapse Diagnostic and Preventive Control. If Total Transfer Capability is less than the power imported into the control region plus two reliability margins, then load must be reduced via preventive load shedding or a combination of Preventive Voltage Rescheduling, Preventive Active Rescheduling and Preventive Load Shedding Controls. The Available Transfer Capability can be used to produce or modify Unit Commitment, Active Power Scheduling, Voltage and Reactive Scheduling, Real Time Control, Under Voltage or Special Protection System Control to prevent or arrest voltage collapse, local blackout, or voltage instability.

DETAILED DESCRIPTION

Figure 1:
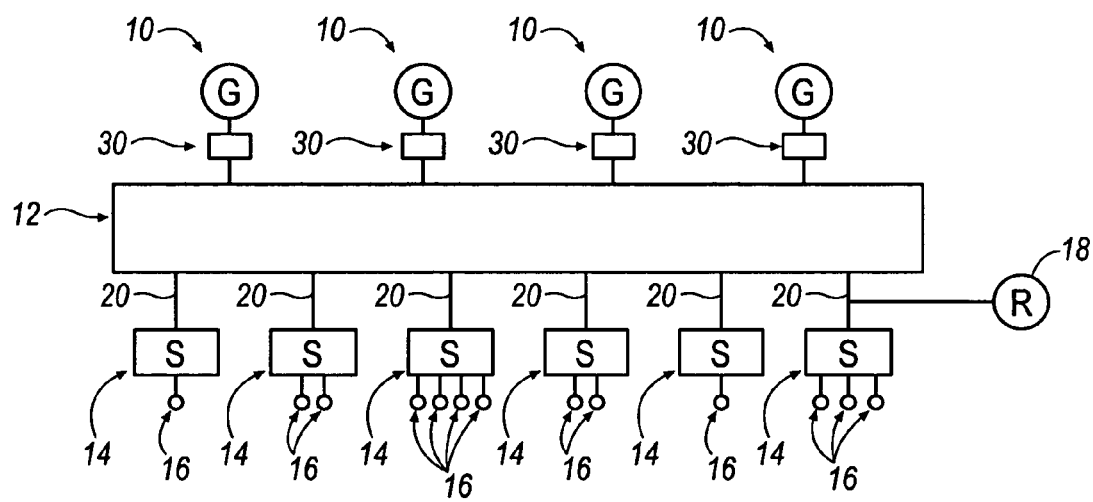
FIG. 1 is a schematic view of electrical power system according to an aspect of the present invention.

Referring now to FIG. 1, a schematic view of a conventional electrical power system is shown and described. The electrical power system shown in FIG. 1 generally includes generators 10, transmission system 12, substations 14 and 30, and load centers 16. It should be understood that the electrical power system shown in FIG. 1 is a non-limiting example, and that the present invention may be applied to numerous different configurations from that shown in FIG. 1.

The generators 10 can be any known electrical generation source such as coal, nuclear, gas or other types of generators. The generators 10 transmit generated electrical power to substations 30, which in turn step up the voltage of the transmitted electrical power to a voltage sufficient for transporting power across the transmission system 12.

The transmission system 12 is a network of high voltage electrical wires designed to transmit the electrical power from generators 10 across great distances to substations 14. The substations 14 represent connections to the sub-transmission or distribution network, the sub-transmission network, and the distribution network. The sub-transmission and distribution network include substations for connecting buses at different voltage levels and provide paths for power to flow to customers in the load centers 16 of the distribution and sub-transmission networks. The load centers 16 represent end users of electrical power, such as homes, factories, businesses or the like. It should be noted that many different configurations may be used to step electrical power up or down, such as multiple substations, or to transport electrical power across the transmission system 12. Additionally, as mentioned above, many different configurations of the electrical power system from that described herein may be employed in conjunction with the present invention, and the example shown in FIG. 1 is provided merely for purposes of clarity and illustration.

Figure 2:
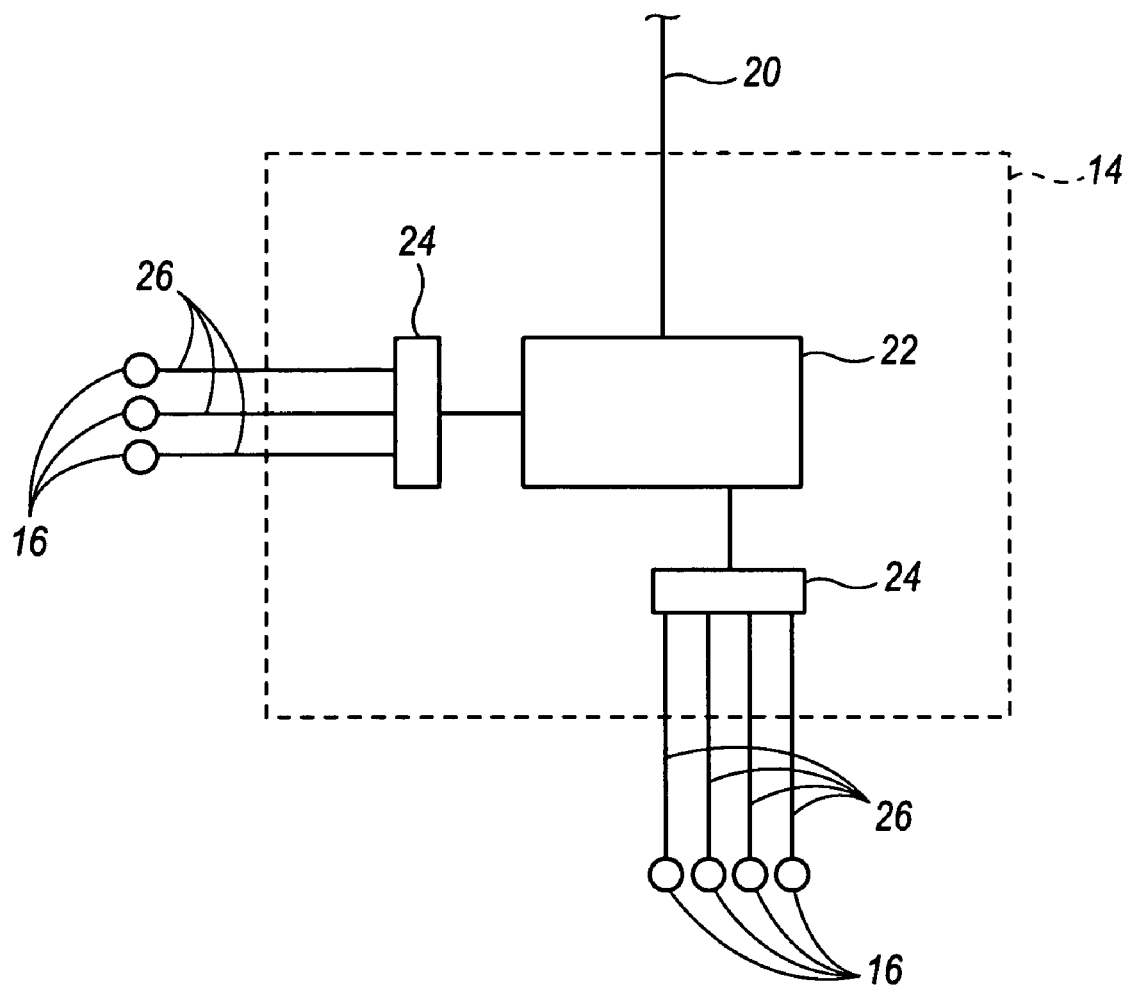
FIG. 2 is a schematic view of a portion of an electrical power system according to an aspect of the present invention.

The transmission system 12, substations 14 and every other component between the load centers 16 and the generators 10 include a plurality of buses that provide electrical connection between various components of the electrical power system. By way of a non-limiting example, as shown in FIG. 2, buses 24 are shown as providing an electrical connection between power lines 20 coming from the transmission system 12, sub-transmission system, and/or distribution system to power lines 26 that distribute power through transmission, sub-transmission, and local distribution networks at the same or lower voltage. Specifically, power lines 20 supply higher voltage electricity into substation 14, which is stepped down to a lower voltage by transformer 22. Buses 24 provide a connection for the electrical power to be distributed on a distribution network represented by power lines 26. It should be understood that FIG. 2 is one non-limiting example of the usage of buses in the electrical power system, and that buses are used at numerous locations throughout an electrical power system for distribution of electrical power. For example, buses may be located at the generators 10 themselves, at different points along the transmission system 12, at the substations 14 and 16 and at every other part of the electrical power system. Accordingly, for purposes of this application, the term buses are used in conjunction with a connector that connects one electrical component with another for the purpose of transporting electrical power.

Reactive reserves are positioned at different points along the electrical power system. By way of a non-limiting example, reserves 18 are shown in FIG. 1 as being connected between substation 14 and transmission system 12. The reserves 18 may be a bank of capacitors, generator or other known power source or voltage control/reactive supply device. The reserves 18 provide an additional power source to assist the electric power system during times of unusually high or low power usage. In addition to the reserves 18, it should be understood that any one of or a combination of generators 10 may serve as a reactive supply device. Specifically, scheduling of increased output of any of the generators 10 may be used to provide additional active and reactive power into electrical power system in particularly stressed parts of the system.

The present invention is based, in part, on the idea that voltage collapse, local blackout or instability is a function of the impact of contingencies on lower voltage levels, such as within the sub-transmission system, distribution network, or near load centers. The present invention also recognizes that voltage collapse, local blackout or instability is caused not only by catastrophic outages but is often the result of combined minor fluctuations of geographically widespread reactive reserves and generators that combine to cause cascading exhaustion of reactive supply and possible voltage instability of agents (will be discussed in more detail) due to outages. Often, generators are scheduled to be connected and to produce reactive power via voltage schedules and active power at certain levels over a set of agents in one or more family lines that either have very little or no reactive supply capability or are inadvertently scheduled (voltage, reactive and active power schedules) to have very little or no reactive reserves. This can make the system vulnerable to cascading instability that can be catastrophic. Most outages that have no loadflow solution and cause voltage instability, voltage collapse or local blackout can cause exhaustion of reactive reserves in agents, causing instability of the agents. Or, outages that interrupt flow of reactive power to, within, or between agents in family lines cause voltage instability, voltage collapse or local blackout by limiting access to generators or voltage control reactive supply devices or causing reactive losses that consume the reactive supply from these voltage control/reactive supply devices. In combination with these above-described factors, the scheduling of units that are in service, voltage set-point schedules on voltage control/reactive supply devices, active power schedules on generators, load patterns, and flows of active and reactive power can result in voltage instability, voltage collapse, or local blackout.

This voltage instability, voltage collapse or local blackout is addressed by a divide and conquer method as set forth in the present invention of selecting double outages that affect one or several different family lines of agents in one or more families. This is accomplished by initiating a sequential or cascading exhaustion of reactive supply in agents of these specific family lines in one or more families that synergistically cause voltage collapse or local blackout that is far worse than the sum of the effects of either outage of the double outage. In one aspect, each of the outages individually often do not significantly reduce the reactive reserves of the same agents, agents in the same family line, or even agents and family lines in the same families. Thus, the resulting combination may cause unanticipated and extremely significant exhaustion of reactive reserves in more than one family line of agents in more than one family. The vulnerability of the system to a particular double outage is a combination of the selection of single outages that produce large reactive losses in agents compared to the reactive reserves available in those agents by design or by scheduling of units, voltage and reactive power, active power, etc.

Accordingly, the present invention provides a method of identifying specific regions within the electrical power system that are particularly vulnerable to electrical outages and that may cause cascading exhaustion of reactive supply outages. In one embodiment, this method applies specific simulations of electrical outages to a model of an electrical power system under examination. The method according to the present invention groups buses and generators within the model into specific groupings called "agents" and then tests the effect of simulated outages (called contingencies) on these agents. The resulting effects on the agents are then assessed according to severity before and after simulated outages. From this information, system weaknesses can be determined and proposals as to load shedding, active power rescheduling or voltage rescheduling can be made to operators of the electrical power system to prevent possible electrical outages, local blackout, or voltage instability.

Figure 3:
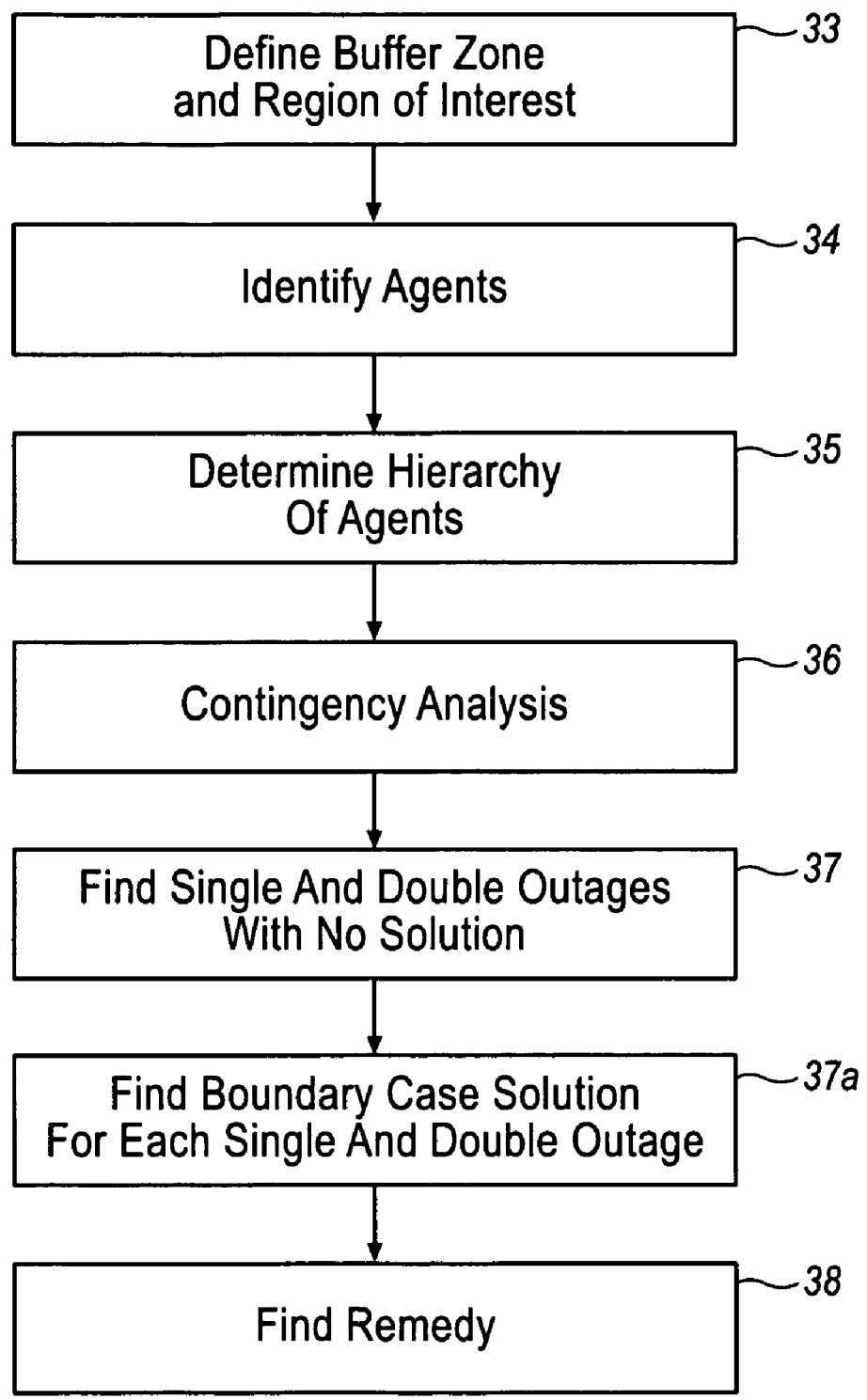
FIG. 3 is a flow chart depicting an operation of a voltage collapse and diagnosis procedure according to an aspect of the present invention.

One embodiment of the process according to the present invention is shown in FIG. 3. Here, the process begins at step 33, where a region of interest is specified and a buffer zone surrounding the region of interest is identified. In a preferred embodiment of the invention, the selected buffer zone surrounding the region of interest is a region of buses that is sufficiently deep to include lower voltage level buses such as those at or below 34 KV. One skilled in the art will readily recognize other lower voltage level buses that may be encompassed by the buffer zone. The lower voltage level buses preferably include load bearing buses as well as non-load bearing buses. Load bearing buses are buses that directly connect portions of the electrical power system to real loads such as industrial plants, homes or other power consuming entities or that carry load in the loadflow model of the actual system. Non-load bearing buses are buses that simply act as a transfer point for electrical power within the electrical power system.

Additionally, the buffer zone is preferably selected to be sufficiently large to account for cascading exhaustion of reactive reserves that extend across many directions in the electrical power system. More specifically, the inventors of the present invention have determined that two or more components dispersed within an electrical power system may interact with one another even if they are distally located from one another. Therefore, the buffer zone is preferably selected such that it does not preclude components in the electrical power system simply because they are geographically dispersed. Accordingly, the buffer zone is selected such that it encompasses as many of these interrelated components as possible.

Next, in step 34, groups of buses and reactive reserves within the selected region of interest and buffer zone are grouped into "agents." Each agent represents a selected grouping of buses that are supported by a specific set of reactive reserves. The term reactive reserves is any power source or voltage control/reactive supply device in the electrical power system, such as generators 10 or reserves 18, capable of providing reactive power. In step 35, the agents determined in step 34 are organized in a hierarchy based on the specific generators that support the specific buses in each agent. The group of buses in an agent defines the agents' voltage instability region. Next, in step 36, a contingency analysis is performed. The contingency analysis in step 36 includes simulating outages on the electrical power system and monitoring the reactions of the generators 10 at each agent or in groups of one or more of the agents. The term contingency or outages is used to indicate taking an electrical component, such as a generator or power line or other component off-line.

The above-described process is a simulation based on applying artificial loads to a computer model of the selected area within the electrical power system. Preferably, the model, to which the outages are applied, accurately represents the electrical characteristics of specific components in the electrical power system. In step 37, the effects of contingencies on agents or groups of one or more agents are assessed according to the magnitude to which their reactive reserves are exhausted to find equipment outages that have sufficient impact or no loadflow solution or are close to having no loadflow solution. In step 38, results from the contingency analysis and grouping of agents are used to identify specific remedial actions or modifications that may be made to the electrical actual power system to prevent voltage collapse, local blackout, or voltage instability in response to the contingency.

Figure 4:
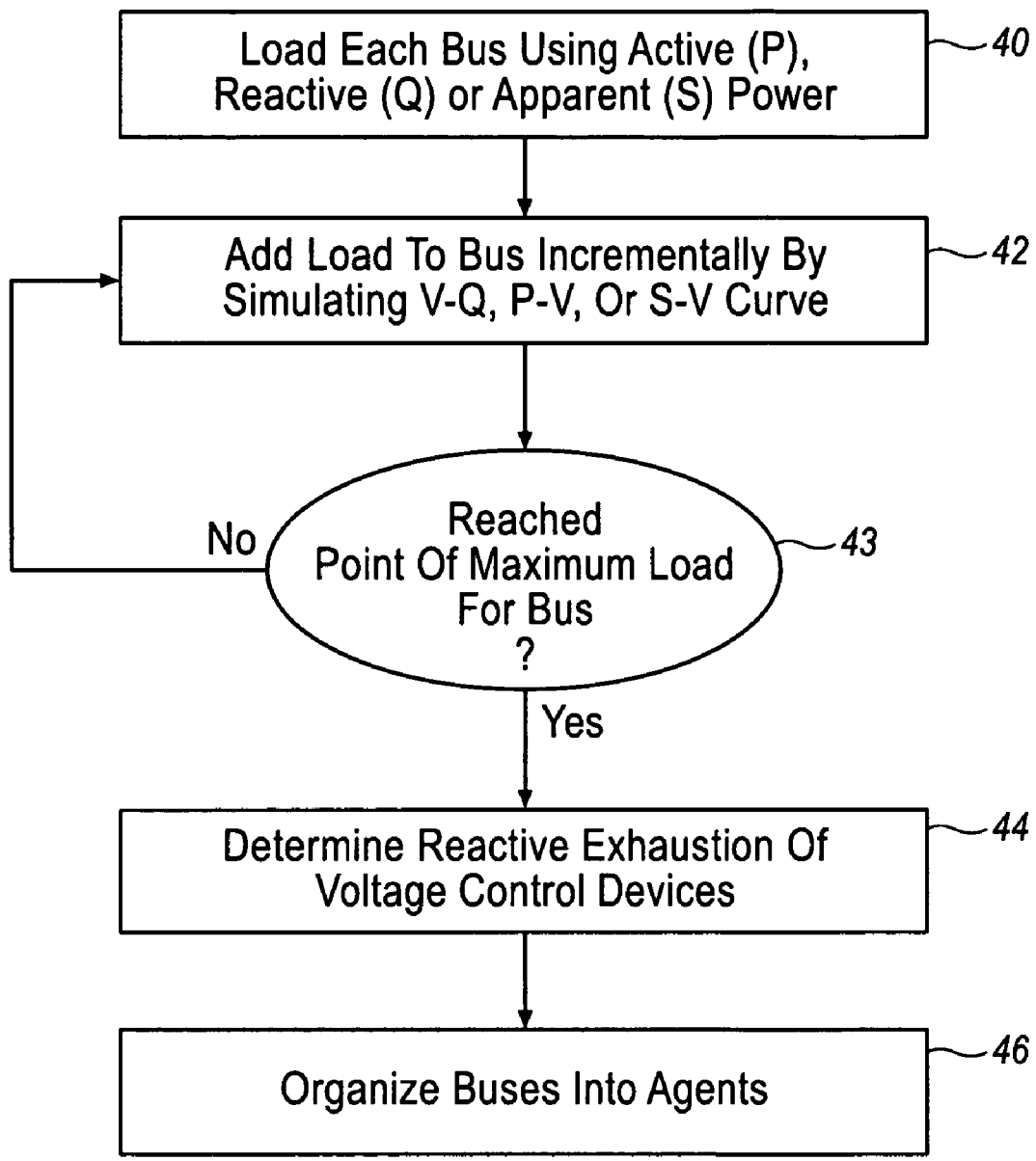
FIG. 4 is a flow chart depicting an operation of a voltage collapse and diagnosis procedure according to an aspect of the present invention.
Figure 5:
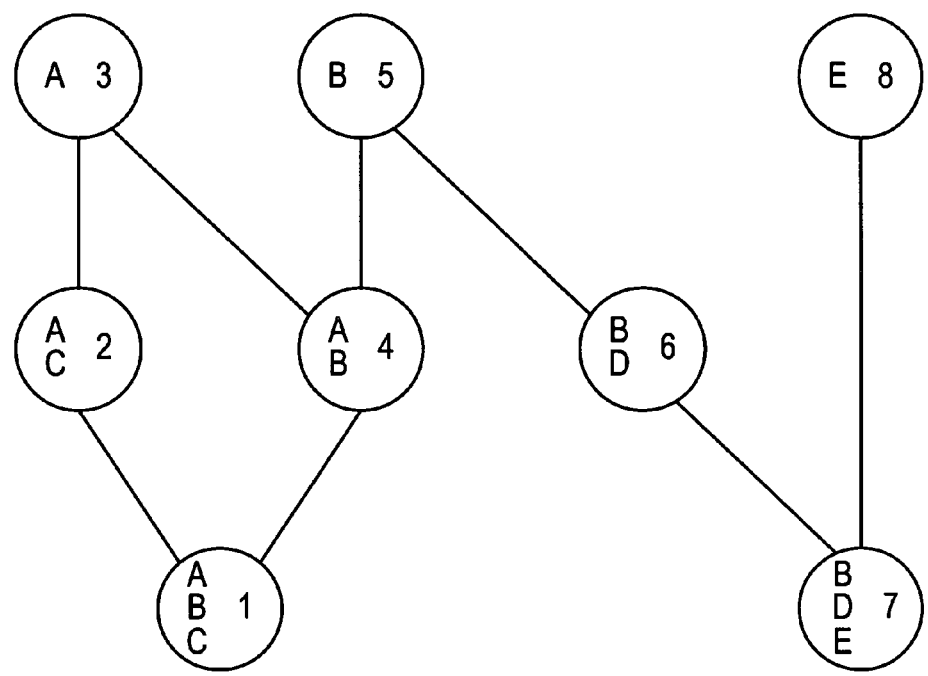
FIG. 5 is a schematic view of an agent hierarchy diagrammed according to an aspect of the present invention.

Referring now to FIGS. 3, 4, and 5, the above described process is explained in greater detail. In FIG. 4, the agent selection process, identified in step 34 of FIG. 3, is described. The agent selection process begins with step 40 where simulated electrical loads are applied to each of the buses in the model of the electrical power system. The buses include not only buses 24 (see FIG. 2), but any other bus within the selected region of interest and buffer zone that provides electrical connection between different components in the electrical power system for purposes of transporting electrical power. The simulated loads are preferably applied in an incremental manner to allow for the mathematical computation of artificial loading curves (i.e. a V-Q (reactive power loading), S-V (apparent power loading), or P-V (active power loading)) for each incremental load setting. A preferred implementation is to compute a curve at every bus in the region of interest and buffer zone since this curve is computed by adding a fictitious generator of unlimited reactive generation and absorption capability at the bus where the stress in applied and thus is more likely to obtain solutions to the load flow equations near the boundary of the operating region where voltage instability, voltage collapse or local blackout occur. The V-Q curve is computed by changing the bus model to a generator model, expanding the reactive supply and absorption reactive limits, and incrementally reducing voltage until the first reactive power absorption minimum is found or until the load flow has no solution. The buses where the maximum load terminal point is due to lack of a loadflow solution are often in load bearing agents and often in load bearing agents where load shedding is effective in obtaining solutions after equipment outage impact the reactive reserves in these load bearing agents. This terminal point of the artificial loading curve is defined as the point of maximum load for a specific bus and represents a point on the boundary of the operating region where voltage collapse, voltage instability or local blackout would occur. In step 42, artificial loading curves are calculated and the point of maximum load is determined for each bus in the region of interest and in the buffer zone. Alternative means well known to those skilled in the art may also be used to find the point of maximum load for each bus.

In step 44, the specific reactive reserves, such as generators 10 or reserves 18, that are completely depleted at the point of maximum load are identified for each bus. The reactive reserves identified in this step represent the specific power sources that expend all of their resources to meet the increasing load on each artificially loaded bus. The reactive reserves identified in this step may also be referred to as the reactive reserves for the specific loaded bus.

In step 46, the buses having the same reactive reserves are grouped together into specific agents. By this way, each agent represents a specific set of buses, called its voltage instability region, where stressing each bus of the agent completely depletes the identical generator 10, groups of generators 10, or reserves 18 when artificially loaded to the point of maximum load. In conjunction with the discussion above, each bus in the agent's voltage instability region has identical reactive reserves and thus the reactive reserves for the agent are defined as this same set. The reactive reserves represent the generators 10 or other voltage control/reactive supply devices that deplete their resources to meet an increasing load on the group of buses of the voltage instability region of the agent. The exhaustion of voltage control/reactive supply devices in the reactive zone of the agent can cause voltage instability of that agent.

Referring now to FIG. 5, the hierarchy analysis in step 35 of FIG. 3 is described in greater detail. FIG. 5 shows all of the identified agents as being organized into a hierarchy according to the specific generators 10 or other power sources that act as the reactive reserves for each particular agent. The lower level agents on the hierarchy chain, proximate the load bearing centers, are agents having generators 10 that are subsets of their parent agents (agents closer to the transmission level). The agents typically fall into an organization that begins at a lower voltage level, proximate the load bearing centers, and extends to a higher voltage level at the transmission level. This organization results from the fact that higher voltage level agents, closer to the transmission level, are supported by more generators 10 and reserves 18. Agents may also fall into an organization which represents the electrical remoteness from the generators 10 relative to their reactive supply.

The organization of agents into a hierarchy as shown in FIG. 5 provides the ability to identify family lines of agents or buses that are supported by the same reactive reserves. A family line is a child, parent, grand parent, etc. A family is composed of several family lines of agents with the same patriarchal parent. The vulnerability region of a family of agents or of a specific patriarchal agent associated with this family is the collection of the voltage instability regions of all agents in all family lines including the patriarchal agent or highest agent in the hierarchy. A P-V curve is computed by scaling active load at every bus in every agent in every family line of the vulnerability region of a patriarchal agent, which generally exhausts the reactive supply of the patriarchal agent of the family. A V-Q curve is computed at a bus in the voltage instability region of each patriarchal agent by adding reactive power load in the voltage instability region of each patriarchal agent to determine the exhausting of the reactive reserve in sequence of agents in all family lines of the family associated with each patriarchal agent and possible sequential instability in each agent in each family line in the family. Exhausting the reactive supply of a child will generally cause the reactive supply of the generators belonging to the parent to exhaust their reactive supply. The generators belonging to a grandparent of that child that do not belong to the parent may also exhaust their reactive supply. Thus reactive reserves can be exhausted up the family line from any child or down all family lines from the patriarchal agent of the family.

The scaling of active power load at all buses in the vulnerability region of a patriarchal agent may cause the exhaustion of reactive reserve in each family line of the family associated with the patriarchal agent in the same manner as just described. Possibly, this exhaustion may occur in a different sequence and for the same reasons of accessibility of reactive supply of parents with respect to their children and vice versa. Simulating equipment outages by removing equipment in small steps (similar to a dimmer switch) will exhaust the reactive reserves and presumably cause voltage instability in one or more family lines in one or more families, but with the exception that the reserves in all family lines in any particular family will not necessarily exhaust unless the outage is severe enough. If the outage is severe enough to exhaust the reactive reserves of the patriarchal agent and thus all family lines of the family, this exhaustion (which may be referred to as a sequential exhaustion), may affect ancestral agents and affect a region larger than the vulnerability region of the patriarchal agent. An outage can affect more than one family in this way. The exhaustion of reserves of agents in family lines and in families and presumably the cascading instability of agents affects contingency selection, how preventive, corrective, and emergency control is determined and how available transfer capability for a control region is calculated. By this way, one can identify agent families of buses (vulnerability regions) that are affected by the same reactive reserves or generators. More specifically, critical regions otherwise known as vulnerability regions, control regions and load pockets may be identified based on a number of agents in depth and width in the hierarchy that deplete the same reactive reserves. The application of vulnerability regions and load pockets will be described in greater detail hereinafter.

In the illustration of FIG. 5, agents 1-8 are shown having generators 10, which are labeled A-E, as their reactive reserve zones. As shown in FIG. 5, agent 1 (proximate the transmission level) has generators A-C as its reactive reserve zone. Agents 2 and 4 have generators A, C and A, B respectively, which are subsets of generators A-C of agent 1, as their reactive reserve zones. As the reactive reserve zones for agents 2 and 4 are subsets of the reactive reserve zone for agent 1, agents 2 and 4 are children of the parent agent 1. Accordingly, agents 2 and 4 are positioned as shown in the Figure as children of the parent agent 1. Similarly, agent 3 is a child of agents 2 and 4 as agent 3 has generator A as a reactive reserve that is a subset of the reactive reserves of agents 2 and 4. Agent 5 is a child of agent 4 and has generator B as its reactive reserve zone and is therefore a subset of the reactive reserve of agent 4. Note a family line is the set of agents 1,2,3; 1,4,5: 1,4,3; 7,6,5; and 7,8 as well as portions of these family lines identified. Families of agents are composed of all family lines of agents connected to the agent. A family for agent 1 is agents 1, 2, 3, 4, 5 that include the agent 1. A family for agent 4 is agent 4, 3, 5. The exhaustion of reactive reserves for an agent implies exhaustion of reactive reserves for its family of agents and possible voltage instability for every agent in the family. It should be noted that any parent may have generators in its reserves that are not in any of its children but this is not shown in the example. The principle of family lines experiencing cascading instability with an increasing number of generators 10 and reserves 18 exhausting their reactive reserves carries over to the case that agents can have generators 10 or reserves 18 not in any of their children agents. The exhaustion of reactive reserves in any agent will generally cause exhaustion of reserves on the generators 10 and reserves 18 of the parent that do not belong to any child. Thus, this structure provides an explanation of the natural cascading exhaustion of reserves of agents and the cascading voltage instability of agents that would likely occur. The remaining agents 6-8 are organized in the same fashion as will be readily recognized by the skilled artisan.

The hierarchical organizational scheme as described above allows one to determine the specific impact that a particular generator has on a group of buses. For example, as can be seen in FIG. 5, generator A is part of the reactive reserve zone for agents 1-3 and 4. Generator B is part of the reactive reserve zone for agents 1 and 4-7. Therefore, one will readily understand that because generators A and B appear in the reactive reserves of many agents, they have a significant impact on the electrical power system as defined in FIG. 5.

Next, a contingency analysis is performed. This analysis is represented by step 36 in FIG. 3. It should be understood, however, that the specific order of steps outlined above does not necessarily need to be followed. For example, the step of determining the hierarchy and organizational scheme may be performed after the contingency analysis.

The contingency analysis in step 36 of FIG. 3 is further described with reference to FIG. 7A. In step 130 in FIG. 7A, a single contingency analysis is first performed. Each specific single contingency is identified within the region of interest as discussed above and includes single generators, single transformers and single power lines. In step 132, the contingencies are simulated as taken off-line in the model of the electrical power system. The outage can be simulated to replicate the governor or AGC response for loss of generation contingencies and can have any of the controls enabled. One possible option is a series of snapshots that reflect the governor response with no capacitor or underload tap changer control, governor response with tap changer controls enabled and a governor response with both tap changer and switchable shunt capacitor controls that approximates a dynamic simulation of the contingency. If there is a load flow solution as each subsequent snapshot is simulated, the contingency is assumed to have a loadflow solution, but if there is no loadflow solution after all three snapshot loadflow simulations, the contingency is assumed to have no loadflow solution. In step 134, for each single contingency, the impact or exhaustive factor on the reactive reserves of each agent or each set of N agents is determined. The exhaustion factor can be computed agent by agent and can be used to determine if their exhaustion percentage is small enough on all members of a set of N agents. This check can be carried out for all sets of N agents for each N. This calculation is easier than evaluating the reactive reserves on all sets of N agents for all N. Specifically, the amount of power output from each generator 10 or other reactive reserve 18 caused by the contingency is calculated by solving the load flow equations.

Figure 6:
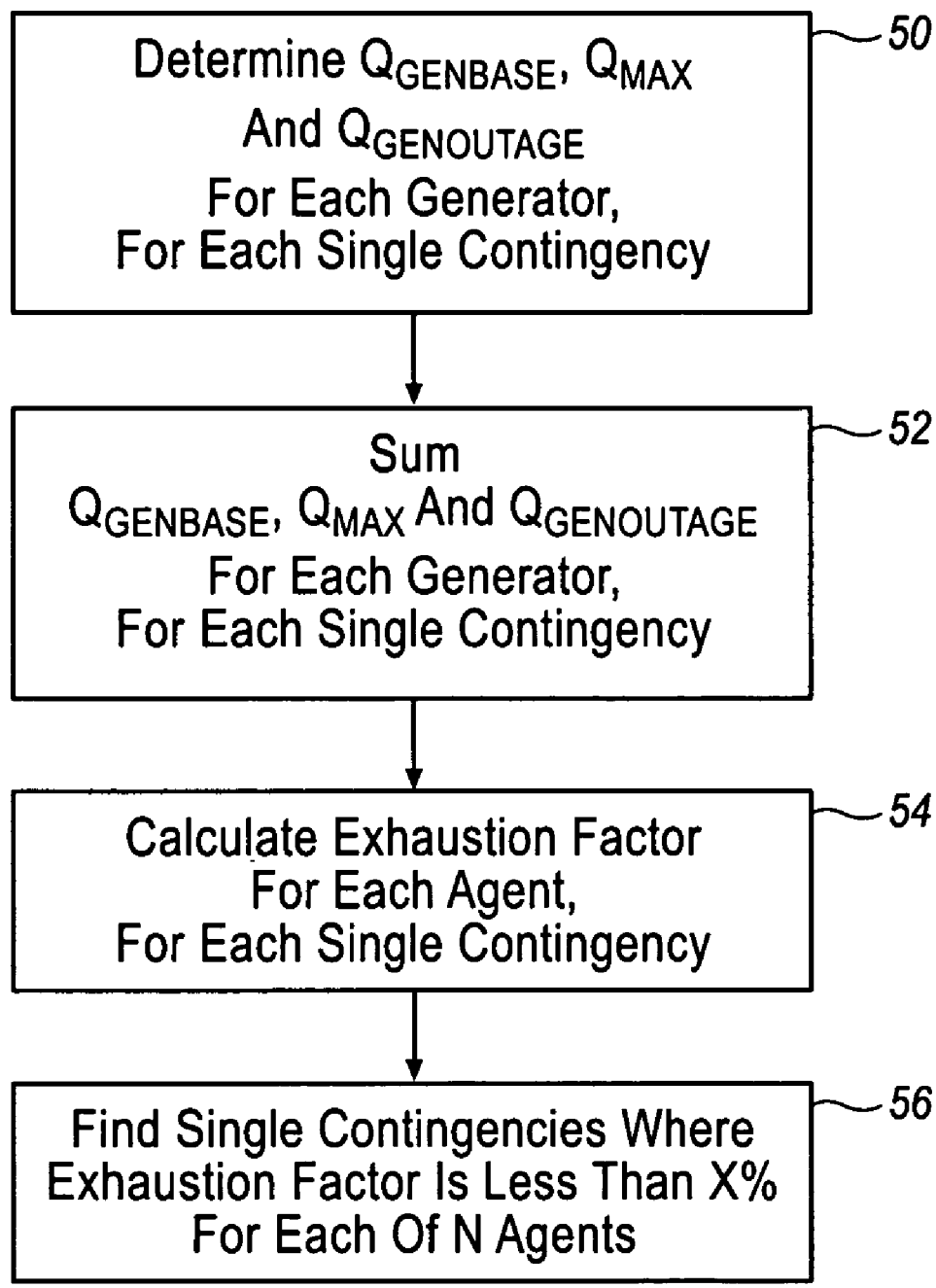
FIG. 6 is a flow chart depicting an exhaustion calculation for agents according to an aspect of the present invention.

The process depicted in FIG. 6 begins with step 50, where Qgenbase, Qgenoutage, and Qmax are determined. Qgenbase is the base reactive power output of a particular generator 10 or reactive reserve 18. This base reactive power output represents the amount of reactive power that a generator 10 or reactive reserve 18 outputs when no contingency or outage is simulated. Qgenoutage is the reactive power output from a generator 10 or reactive reserve 18 in response to the contingency as described in step 36 above. More specifically, Qgenoutage represents the amount of reactive power output of the generator 10 or reactive reserve 18 in response to a specific contingency. Qmax is the maximum reactive power output that a generator 10 or reactive reserve 18 is capable of producing.

In step 52, Qgenbase and Qmax are summed for all generators 10 and reserves 18 for each agent, and Qgenoutage is summed for all generators 10 of each agent for each specific contingency. In the illustration of FIG. 5, Qgenbase, Qgenoutage, and Qmax are summed for each of the agents 1-8. For example, agent 1 includes generators A-C. Therefore, Qgenbase, Qgenoutage and Qmax of each of these specific generators are summed to result in one value for each of Qgenbase and Qmax for that agent as well as one value of Qgenoutage for each agent for each specific contingency.

In step 54, reactive remaining exhaustion factors are calculated for each of the agents for a specific contingency. The reactive remaining exhaustion factor is determined according to equation 1 and 2 below.

$$\text{Reactive Remaining Exhaustion Factor 1} = \left(\frac{Q\text{max} - Q\text{genOutage}}{Q\text{max} - Q\text{genBase}}\right) \cdot 100 \quad \text{Eq. 1}$$

$$\text{Reactive Remaining Exhaustion Factor 2} = \left(\frac{Q\text{max} - Q\text{genOutage}}{Q\text{max} - Q\text{genBase}}\right) \cdot 100 \cdot \langle Q\text{genOutage} - Q\text{genBase}\rangle \quad \text{Eq. 2}$$

The exhaustion factor for an agent represents the percentage of its base case reactive reserves the particular agent has remaining after being required to provide reactive power in response to the contingency. For example, an exhaustion factor of 0% indicates that the set of voltage control/reactive supply devices for a particular agent were required to expend all of their reactive power resources in response to the contingency and are unable to provide any further reactive power output. Likewise, a reactive remaining exhaustion factor of 100% represents that the voltage control/reactive supply devices for the agent were not required to expend any additional reactive power in response to the contingency. A second alternative exhaustion factor for each agent is that computed in equation 1 times the contingency induced reactive power change in MVARS at the generators 10 and reserves 18 for each agent. Other exhaustion factors could be used as will be recognized by the skilled artisan. The exhaustion factors are computed on an agent basis and not on all sets of N agents for all N due to the difficulty in computation.

Once the exhaustion factor is determined as described with reference to FIG. 6, a multiple contingency analysis is performed. The multiple contingency analysis is directed toward contingencies that may individually pose an unacceptable drain on the reactive reserves, and in combination with other contingencies, may create a potential risk for voltage collapse, local blackout or voltage instability.

Figure 7A:
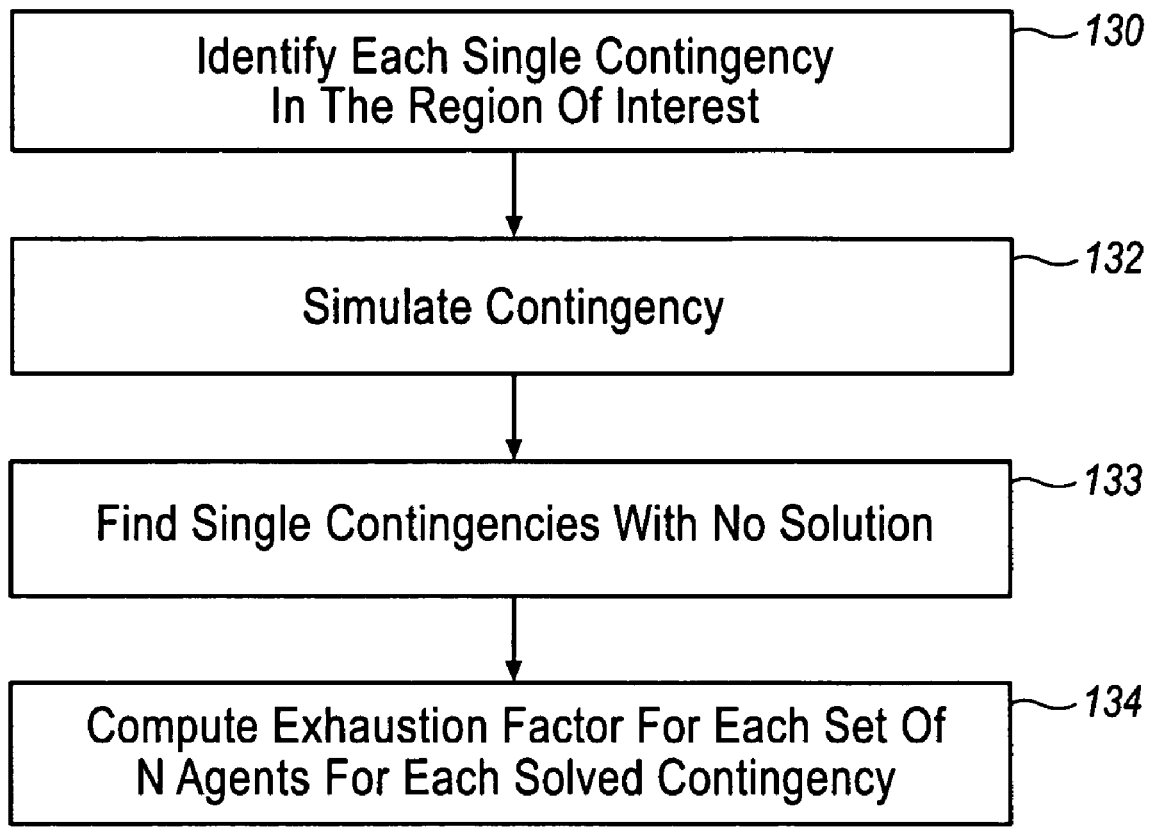
FIG. 7A is a flow chart depicting an operation of a voltage collapse and diagnosis procedure according to an aspect of the present invention.
Figure 7B:
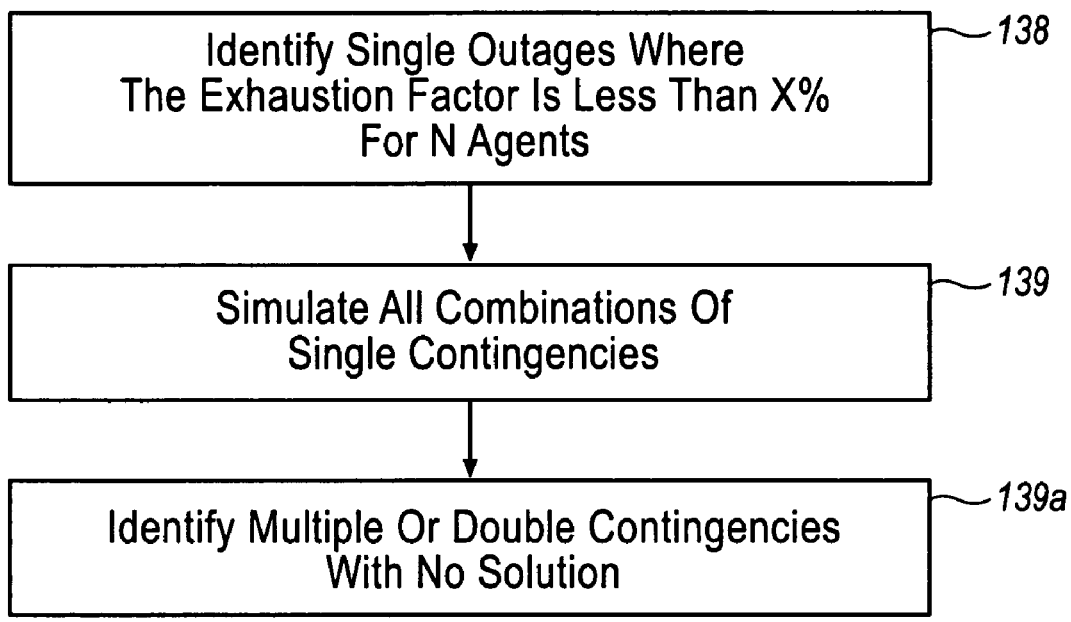
FIG. 7B is a flow chart depicting an operation of a voltage collapse and diagnosis procedure according to an aspect of the present invention.
Figure 7C:
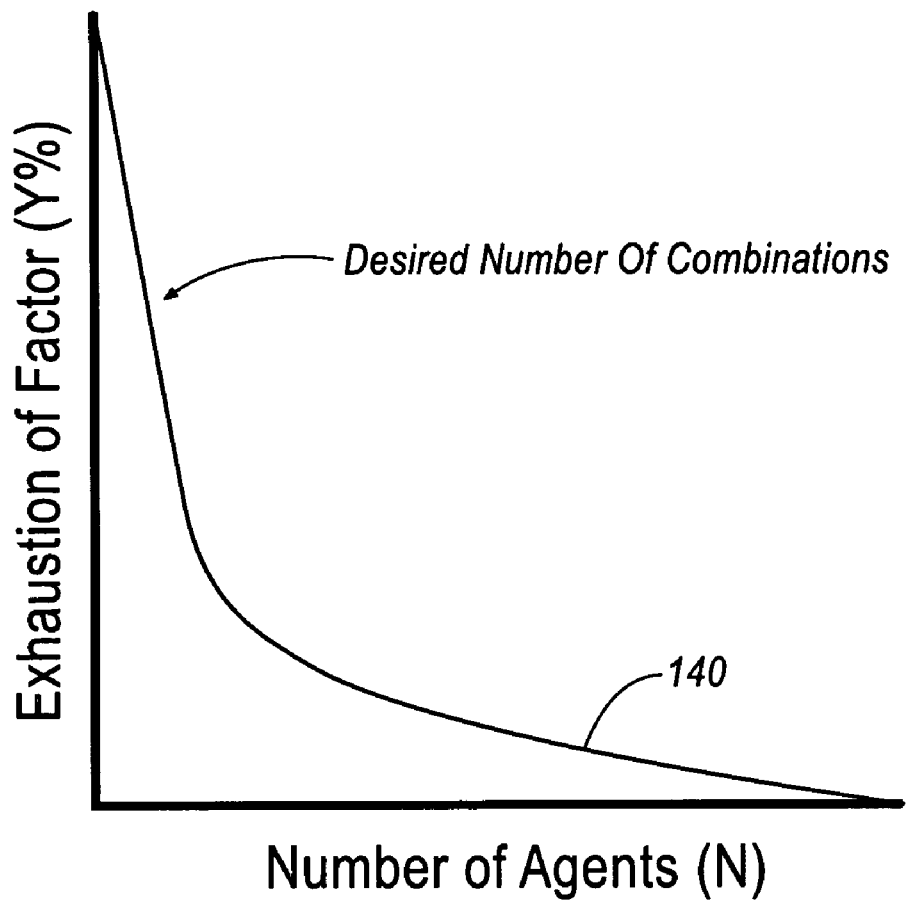
FIG. 7C is a graphical view of a selection algorithm for a number of agents and exhaustion percentage according to an aspect of the present invention.

The process for performing the multiple contingency analysis is outlined with respect to FIGS. 7B and 7C. The process begins in step 138 of FIG. 7B, where the specific single contingencies that may pose a risk when combined with other single contingencies are identified. Here, a maximum reactive remaining exhaustion factor percentage (X %) of its base case reactive reserves remaining after the contingency and a specific number N of agents must be specified. For example, 35% of the reactive reserves may be remaining across a number of three agents. If this reactive remaining exhaustion is less than a predetermined number, X %, then the single contingency is held in a pool for double contingency analysis. A matrix is produced with cells that indicate the number of single contingencies M(Y,N) for each value of N and for different equally spaced discrete values of Y=(100−X) %, the percentage of the reactive reserves of an agent exhausted by the contingency. The cells also indicate the number of double outages that need to be simulated M(M−1)/2 given M=M(Y, N) for a given value of N and a specific discrete value of Y. The cells also indicate the increase in M, denoted ΔM(Y,N), as the value of Y decreases for any fixed values of N. Another property of the matrix is that for a fixed value of Y, all of the single and double outages for a larger value of N belong to all cells to the left of it in the same row of the matrix. This is obvious by the fact that if three agents will have greater than Y % of their reserves exhausted, there will be two agent sets and single agents with greater than Y % of their reactive reserves exhausted. From these two properties all of the contingencies simulated for a cell are simulated in any cell in the upper right submatrix of that cell. With reference to FIG. 7C, the exponentially decreasing line indicates an approximation to all cells with approximates the same number of double outages to be simulated. As the exponentially decreasing line approaches the origin, the number of outages increases to all of the possible double outages for a region of interest. One decides how many outages one is willing to simulate and then one must select a value of Y and N that specifies a cell on this line. Another feature of this matrix aid in selecting Y and N is that if one selects a value of Y and N on some exponentially decreasing line, simulates all those outages, and finds all of the outages with no solution, one will find in each cell the number of those outages that would be contingencies simulated if that value of Y and N were chosen. As one selects Y and N on different exponentially decreasing lines approaching the origin, in some cases the percentages of the outages that do not solve increase but the percentages of outages that do not solve as one moves along one particular exponentially decreasing line for the same number of outages simulated remain at very similar values. Since Y % represents the severity of an effect and N represents the magnitude of geographic impact, a skilled artisan can adjust the number of agents and percent of reactive reserves remaining to highlight the region of interest. Line 140 can be defined as a breaking point as to when a particular subset of single contingencies will be included in double contingency analysis for each value of Y and N along the exponentially decreasing line. In FIG. 7C, single contingencies falling to the lower left of line 140 would not be considered while contingencies falling to the upper right of line 140 would be considered for double contingency analysis. This procedure uses N>1 selected outages that affect one or more than one agent in a family line and possibly more than one family. This procedure captures the divide and conquer aspects of how outages cause local blackout, voltage collapse, or voltage instability by impacting one or more family lines in one or more families and that one needs only to impact an agent or agents in such a family line by a very small amount to produce double contingencies that do not solve and can have a large impact on the system.

Once the single contingency analysis has been performed, each of the single contingencies satisfying the criteria set forth above is simulated in combination with every other single contingency that satisfies the criteria in step 139; any double contingency for which no load flow solution can be reached is held for further analysis in step 139a. This process of double contingency analysis results in M*(M−1)/2 combinations of single contingencies where M is the number of single contingencies that satisfy the criteria and have load flow solutions.

Returning now to FIG. 3, in step 37a the boundary case solution is found for each single and double outage without a solution found in steps 133 and 139a of FIGS. 7A and 7B, respectively. More specifically, referring to FIG. 8, each non-solving double contingency and each non-solving single contingency found (see step 200) is then simulated by mathematically removing the equipment in small steps in step 202, similar to a "dimmer switch". The "dimmer switch" method herein referred to as the maximum percentage of the outage seeks the threshold of equipment outage (boundary case solution) beyond which no load flow solution exists as in step 204.

The purpose of simulating an outage incrementally is to obtain load flow solutions that could not otherwise be found if the outage was taken in one step and to identify the impact of the outage from the boundary case solution on agents at the threshold of voltage collapse. The desired result of determining the impact of the double contingency on agents is to define the predicted control region that may be composed of agents in one or more family lines in one or more families.

Figure 8:
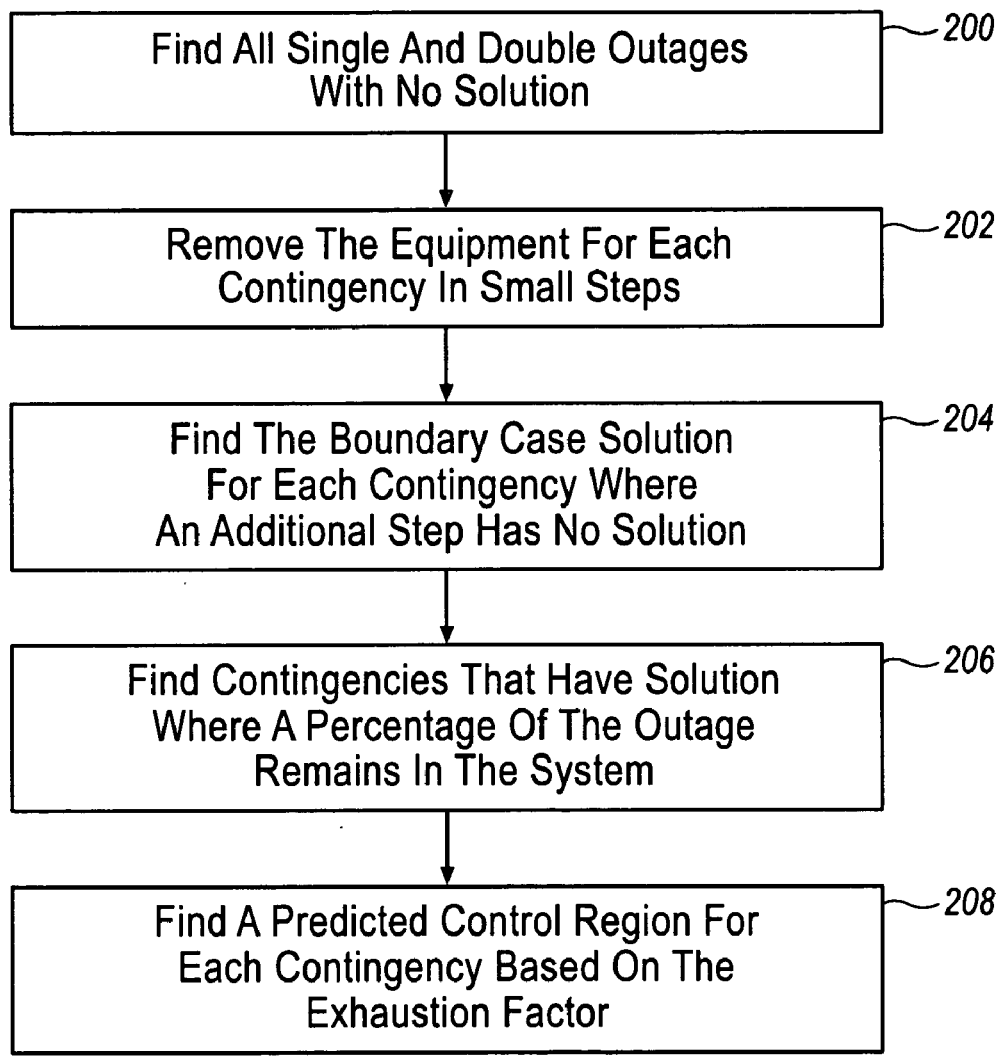
FIG. 8 is a schematic view of an algorithm according to an aspect of the present invention.

FIG. 8 shows the procedure for the Increasing Percentage Method of Simulating Contingencies that have no loadflow solution. Step 200 in FIG. 8 requires determining all of the single and double contingencies that have no loadflow solution either by a single loadflow snapshot or by a series of loadflow snapshots that approximate a dynamic simulation. Step 202 requires removing the equipment for each single or double contingency in small steps. There are a number of methods for performing this step that have been tried and all are possible. The progressive removal of a line or transformer can be approximated by replacing it by a positive and negative injection at the buses it is connected to that corresponds to the complex power flow on the line that is progressively reduced to zero. Another method is to replace the branch by one where the series resistance and reactance is multiplied by a factor and the shunt susceptance and conductance is divided by a factor that approaches infinity. Loss of a generator can be simulated via the Increasing Percentage Method by progressively decreasing the active and reactive load and active generation as well as reducing the reactive capability limits on the generator until the generator is replaced by a load bus. Step 204 is taken if the progressive removal of the contingency ultimately reaches a percentage of the outage removed where the loadflow again has no solution as it did when outaged in one step. The loadflow solution at the highest percentage of the equipment outaged is the Boundary Case Solution and if another small percentage increase in the removal of the outage occurred there is no loadflow solution. Step 206 requires finding all of the single and double equipment outages that have no loadflow solution if the outage is simulated as a single step and have no solution when simulated as an increasing percentage. Step 208 requires determining the Boundary Case Solution for each such contingency and then determining a Predicted Control Region for each contingency that is based on an exhaustion factor of agents and generators where Preventive Control would obtain a loadflow solution. There are contingencies for which a solution will be found for removal of 100% of the equipment associated with the contingency. A criteria that specifies an upper limit on the exhaustion factor can be used to determine agents that belong to the Predicted Control Region. The threshold may be different for different utilities or ISOs. A threshold of 50% is one that can be used.

Figure 9:
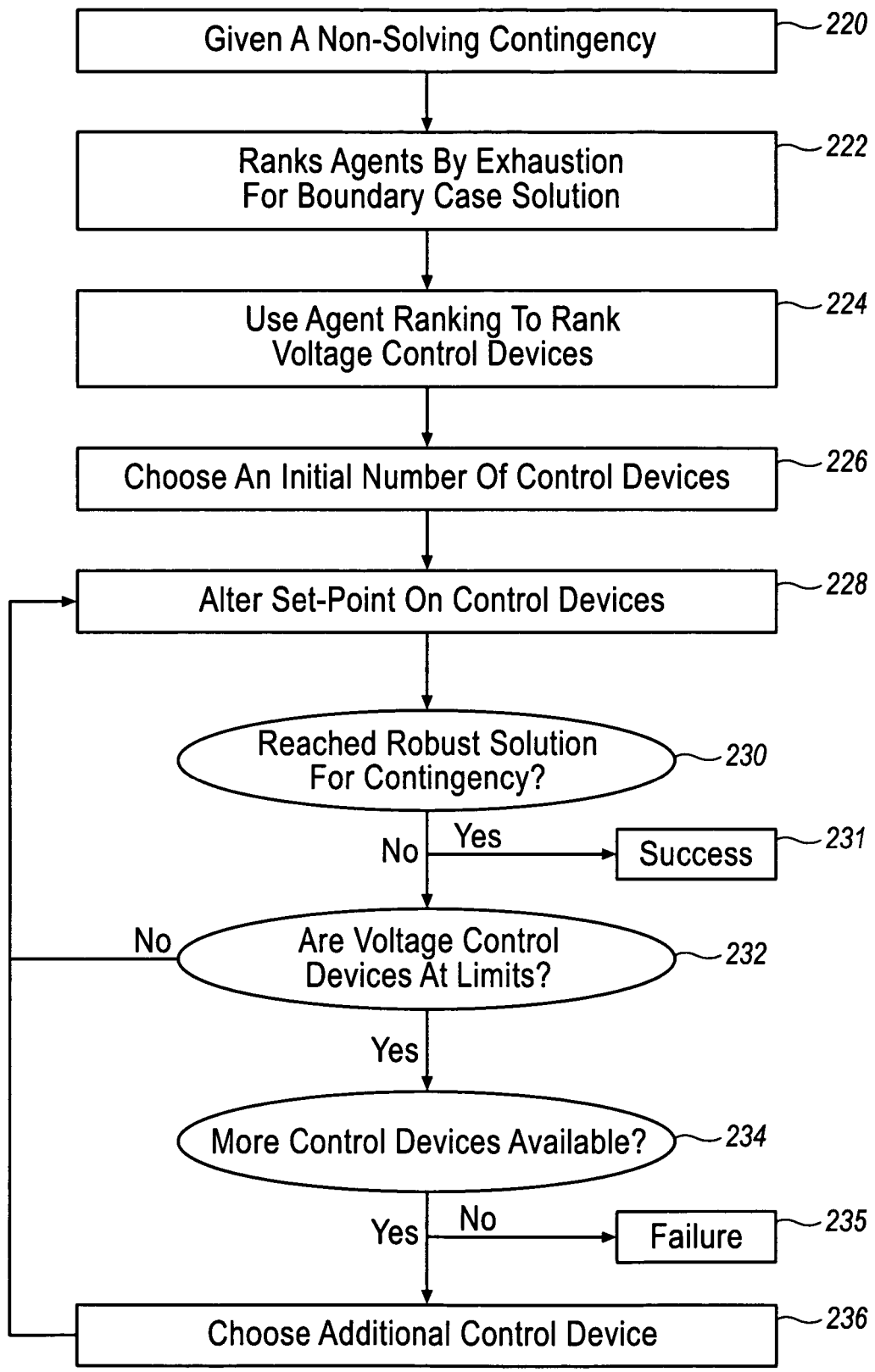
FIG. 9 is a flow chart setting forth a method for Preventative Voltage Rescheduling Control.

FIG. 9 shows a procedure for the Preventive Voltage Rescheduling Control. Given a Non-Solving Contingency simulated via the Increasing Percentage Method in step 220, step 222 requires that the agents are ranked based on their exhaustion of reactive reserves at the Boundary Case Solution found using the Increasing Percentage Method. This determines the Predicted Control Region of agents. The exhaustion factor used can be one of those discussed in step 54 or one that is obvious to an expert in the field. Using the agent ranking, a ranking of the voltage control devices within the agents is determined in step 224. Step 226 selects an initial number of control of voltage control devices based on the ranking to form a Control Set where a Preventive Voltage Rescheduling Control will be applied. The ranking can be from smallest to largest or from largest to smallest. Next, the voltage setpoint on the control devices in this Control Set is altered in step 228. One can make these changes in small increments and determine if a loadflow solution is obtained. If voltage control devices are at limits, then the voltage control on these control devices are held at the limits in the next alteration of the voltage setpoints on the control devices in the Control Set as shown in step 232. A robust solution would require that a solution is obtained and the reactive reserves on the generators in the Control Region or Control Set be increased by a certain percentage of their reactive capability or that loadflow solutions be obtained for a certain number of consecutive small voltage setpoint changes. If a robust loadflow solution is found in step 230, a robust loadflow solution is used for the Preventive Voltage Rescheduling Control. The Preventive Control could be implemented in step 231 either by modifying the voltage setpoints on the control devices or by adding shunt capacitors close to the generators that experience reactive reserve increases predicted via the Preventive Voltage Rescheduling Control. The Preventive Voltage Rescheduling Control is implemented if the voltage decreases sufficiently in the Control Region of agents, if the contingency occurs, or if the system is known to be vulnerable to voltage collapse for this single contingency or if the first contingency component of a double contingency occurs. Other criteria for implementation of the Preventive Control is possible. Other methods of implementation are possible as would be obvious to an artisan in the field.

If there is no loadflow solution obtained or no robust loadflow solution obtained or if all devices are at their voltage control limits based on step 232, then additional voltage control devices are sought in step 234 that can be added to the Control Set based on the ranking of those in the Control Region. If additional voltage control devices are available, an additional voltage control device is added to the Control Set and the procedure returns to step 228. If there are no additional voltage control devices in the Control Region, then there is no Preventive Voltage Rescheduling Control for the contingency selected in step 220.

Figure 10:
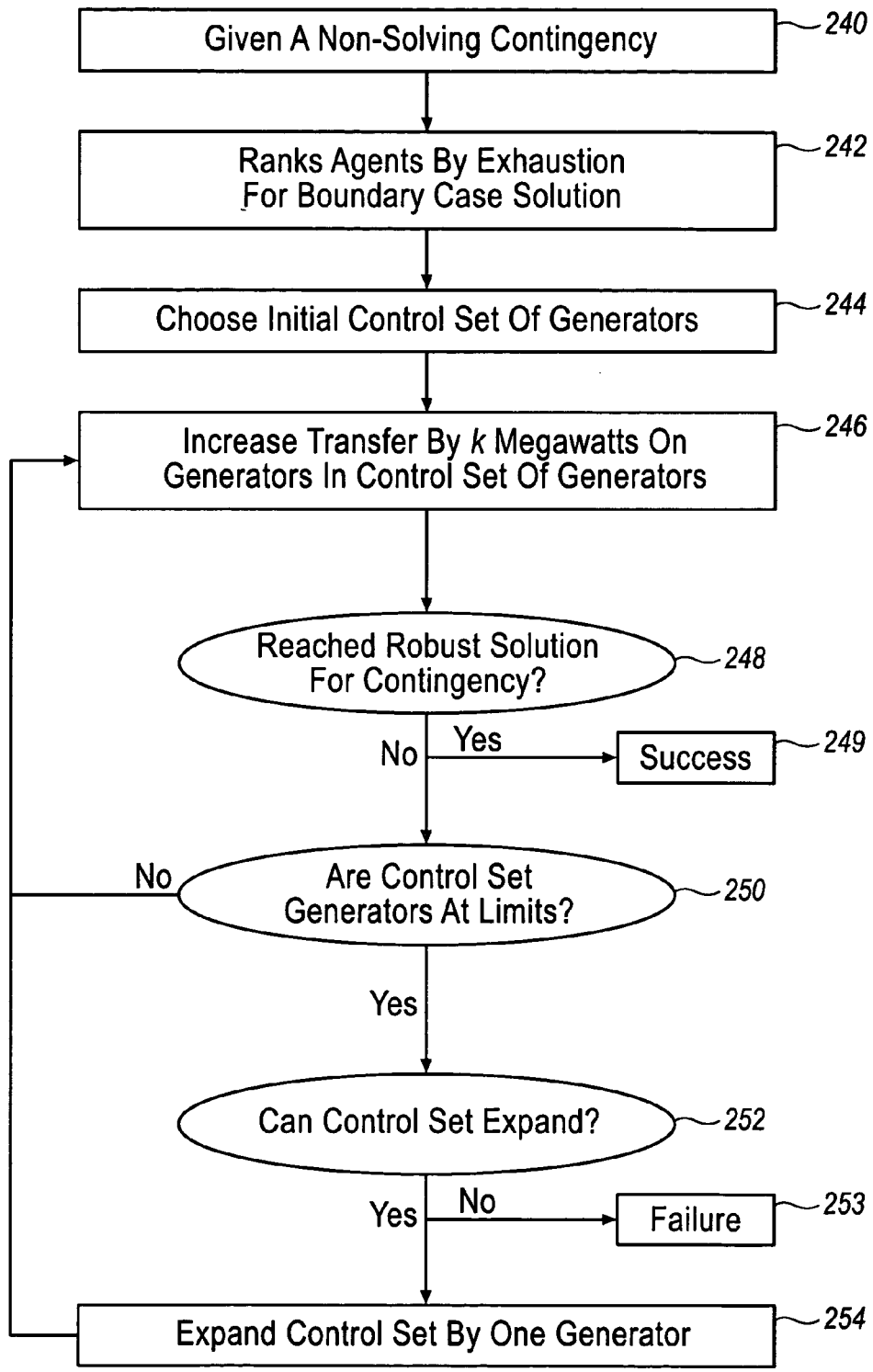
FIG. 10 is a flow chart of a procedure for Preventative Active Power Rescheduling Control.

FIG. 10 shows a procedure for the Preventive Active Power Rescheduling Control. Given a Non-Solving Contingency simulated via the Increasing Percentage Method in step 240, step 242 requires that the agents be ranked based on their exhaustion of reactive reserves at the Boundary Case Solution found using the Increasing Percentage Method. This determines the Predicted Control Region. The exhaustion factor used can be one of those discussed in step 54 or one that is obvious to an expert in the field. Using a ranking of generators in the Predicted Control Region, an Initial Control Set of generators is determined in step 244. This ranking could be from smallest to largest or from largest to smallest. In step 246 an initial subset of the generators and control devices is selected based on a ranking of generators in the control set used on an exhaustion factor where an increase in generation of a total of k MW occurs. The remaining generators in the Control Set experience a decrease in power of a total of k MW. The distribution of the k MW increase among the generators experiencing generation increase is based on participation factors for each generator that can be proportional to the active power loading factor, reactive power loading factor or the increase in reactive losses picked up by the generator for a small increase in generation on that generator. The participation factors for the generators experiencing the total k MW decrease of generation can be the inverse of the variable used for generators that experience active power generation increase, altering the active power setpoint on the generators in this control set. One can make these changes in small increments and determine if a loadflow solution is obtained or if reactive reserves increase on generators in the control set or control region. If generators are at limits, then the active power generation on these control devices is held at the limits in the next alteration of the active power generation setpoints on the generators in the Control Set as shown in step 248. A robust solution would require that a solution be obtained and the reactive reserves on the generators in the Control Set be increased by a certain percentage of their reactive capability or that loadflow solutions be obtained for a certain number of consecutive small active power generation setpoint changes. The robust solution would be at the center of the set of consecutive solutions if the robust criteria required a set of consecutive loadflow solutions be found or would be the point where the reactive reserves exceed a given percentage of the reactive supply capability on generators in the control set or control region. If a robust loadflow solution is found in step 249, a robust loadflow solution is used for the Preventive Active Power Rescheduling Control. The Preventive Control could be implemented in step 250 by modifying the active power generation setpoints if the first of a double contingency occurs with no solution, or if the system is known to be vulnerable to voltage collapse for this single contingency before it actually occurs on the system.

If there is no loadflow solution obtained or no robust loadflow solution obtained or if all devices are at their active generation limits based on step 250 in FIG. 10, then additional generation units are sought in step 252 that can be added to the Control Set based on the ranking of those in the Predicted Control Region. If additional generators are available, an additional generator is added to the Control Set and the procedure returns to step 240. If there are no additional generators in the Predicted Control Region, then there is no Preventive Active Power Rescheduling Control for the contingency selected in step 240.

Figure 11:
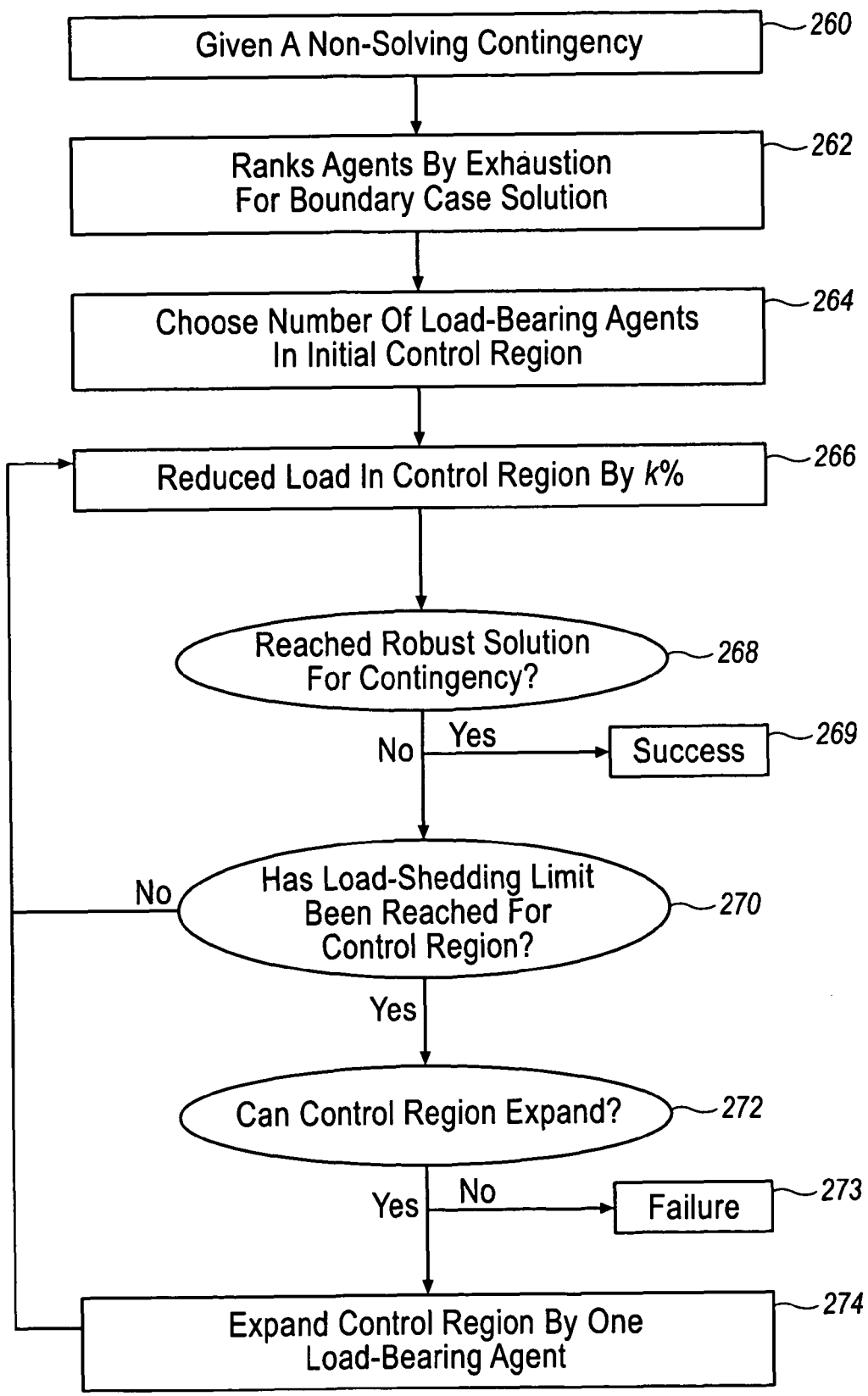
FIG. 11 is a flow chart for a procedure for Preventive Load Shedding Control.

FIG. 11 shows a procedure for the Preventive Load Shedding Control. Given a Non-Solving Contingency simulated via the Increasing Percentage Method in step 260, step 262 requires that the load bearing agents be ranked based on their exhaustion of reactive reserves at the Boundary Case Solution found using the Increasing Percentage Method. The exhaustion factor used can be one of those discussed in step 54 or one that is obvious to an expert in the field. Using the load bearing agent ranking of step 262, an Initial Control Region set of load bearing agents is determined in step 264. Step 266 decreases load in the Initial Control Region by a total of k %. The decrease in generation that accompanies the decrease in load can be from the swing bus, from all generators in a utility, or from all generators in the Control Region. The participation factor for generation response can be either for a governor loadflow or for an AGC loadflow. If the load shedding percentage in agents are at limits, then load shed on these agents are held at the limits in the next increase in load shedding percentage on the load bearing agents in the control set as shown in step 270. The decrease in generation on generators would reduce the generation below its lower limit, and the generation is set at the limit value and remains at that level for the next alternation of load and generation decrease. One can make these changes in small increments and determine if a loadflow solution is obtained. A robust solution would require that a solution be obtained and the reactive reserves on the generators of the agents in the Control Region be increased by a certain percentage of their reactive capability or that loadflow solutions be obtained for a certain number of consecutive small load shedding percentage changes. If a robust loadflow solution is found in step 268, a robust loadflow solution is used for the Preventive Load Shedding Control in step 269. The Preventive Control could be implemented in step 270 by tripping large motors or industrial loads by tripping lines out of a substation if voltage at buses in the Control Set drops below a certain level, the first of a double contingency that has no solution occurs, or if the system is known to be vulnerable to voltage collapse for a single contingency. Other methods of implementation are possible as would be obvious to an artisan in the field.

If there is no loadflow solution obtained or no robust loadflow solution obtained or if all agents are at their load shedding percentage limits based on step 270, then additional load bearing agents are sought in step 272 that can be added to the Control Region based on the ranking of load bearing agents used in selecting the Initial Control Region. If additional agents are available, an additional load bearing agent is added to the Control Region and the procedure returns to step 260. If there are no additional agents in the Control Region from the test in step 274, then there is no Preventive Load Shedding Control for the contingency selected in step 260.

Figure 12:
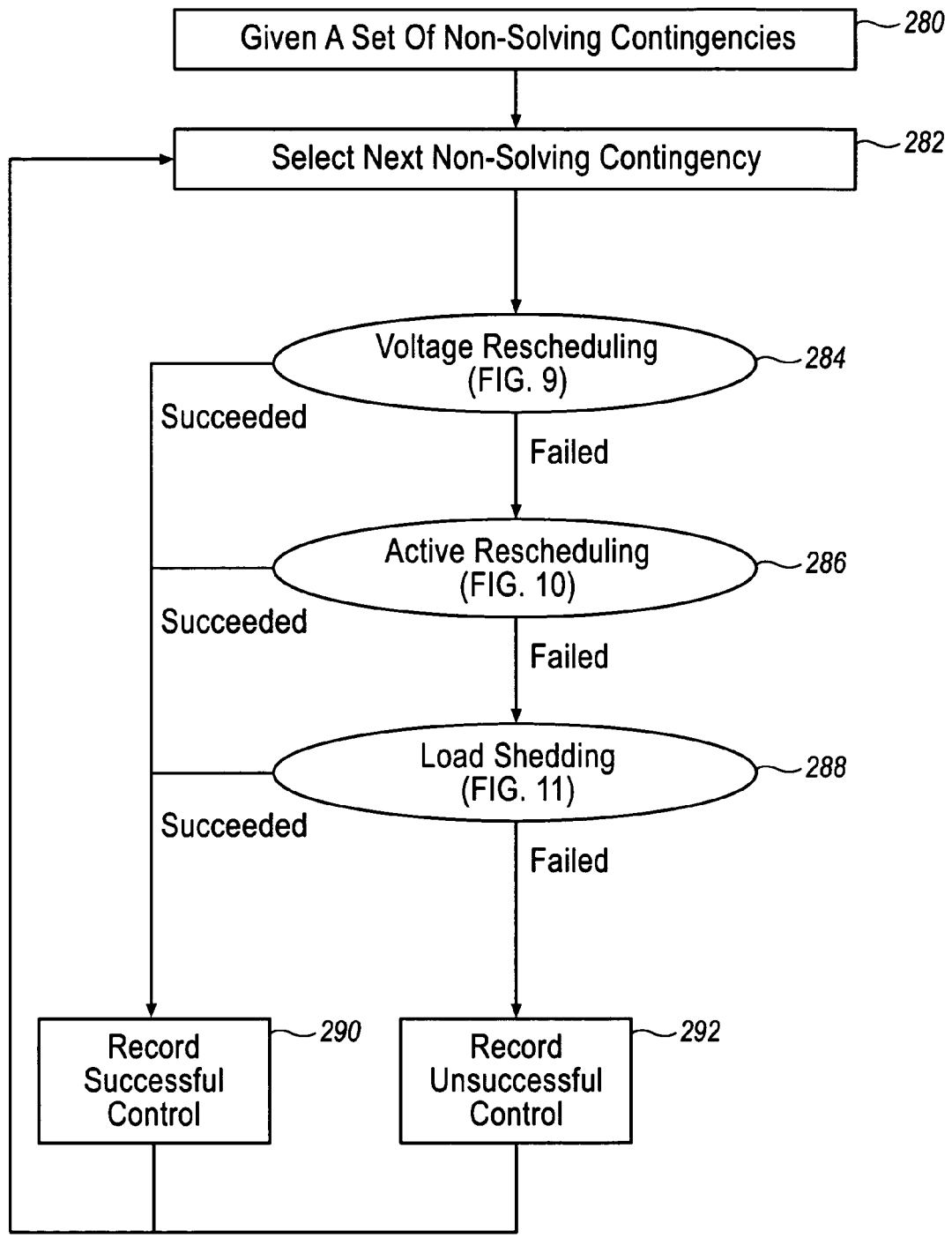
FIG. 12 is a flow chart for a procedure for determining Preventive Voltage Rescheduling, Active Rescheduling, and Load Shedding Control for every nonsolving contingency in a set of contingencies.

FIG. 12 provides a procedure for determining a Preventive Control for every non solving contingency in a set of such contingencies. The Preventive Control can be one or more of the Preventive Voltage Rescheduling, Preventive Active Rescheduling and Preventive Load Shedding controls. Given a set of Non Solving Contingencies in step 280 that are to be considered in some determined or arbitrary sequence, Preventive Control for each control option can be attempted for all contingencies in the set before proceeding to determine if Preventive Control is possible for all of the contingencies for which the first control option does not obtain a loadflow solution using any or every possible simulation method as a list of contingencies or as shown in FIG. 12 for each individual contingency. Furthermore the sequence of Preventive Controls shown is by no means the only sequence that is possible for any contingency since one could employ adding generation through unit commitment or system design or could add additional voltage control devices as part of Operation Planning or System Design. Given the implementation shown, one would select the contingency in step 282 and then successively apply Preventive Voltage Rescheduling, Preventive Active Rescheduling and Preventive Load Shedding. If the contingency has a loadflow solution for a single snapshot, multiple snapshot approximation of a dynamic simulation, for the Increasing Percentage Simulation Method, or for any other simulation method for obtaining a solution for any preventive control option, it is recorded in step 290 without attempting any other control option. If the contingency has no loadflow solution via any and every simulation procedure for any control option it is passed to the next control option for determining a Preventive Control. If a contingency has no loadflow solution for a single snapshot or multiple snapshot approximation, for the Increasing Percentage Simulation Method or any other additional methods for simulating to obtain a solution after proceeding through all of the control options that could include Preventive Voltage Rescheduling of step 284, Preventive Active Rescheduling of step 286, or Preventive Load Shedding of step 288, one would record the contingency as having no Preventive Control and as being unsuccessful in the Preventive Control process of seeking a control that allows one to obtain a solution via simulation in step 292.

Figure 13:
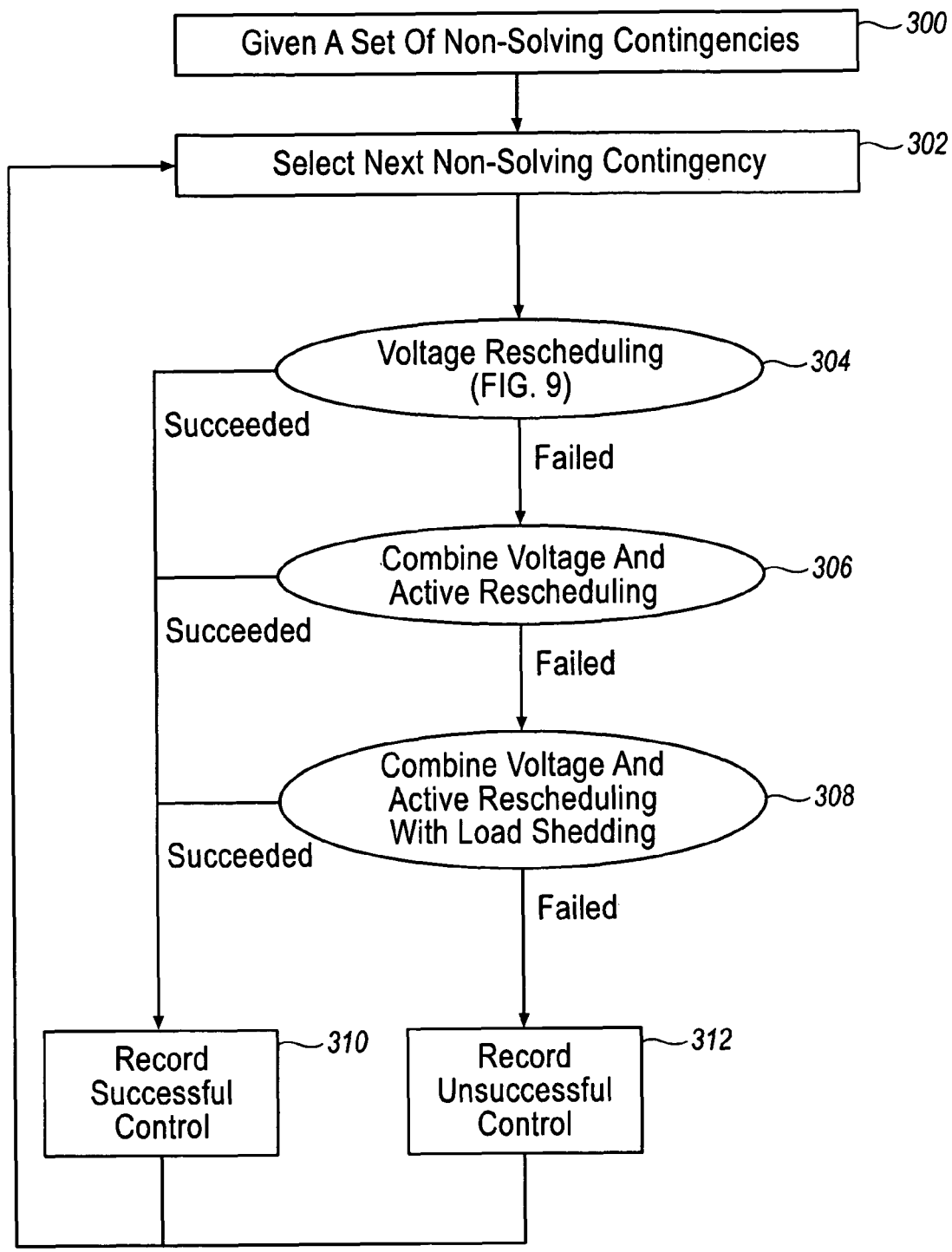
FIG. 13 is a flow chart of a procedure for performing combinations of Preventative Voltage Rescheduling, Preventative Voltage and Active Rescheduling, and Preventative Voltage and Active Rescheduling with Loadshedding.

FIG. 13 provides a procedure for performing combinations of Preventive Voltage Rescheduling, Preventive Voltage and Active Rescheduling, and Preventive Voltage and Active Rescheduling with Load Shedding as a means of obtaining a Preventive Control for every contingency. Given a Set of Non Solving Contingencies in step 300 that are to be considered in some determined or arbitrary sequence, Preventive Control for each combination of control options can determined for all contingencies in the set before proceeding to determine if Preventive Control is possible using another control option combination for all of the contingencies for which the first control option combination does not obtain a loadflow solution using any or every simulation method as a list of contingencies or as shown in FIG. 13 for each individual contingency. Furthermore the sequence of Preventive Control option combinations shown is by no means the only sequence that is possible for any contingency since one could employ adding generation through unit commitment or system design or could add additional voltage control devices as part of Operation Planning or System Design to produce additional control option combinations. Given the implementation shown, one would select the contingency in step 302 and then successively apply Preventive Voltage Rescheduling in step 304, Preventive Voltage and Active Rescheduling in step 306 and Preventive Voltage and Active Rescheduling with Load Shedding in step 308. If the contingency has a loadflow solution for a single snapshot, multiple snapshot approximation of a dynamic simulation, for the Increasing Percentage Simulation Method, or for any other simulation method for obtaining a solution for any preventive control option combination, it is recorded in step 310 without necessarily attempting any additional control option combinations. If the contingency has no loadflow solution for any control option combination, it is passed to the next control option combination for determining a Preventive Control. If a contingency has no loadflow solution for a single snapshot or multiple snapshot approximation of a dynamic simulation, for the Increasing Percentage Simulation, or any other additional methods for simulating to obtain a solution after proceeding through all control option combinations that could include Preventive Voltage Rescheduling of step 304, Preventive Voltage and Active Rescheduling of step 306, or Preventive Voltage and Active Rescheduling with Load Shedding of step 308, one would record the contingency as having no Preventive Control and as being unsuccessful in the Preventive Control process of seeking a control that allows one to obtain a solution via simulation in step 312.

Preventive Voltage and Active Rescheduling control combination could increase voltage setpoints on all generators in the control set and increase and decrease generation on subsets of the generators in the control set by any of the participation factors used for Preventive Active Rescheduling. Preventive Voltage and Active Rescheduling could increase voltage and active power via participation factors for the same set of generators and could decrease voltage setpoints and active power via participation factors on the same set of generators. The set of generators experiencing voltage and active power increase and the generators that experience voltage and active power decrease could be selected by the same procedure as used in Preventive Active Power Rescheduling. The participation factors for generators experiencing active power generation increase and the participation factors for generators experiencing active power generation decrease could be the same as for Preventive Active Power Rescheduling. Preventive Voltage and Active Rescheduling with Load Shedding could perform load shedding on an agent when all the generators belonging to the agent are in the Control Set.

Figure 14A:
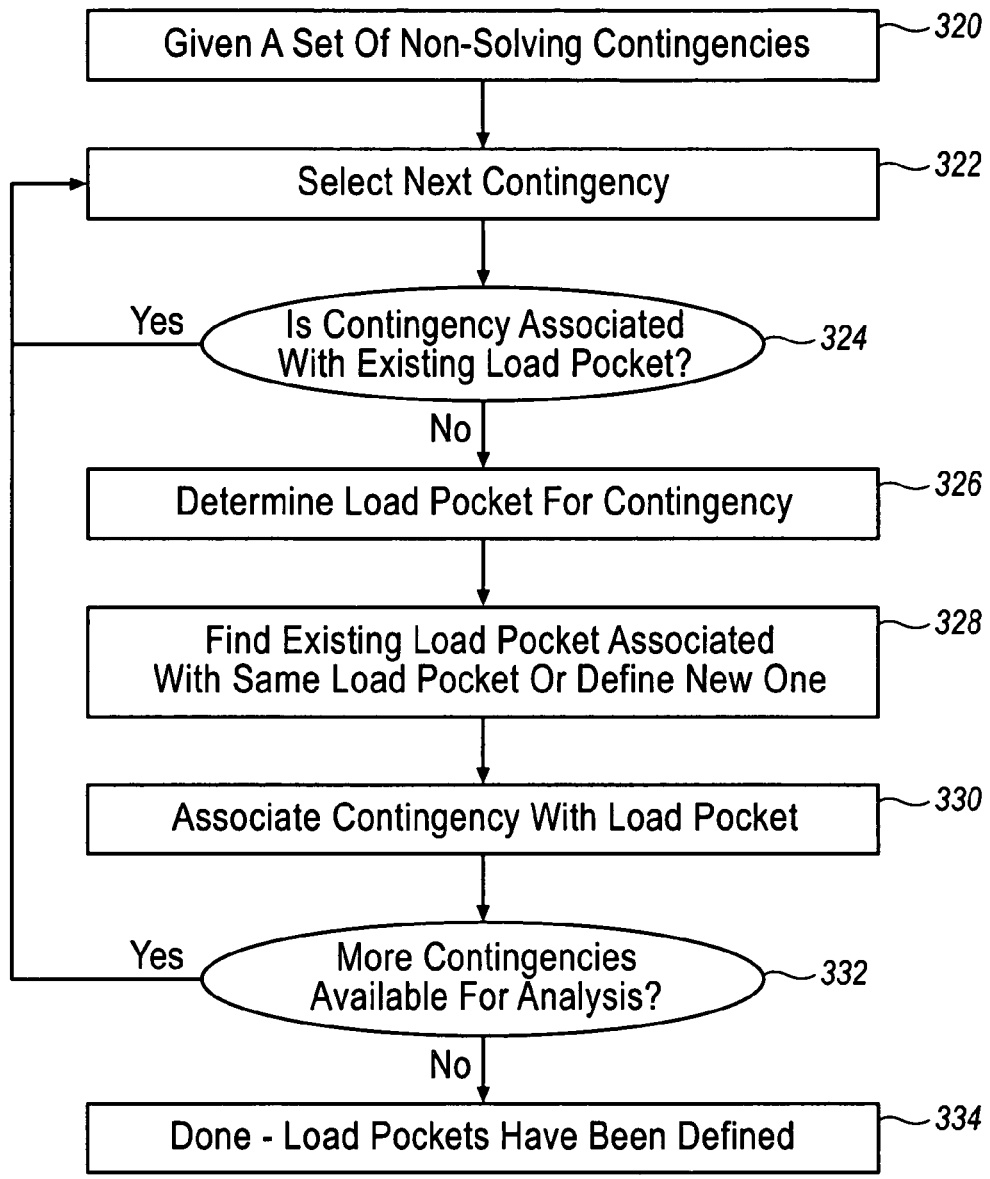
FIG. 14A is a flow chart for a procedure for associating non-solving contingencies with load pockets and thereby finding all of the load pockets for area and regional family subnetworks that are vulnerable to voltage instability.
Figure 14B:
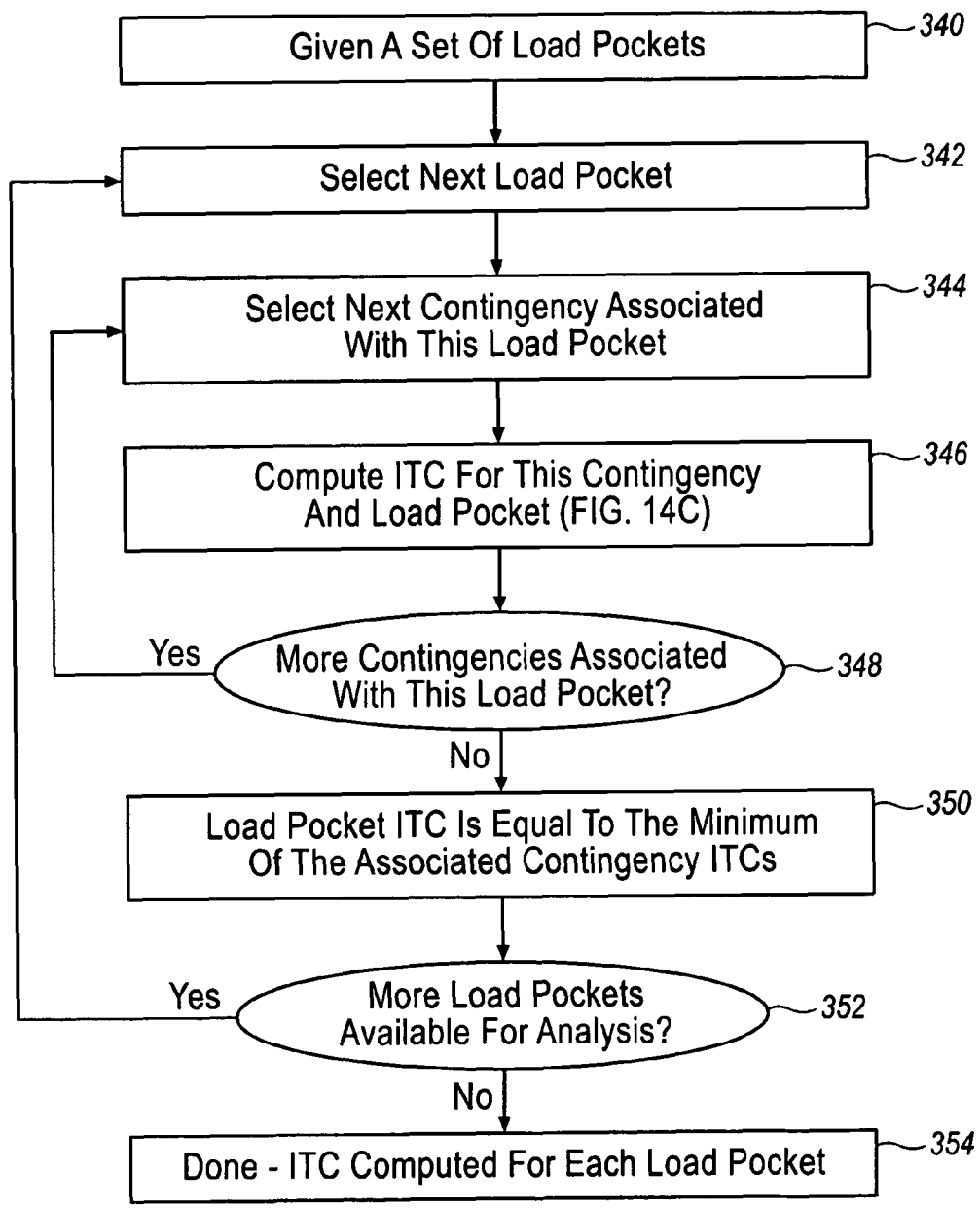
FIG. 14B is a procedure for calculating incremental transfer capability for a load pocket.
Figure 14C:
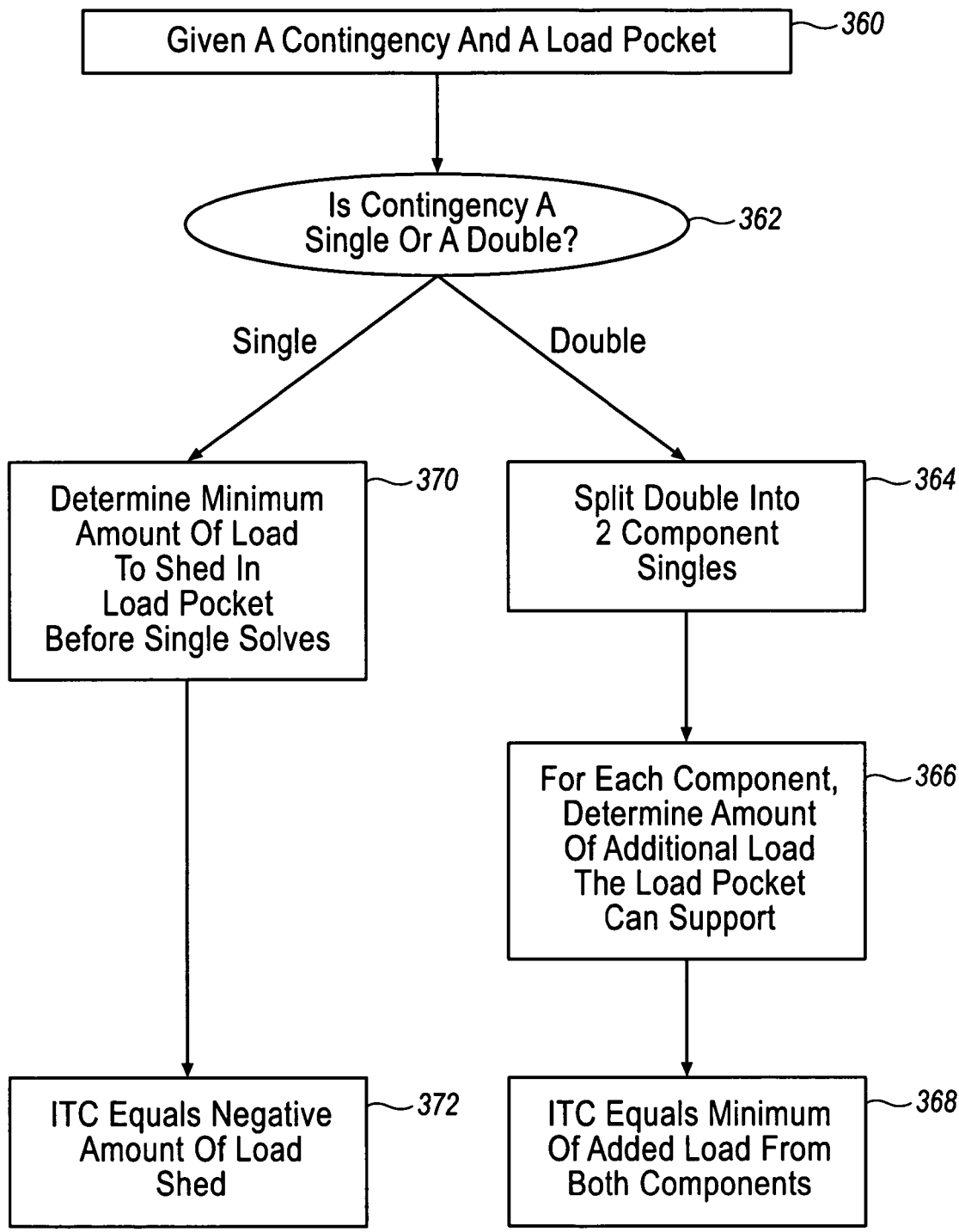
FIG. 14C is a flow chart for a procedure for determining incremental transfer capability for each single and double contingency that is vulnerable to voltage instability on a particular load pocket.

FIGS. 14A-C provide a procedure for finding all of the loadpockets or Area and Regional Family Subnetworks that are vulnerable to voltage instability in FIG. 14A, a procedure for determining Incremental Transfer Capability for each of the Single and Double Contingencies that are vulnerable to voltage instability on a particular load pocket in FIG. 14C, and finally the Incremental Transfer Capability for each Loadpocket in FIG. 14B. FIG. 14A selects a contingency in step 322 from a set of single and double contingencies that are given in step 320. In step 322 the load pocket is determined (a) based on an exhaustion factor such as discussed in step 54 or (b) an exhaustion factor obvious an expert in the field and an exhaustion factor criteria that determines which subnetworks belong to the impact region of a contingency that again would be obvious to an expert in the field for a specific system. The impact region is divided into family lines and families. The Area or Regional Subnetwork contains all the subnetworks in a family. The impact region for a contingency can contain one or more Area or Family Subnetworks. Step 326 determines the Control Region for the contingency based on the Preventive Control determined in FIG. 12 or 13. Step 324 determines if the control region and/or impact region for a contingency is similar to a load pocket for a contingency already evaluated and is identified as a contingency impacting that loadpocket in step 330. If the control region and/or impact region is not similar to that found for any other contingency evaluated, then an additional loadpocket is identified in step 328 and the contingency is associated with it in step 330. If there are additional contingencies that have not been identified as being associated with a loadpocket, then the procedure returns to step 322 and selects the next contingency. If all non solving contingencies have been identified with a load pocket, the procedure in FIG. 14A is complete. Loadpockets with overlapping Control Regions may require coordination of control with other loadpockets that share generators, voltage controls devices and loads. The control for each overlapping loadpocket must be modified with the possibility of adding to the Control Set for each loadpocket so that the control can obtain a solution for all contingencies associated with each load pocket.

FIG. 14B starts at step 340 having completed the procedure of identifying all loadpockets. Step 342 selects a loadpocket for computation of Incremental Transfer Capability. Step 344 first determines if there is any single contingency associated with the loadpocket since if there is a single contingency associated with the loadpocket, Incremental Transfer Capability will be negative and determined based on the amount of load that needs to be shed in the load pocket to determine a solution for every single contingency associated with the loadpocket. If there are no single contingencies that are associated with the load pocket, the procedure computes the maximum transfer of power or maximum loading of buses in subnetworks in the loadpocket using a PV curve where the generation response due to loading is a governor loadflow on generators in the utility, Transmission Operator, in the Control Region or in the Impact Region if the generators in the Control Region cannot pick up additional generation due to generation limits. The procedure for computing the maximum loading or transfer limit, required to be determined in step 346, is given in FIG. 14C. A test is made in step 348 to determine if there are additional contingencies associated with the loadpocket for which an ITC value has not been determined. If there are additional contingencies for which an ITC value has not been computed, the next single or double contingency is selected and an ITC value is determined from steps 344-348. If an ITC value is computed for every contingency (only singles if there are singles associated with the loadpocket and only double contingencies if there are no single contingencies associated with the loadpocket), then an ITC is computed for that loadpocket as the minimum ITC value for all contingencies for which an ITC value is computed and that are associated with the loadpocket in step 350. A test is performed to determine if there are any additional loadpockets in step 352. If there are additional loadpockets in step 352, a load pocket is selected in step 342 and the ITC is evaluated for that loadpocket using steps 342-350. If there are no additional loadpockets for which an ITC is to be computed in step 352 the procedure of FIG. 14B terminates having computed an ITC value for each loadpocket.

Having determined if there are single contingencies associated with the loadpocket in step 344 in FIG. 14B and either having determined all of the single contingencies for which an ITC value is to be computed or determined all the double contingencies associated with the load pocket if all of the contingencies associated with the loadpocket are double, then an ITC value is required to be computed for each of these contingencies in step 346. FIG. 14C shows the method of computing ITC given a specific contingency and load pocket in step 360. In step 362, the contingency is tested to determine if it is a single or double contingency. If the contingency is a single contingency, the Preventive Load Shedding Control is used to determine the minimum amount of load to shed in the control region before the single contingency has a loadflow solution. The variation in the amount of load to be shed based on factors other than generators that respond to the load shedding can be used to determine the Transmission Reliability Margin, and the variation due to governor response can be used in part to determine Capacity Benefit Margin for that contingency. If the contingency is a double contingency, the double contingency is split in two component single contingencies in step 364. The minimum amount of additional load or transfer into the control region before the loadflow has no solution for either component single contingency due to variation in governor response and due to such changes as power factor and load pattern variation is the ITC value for that double contingency. If load is scaled in the Control Region, the transfer could be the load increase minus the generation increase on the Control Region generation. The variation due to governor response can be taken in part within the Capacity Benefit Margin and the variation due to non governor response factors can be taken in part to determine the Transmission Reliability Margin for the double contingency.

Figure 15:
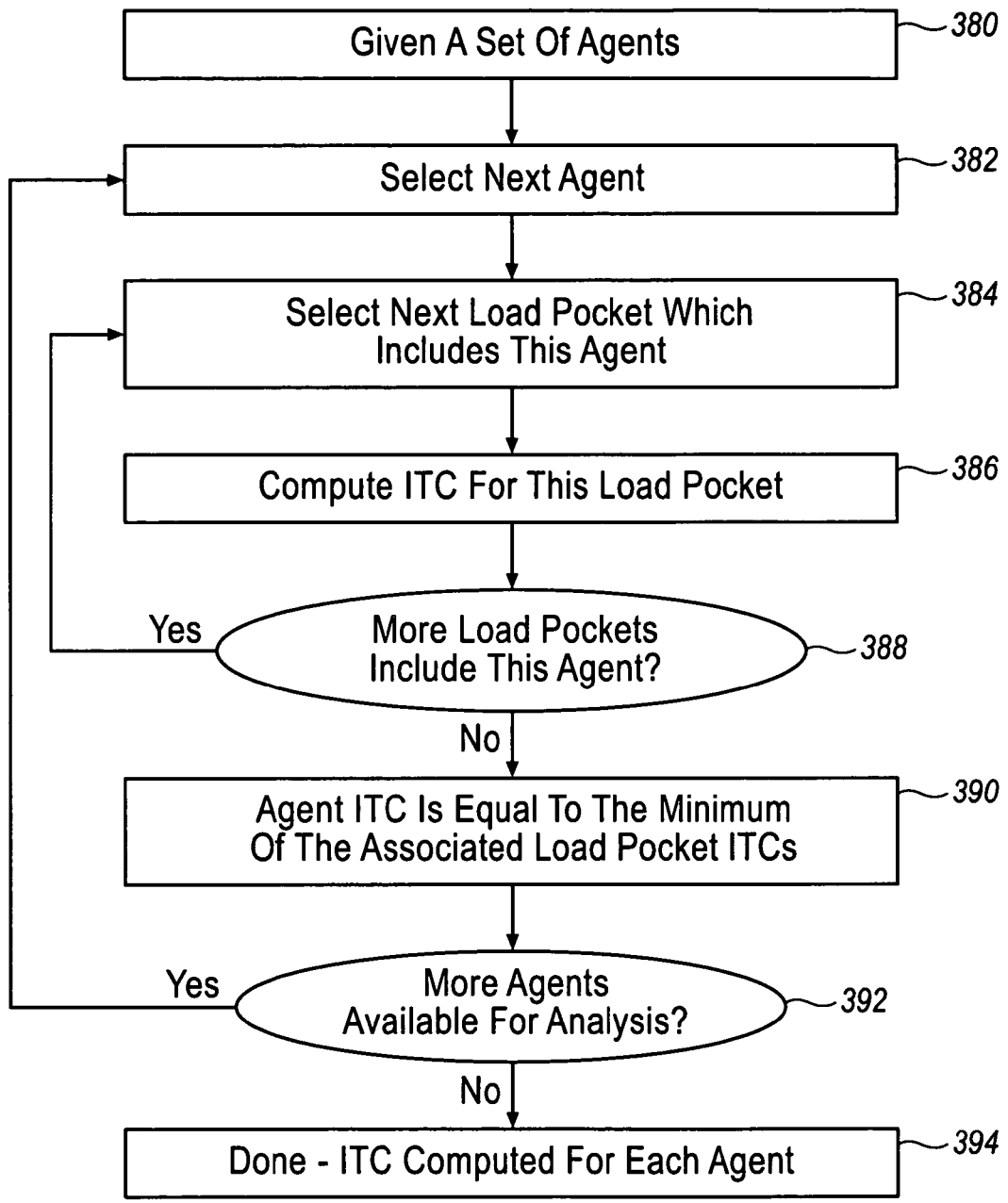
FIG. 15 is a flow chart for a procedure for computing incremental transfer capability for an agent that belongs to a regional or an area subnetwork.

FIG. 15 shows a procedure for computing Incremental Transfer Capability for an agent that is a regional or area subnetwork or belongs to one since the procedure in FIG. 14 is associated with the specific subnetworks in the control region of a load pocket. Although the load or transfer into the control region of a specific load pocket with one or more area or regional subnetworks is critical to obtaining a solution, one cannot ignore additional stress in other subnetworks in the loadpocket as being able to cause voltage instability. The procedure as shown in FIG. 15 requires a set of agents in one or more load pockets be given in step 380. A specific agent is selected in step 382. A load pocket is selected that contains this agent is determined in step 384. The ITC value for adding load to this agent that belongs to a specific load pocket is determined for all contingencies associated with the loadpocket and can be negative if there are single contingencies that have no loadflow solution in step 386. A test for additional loadpockets that contain this agent is conducted in step 388. If there are additional loadpockets, the Incremental Transfer capability is computed for that loadpocket using steps 384-388. If there are no additional loadpockets, Agent ITC is the minimum of the ITC values associated with the loadpockets that contain that agent in step 390. In step 392, a test is used to determine if there are additional agents for which an ITC is desired. If there are additional agents, the procedure of steps 382-390 is repeated, and if there are no additional agents for which an ITC is desired, the procedure terminates.

Figure 16:
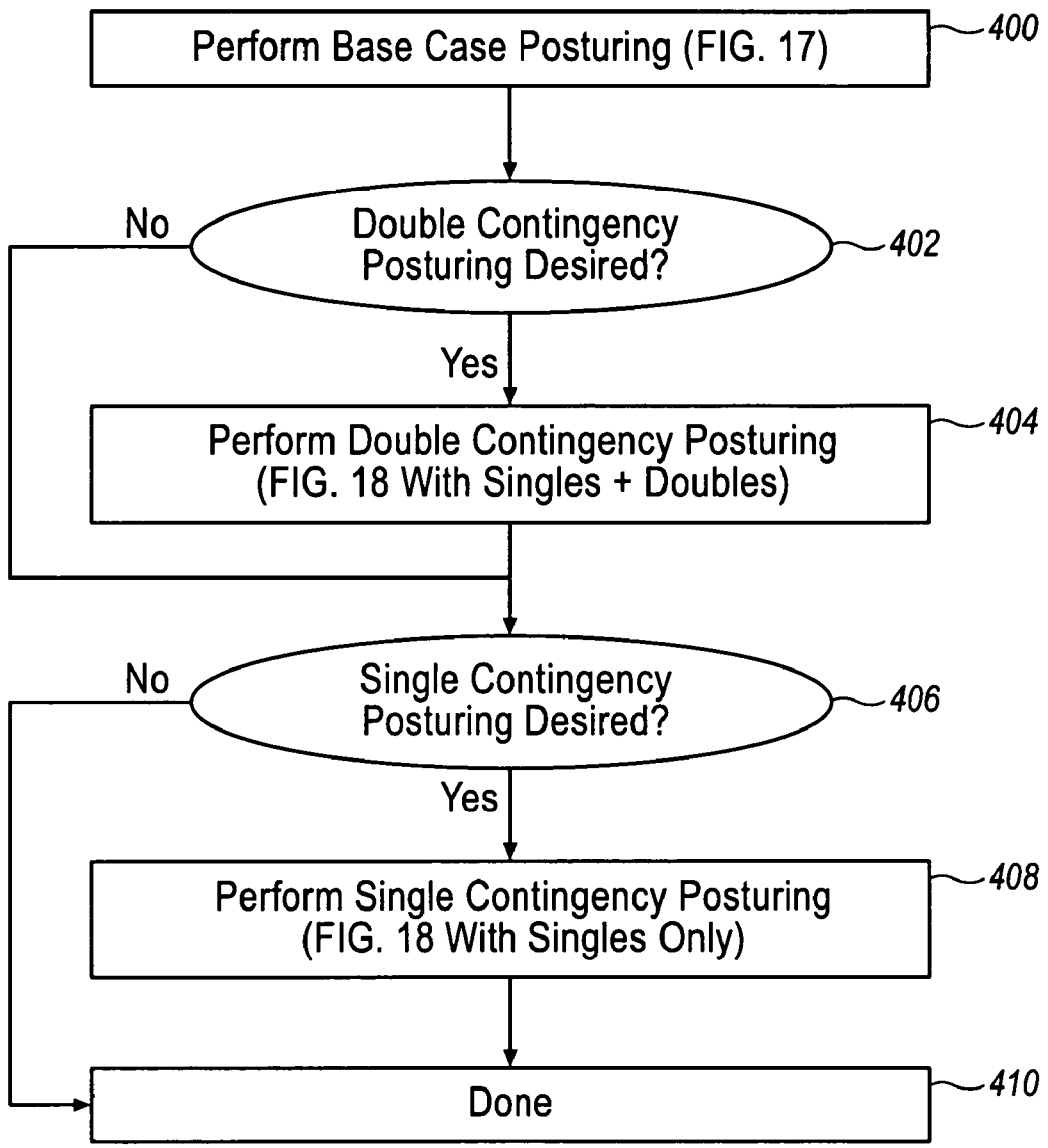
FIG. 16 is a flow chart of a procedure for posturing a system so that voltage instability will not occur for contingencies caused by one or more load pockets.

FIG. 16 shows a procedure for posturing a system so that voltage instability will not occur for contingencies caused by one or more loadpockets. Loadpockets can be determined using the procedure of FIG. 14A. Loadpockets such as Area and Regional Subnetworks are associated with voltage instability in several subnetworks contained in the loadpocket and for all cascading instability problems in the loadpocket. The Control Regions for all of these contingencies that affect the load pocket are contained in the loadpocket. The first procedure would attempt to perform posturing in the base case in step 400 using a procedure described in FIG. 17. A question on whether posturing is desired for double contingencies is asked in step 402 and if the answer is yes, the procedure given in FIG. 18 is implemented in step 404. A question on whether posturing is desired for single contingencies is asked in step 406 and if the answer is yes the procedure given in FIG. 18 is implemented in step 408.

Figure 17:
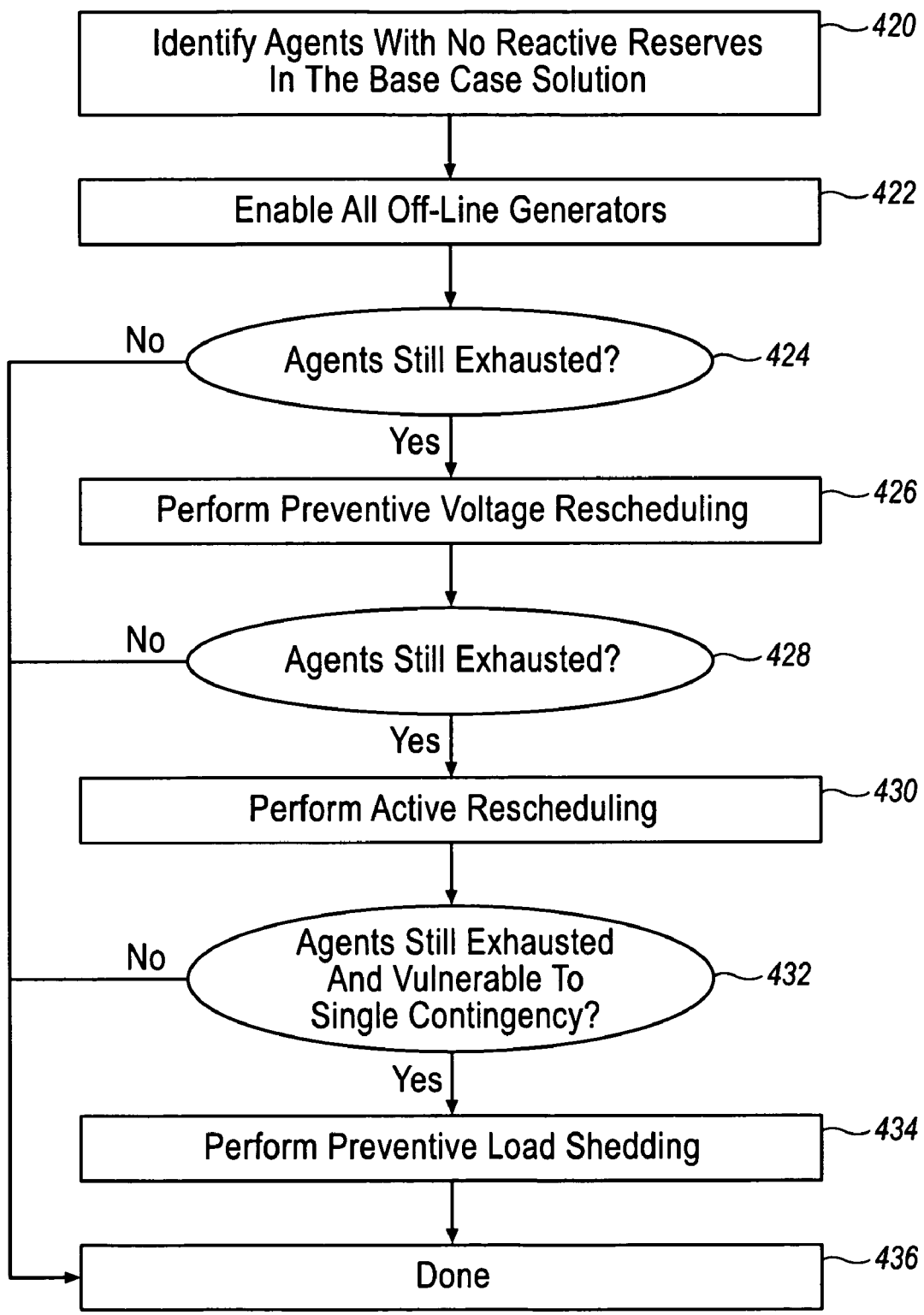
FIG. 17 is a flow chart of a procedure for Base Case Posturing.
Figure 18:
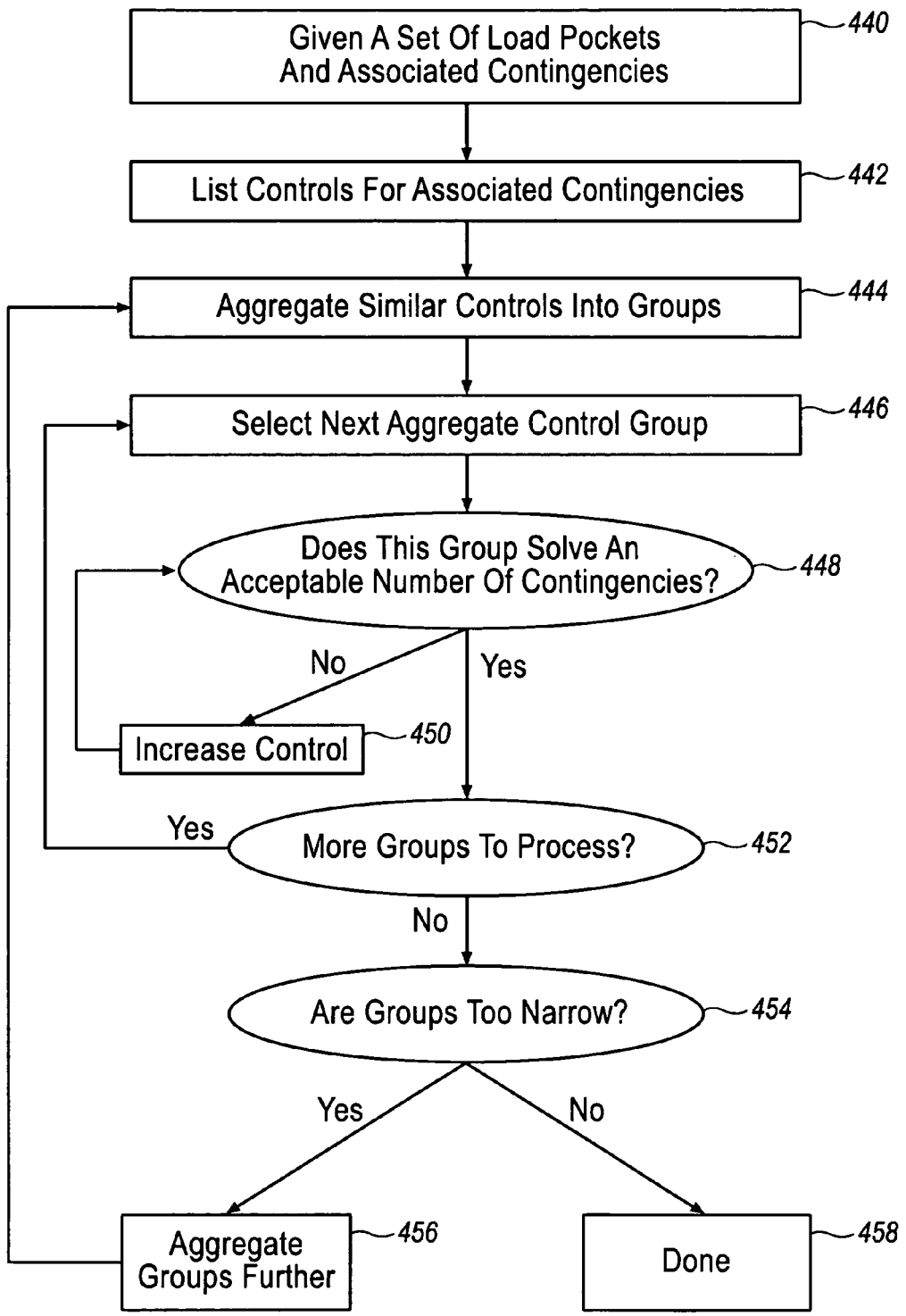
FIG. 18 is a flow chart of a procedure for associating controls with groups of load pockets.

FIG. 17 shows a procedure for Base Case Posturing. In step 420 all agents with no reactive reserves in the base case are determined. In step 422 all off line generators that belong to the same stations as generators belonging to the set of voltage control/reactive supply devices (a) that belong to the fully exhausted base case agents or (b) that belong to the same stations of generators that have fully exhausted reactive reserves and belong to the vulnerability region of fully exhausted agents are connected. This should dramatically reduce the number of contingencies with no loadflow solution. Generators are then added that are electrically close to the vulnerability region of regional subnetworks that cover a large number of buses and a large customer load and that contain some subnetworks that are fully exhausted. This should dramatically reduce the contingencies that have no loadflow solution. Adding generators close to the vulnerability region of regional subnetworks that have no fully exhausted subnetworks and that contain a large number of buses and a large load should reduce the number of contingencies that cause voltage instability on this subnetworks as well as the importance of the subnetwork which is proportional to the number of buses, generators, and load contained in the subnetwork. Finally adding generators close to area subnetworks that are contingency vulnerable and belong to the impact region of a large number of contingencies should reduce the number of contingencies for which voltage instability is produced, the reactive and active reserves on the subnetwork that indicates weakness, and possibly the importance of the network. The identification of loadpockets and the Control Regions for each contingency is a necessary step for determining postured control. This should dramatically reduce the number of equipment outages that cause these area subnetworks to belong to the impact region. An alternative to changing the unit commitment would be adding switchable shunt capacitors near the affected agents' generators that are fully exhausted or that are regional and contingency vulnerable as a operation planning change or as a system design change. In step 424, the agents that remain fully exhausted are identified and in step 426 Preventive Voltage Rescheduling is performed in an attempt to increase reactive reserves on these agents that remain fully or partially exhausted and thus reduce the number of contingencies that have no solution or that place the agent in its impact region. In step 428, the agents that remain fully exhausted are identified after adding generators or switchable shunt capacitors and performing voltage rescheduling. In step 430 Preventive Active Rescheduling is performed in an attempt to increase reactive reserves on these agents and thus reduce the number of contingencies that have no solution or that place the agent in its impact region. In step 432, a test is performed to determine if there are agents that are fully or partially exhausted or that lie in the impact region of single contingencies. In step 434, Preventive Load Shedding is performed in such agents to reduce the number of contingencies that have no loadflow solution or that are in the impact region for single and double contingencies.

FIG. 18 shows a postured control for a set of load pockets and associated contingencies given or determined in step 440.

In step 442, the controls for each of the contingencies associated with the load pocket are listed. In step 444, similar controls are aggregated into a groups of aggregate controls, where the aggregate control is scaled, contains all of the control action of similar but not identical control and may include additional control in the Control Region for the aggregate control than are part of the union of the controls used for any of the contingencies for which the aggregate postured control is successful in obtaining solutions. An aggregated postured control is selected for testing in step 446 and is tested for all contingencies associated with any of the controls that are aggregated in step 448. If the aggregate postured control solves all of the contingencies then the aggregate postured control is used for all of those contingencies. If the aggregate postured control is not sufficient to obtain solutions for all of the contingencies, processing continuously scales the control and adds additional controls to the Control Region in step 450 in an attempt to obtain solutions for all of the contingencies that have similar controls that are aggregated into a single postured control. Next it is determined if there are additional aggregated controls that have not been tested in step 452. If there are aggregate controls that need testing, steps 446-452 are repeated to test these aggregate controls. The possibility of further aggregating controls that are similar is assessed in step 454, and these more robust aggregate postured controls are formed and tested in step 456.

Once the single and double contingency analysis is performed and the boundary case solution's maximum percentage of the outage for each contingency has been identified, the flowchart depicted in FIG. 8 is used to determine the agents in the predicted control region where control can be performed in step 37 of FIG. 3. In step 37, if the agents are assessed according to the exhaustion of the reactive reserves, then control actions such as voltage rescheduling, active rescheduling and load shedding will be performed according to the agent severity rankings. The agents with the greatest exhaustion of reserves Y for each contingency are identified as the predicted control region for that contingency. A specific example is set forth below.

EXAMPLE 1

By way of a non-limiting hypothetical example, the above-described process is explained in conjunction with an example based on the Tables set forth below. In Table 1, the leftmost column identifies each specific bus of an area in the determined region of interest and buffer zone in the electrical power system that is under study. The middle column in Table 1 defines the actual loads on the respective buses listed in the Table. The rightmost column defines the reactive reserves or generators that are depleted at the point of maximum load for the specific bus using a stress test such as a VQ curve. For the purpose of this example, reactive reserves are listed only as generators. The generators A, B, C, D, and E referenced in the Table correspond to the generators listed in FIG. 5.

TABLE 1

Reactive Reserves of buses

| Bus # | Real Load (MW) | Gens Exhausted |
|---|---|---|
| 1 | 15 | A |
| 2 | 0 | B |
| 3 | 0 | B |
| 4 | 100 | A, C |
| 5 | 0 | A, B |
| 6 | 0 | A |
| 7 | 10 | A, B, C |
| 8 | 30 | B, D |
| 9 | 40 | B, D |

TABLE 1-continued

Reactive Reserves of buses

| Bus # | Real Load (MW) | Gens Exhausted |
|---|---|---|
| 10 | 200 | E |
| 11 | 0 | B, D, E |
| 12 | 10 | A |

The results in Table 1 above are used to group buses into agents as shown in Table 2 by finding buses that exhaust exactly the same set of generators at the point of maximum load for the bus.

TABLE 2

Reactive Reserves of Agents

| Agent Number | Buses Included | Shared Generators | Load on Agent (MW) |
|---|---|---|---|
| 1 | 7 | A, B, C | 10 |
| 2 | 4 | A, C | 100 |
| 3 | 1, 6, 12 | A | 25 |
| 4 | 5 | A, B | 0 |
| 5 | 2, 3 | B | 0 |
| 6 | 8, 9 | B, D | 70 |
| 7 | 11 | B, D, E | 0 |
| 8 | 10 | E | 200 |

Each generator is defined as shown in Table 3 according to its Qgenbase, Qmax and Qmax−Qgenbase, as is described in the previous sections.

TABLE 3

Base case reactive values of Generators (before Contingency)

| Generator ID | Qgenbase (Mvar) | Qmax (Mvar) | Qmax−Qgenbase (Mvar) |
|---|---|---|---|
| A | 500 | 1000 | 500 |
| B | 0 | 10 | 10 |
| C | 90 | 100 | 10 |
| D | 25 | 100 | 75 |
| E | 50 | 200 | 150 |

Next, all single contingencies are analyzed by sequentially outaging elements such as lines, generators, transformers, and buses to calculate the reserves on generators after an outage has occurred. The results of this analysis for this hypothetical contingency, which will be referred to as contingency F, are shown in Table 4.

TABLE 4

Effects of a contingency F on the reactive output of generators

| Generator ID | QgenBase (Mvar) | QgenOutage (Mvar) | Qmax (Mvar) |
|---|---|---|---|
| A | 500 | 500 | 1000 |
| B | 0 | 10 | 10 |
| C | 90 | 50 | 100 |
| D | 25 | 100 | 100 |
| E | 50 | 150 | 200 |

The values are then summed for each agent and the exhaustion factor for this hypothetical contingency is then calculated by using the summed values in equation 1 for each agent as shown below.

Reactive Remaining Exhaustion Factor 1 = Eq. 1

$$\left(\frac{Q\max - QgenOutage}{Q\max - QgenBase}\right) \cdot 100$$

Reactive Remaining Exhaustion Factor 2 = Eq. 2

$$\left(\frac{Q\max - QgenOutage}{Q\max - QgenBase}\right) \cdot 100 \cdot \langle QgenOutage - QgenBase\rangle$$

The reactive remaining exhaustion factors #1 for each agent for contingency F are shown in Table 5.

TABLE 5

Exhaustion Factors for Agents for Contingency F.

| Agent Number | Shared Generators | QgenBase (Mvar) | QgenOutage (Mvar) | Qmax (Mvar) | Exhaustion Factor |
|---|---|---|---|---|---|
| 1 | A, B, C | 590 | 560 | 1110 | 105% |
| 2 | A, C | 590 | 550 | 1100 | 107% |
| 3 | A | 500 | 500 | 1000 | 100% |
| 4 | A, B | 500 | 510 | 1010 | 98% |
| 5 | B | 0 | 10 | 10 | 0% |
| 6 | B, D | 25 | 110 | 110 | 0% |
| 7 | B, D, E | 75 | 260 | 310 | 21% |
| 8 | E | 50 | 150 | 200 | 33% |

The agents can then be assessed according to reactive remaining exhaustion factor at shown in Table 6.

TABLE 6

Table of Agents Assessed on Exhaustion Factor for the Contingency F

| Agent Number | Exhaustion Factor | Load (MW) | Included Generators |
|---|---|---|---|
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

Following the same procedure, another table of data similar to that of Table 6 is defined below in Table 7 for two more hypothetical single contingencies (G and H). The sample exhaustion factors for each are provided and could be derived in a similar manner, but will be omitted to avoid redundancy. Also, data for contingency F is provided from Table 6 for convenience.

TABLE 7

Exhaustion factors for hypothetical single outages F, G and H

| Agent Number | Exhaustion Factor F | Exhaustion Factor G | Exhaustion Factor H | Load (MW) | Included Generators |
|---|---|---|---|---|---|
| 5 | 0% | 60% | 100% | 0 | B |
| 6 | 0% | 50% | 5% | 70 | B, D |
| 7 | 21% | 0% | 5% | 0 | B, D, E |
| 8 | 33% | 30% | 10% | 200 | E |
| 4 | 98% | 100% | 0% | 0 | A, B |
| 3 | 100% | 110% | 20% | 25 | A |
| 1 | 105% | 10% | 40% | 10 | A, B, C |
| 2 | 107% | 20% | 50% | 100 | A, C |

In a realistic study, these reactive remaining exhaustion factors are computed for all single outages within the region of interest, but this example will contain only F, G and H. The skilled artisan will then select values of X % and N indicating that single contingencies which exhaust at least Y=(100−X) % of the reactive reserves (or has less than X % of its reserves remaining) of N agents will be considered for double contingency analysis. A sample tool to aide this selection process is defined in Table 8.

TABLE 8

Aid in selecting double contingencies based on the exhaustion factors of single contingencies from Table 7

|  | 1 Agent | 2 Agents | 3 Agents | 4 Agents | 5 Agents |
|---|---|---|---|---|---|
| 0% | FGH | F |  |  |  |
| 10% | FGH | FGH | H | H |  |
| 20% | FGH | FGH | FGH | H | H |
| 30% | FGH | FGH | FGH | GH | H |
| 40% | FGH | FGH | FGH | FGH | H |
| 50% | FGH | FGH | FGH | FGH | GH |
| 60% | FGH | FGH | FGH | FGH | GH |
| 70% | FGH | FGH | FGH | FGH | GH |

For the purposes of this example, a tool with N=1-5 and X %=0%-70% in steps of 10% has been provided. It is possible to increase or decrease any or all of these values to create a much larger and more granular set of cells. The outages placed in each cell represent the pool of single outages that would be combined to make double outages if that particular cell is selected. If N=3 agents is selected as well as X %=30, then, using Table 8, the single outage pool would consist of the set {F, G, H}. These are then combined to create all possible combinations M*(M−1)/2. In this case M=3, so the number of combinations is 3, namely FG, FH and GH. In this example, these three double contingencies will be simulated. In a more realistic example, there would be hundreds or thousands of single outages in each cell, but this example only shows a trivial number. The procedure for a particular X % and N selection will not in general find all double outages that have no solution. Increasing X and decreasing N will cause more double outages to be evaluated is one procedure. Another is to perform the step of selecting X and N twice and add the non overlapping outages in the two set. The second selection might be N=1 when the first selection was N=3. There are several possible methods for determining all the outages have no solution that would be apparent to the skilled artisan.

Once the pool of single and double contingencies has been simulated, those that are determined to be potential causes for voltage collapse, local blackout or voltage instability are identified. One possible way to make this determination is by choosing the set of single contingencies as well as the set of double contingencies that were unable to reach a solution to the load flow equations when outage is simulated but the increasing percentage method and the maximum percentage of the outage remaining in the system is not equal to zero. Other possible determinations for this measure are available to the skilled artisan.

The set of contingencies that have no solution when simulated as an increasing percentage of the outage is removed are then analyzed at the maximum percentage outage threshold (boundary case solution) to find agents with the largest percentage of their reactive reserves exhausted based on the exhaustion factor in the same manner as that which led to Table 6. This is performed in step 37a. Note that Table 9, which shows the agents assessed based on percentage exhaustion, is the same as Table 6. This may not be the case in reality as single or double outages that have boundary case solution when some percentage of the outage has been removed does not generally allow the reactive reserves on agents to remain unexhausted in the exact same percentages as a single contingency that has a solution.

Referring to step 38 in FIG. 3, the results of the exhaustion factor ranking are used to identify remedial actions, such as shedding load, adding new generation, rescheduling active power on existing generation or rescheduling voltage for strengthening the electrical power system in critical locations. More specifically, by knowing the specific agents that are the most completely exhausted, one can determine the generators where control actions should be taken as well as the specific loads that could be shed to obtain solutions to the load flow equations. For example, from Table 9 above, it can readily be determined that agents 8, 7, 6, and 5 are depleted by a large percent and belong to a predicted control region. As such, these predicted control region agents may be characterized as critical agents and critical agents with buses that have load contained therein may be referred to as load pockets, as the reactive reserves of the agents are depleted beyond a significant amount. The actual amount needed to characterize an agent as a critical agent may be determined arbitrarily depending on system tolerances. For purposes of this example, agents depleted beyond 50% will be considered as critical agents belonging to the predicted control region. However, one skilled in the art will readily recognize that variations from the percentages provided in this application may be chosen to define critical agents in the predicted control region.

The order in which control actions are taken for critical agents in a predicted control region can be in the assessed order of the reactive remaining exhaustion factors (note that there are different possible methods for computing the exhaustion factors as noted earlier). This could be the order in which the reserves are exhausted. Thus, performing control on agents in this order attempts to obtain solutions on agents in the same order as their exhaustion of reactive reserves or where the impact of the exhaustion is greatest. This procedure works very well as the agents that exhaust first or are impacted greatest cause cascading exhaustion of reserves and presumably instability. Thus, if control can provide reverses on these agents, one has presumably addressed the problem at its source. Another method can be used is to perform control action at larger agents in family lines with non-zero exhaustion factors as voltage collapse can eliminate the ability to obtain reactive supply to the most impacted agents as determined by exhaustion factor. This method also provides solutions and has been effective when the exhaustion factor ranking method for deciding agent control priorities does not obtain solutions. The method uses an exhaustion factor control that increases reserves in the most impacted agents identified by ranking of the exhaustion factors, but would use the additional control in large agents in the different family lines to obtain solutions. Finally one could attempt control in order of the largest to smallest exhaustion factor agents. This process attempts to reverse the cascading rather than track the cascading as in the first method. Other methods of determining the order of agents where control actions are tried as will be determined by the skilled artisan.

TABLE 9

Hypothetical Exhaustion Factors for non-solving double contingency GH

| Agent Number | Exhaustion Factor | Load (MW) | Included Generators |
| --- | --- | --- | --- |
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

The associated generators for the predicted control region critical agents, 5, 6, 7 and 8 are primarily B and D (as well as E). Accordingly, referring to Table 2, we can readily see that buses associated with these particular agents are 2, 3, 8, 9, 10 and 11. However, only buses 8, 9 and 10 have real loads associated with them. As such, one solution to strengthen electrical power system is to shed the loads on these buses in response to this specific contingency in increasing magnitudes until consecutive solutions to the load flow equations are obtained. It is desirable to obtain many consecutive solutions for increasing control changes. Corresponding reductions in generation can be performed by reducing the generation at the swing bus, by governor load flow or by decreasing generation on specific generators such as those where high reactive losses are observed or where reactive output is greatest. However, one skilled at the art may be able to find other suitable methods for selecting generators for reduction. The load pocket of agent 6 may be the control region if load shedding at buses 8 and 9 in increasing percentage have consecutive solutions. If one can not obtain consecutive solutions, one might select a control region of loadpockets 6 and 8. One can increase the number of load bearing agents in the control region until one obtains consecutive solutions from which a load shedding control is selected as nearer the center of the set of consecutive solutions.

It is desired to modify the controls of a minimum number of generators that belong to a control set. However, a small number may not be sufficient to obtain solutions to the load flow equations. In this case, the number of generators added to the control set can be increased. The process of establishing the sequence of generators of an agent that is added to the control region that are added to the control set must be decided for each control region agent. The sequence of agents added to the control region must also be decided and is sometimes based on the ranking of the reactive remaining exhaustion factors for the agents in the predicted control region. The sequence of generators added to the control set in each agent that belongs to the predicted control region can be based on those with higher capacities or loading factors. The above example can be applied to a selection of generators on which voltage rescheduling is performed. Since it is determined that the generators for the most affected agents above are B, D and, to a lesser extent, E, voltage rescheduling would be performed by increasing or decreasing the voltage setpoint in small steps until several consecutive solutions to the load flow equations are found. The control used should be robust and could be taken at or near the center of the consecutive set of solutions. Care is taken with this increase to not violate physical voltage limits of the generators. If the voltage is increased or reduced, one must monitor reactive reserve in the control set of voltage control/reactive supply devices to see that it is increasing in total if not on each agent and every generator. If only one generator belonging to one agent is desired for the control region, we look to the most exhausted agents to decide the sequence of generators added to the control set. It is determined that generators B and D are candidates belonging to the control region composed of agents 5 and 6. However, since generator D has 100 Mvars of capacity and generator B has 10 Mvars, we may choose to select D as belonging to the control set since it has the larger reactive supply capability. If no suitable solutions can be found with one generator, two could be tried. In this case, D and B are selected as belonging to the control set and voltage setpoints are increased on both together or in series until consecutive solutions are obtained. If a third generator is required, E would be selected because it appears in the next most exhausted agent. Voltage rescheduling could increase the voltage setpoints on all generators in the control set sequentially or simultaneously until voltage limits are reached on a generator at which point that generator is maintained at its voltage limit.

Active power rescheduling can be performed on generators that are selected by the same method that is used in voltage rescheduling. Agents are added to the control region based on ranking of remaining exhaustion factors. Active power is reduced on a subset of generators selected to be part of the control set so that they supply large reactive losses on paths to the load pockets and active power is increased on the remaining generators in the control set that supply relatively small reactive losses on paths to the load pocket. The subsets of generators that experience increase and those that experience decrease are selected so that total increase in power on generators that experience increase and the total decrease on generators that experience decrease are about the same, which maximizes the amount of transfer possible. These subsets are not selected so that large reactive losses would be incurred on generators experiencing increase in active power to accomplish the transfer. The active power generation on generators that experience increase can only be increased on a specific generator until the active power generation level on that generator reaches the maximum active generation capability, and then the active power generation on that generator is maintained at that maximum generation capability level. Similarly, the generators that experience active power decrease can only be decreased on a specific generator until the active power generation on that generator reaches its minimum active power generation capability, and then the active power generation on that generator is maintained at the minimum active power generation capability. The level of transfer is increased progressively until consecutive solutions are obtained for increasing transfer level or until the reactive reserve on the generators in the control region, control set or impact region achieve a specific level and a loadflow solution is obtained.

The participation factors for this transfer are determined experimentally by determining the incremental change in reactive supply on generators in agents belonging to the control region for the same incremental increase in active power or voltage on each generator in the set. The subset of generators that decrease active power in the set of generators being used for control and the subset of generators that experience active power decrease depends on which generators have the largest increase in reactive losses and those that have the smallest increase in reactive losses on all generators in the network or the reactive power supplied by the specific generator. The participation factors for the subset of generators that have an increase in power to accomplish a particular level of power transfer are proportional to the increase in reactive losses, and the participation factors for the subset of generators that decrease generation are based on the reciprocal of reactive losses incurred on the generators. The loading factor for generators in terms of active or reactive power can be used for grouping the generators that have active power generation decrease and those that have active power generation increase and for determining the participation factors for each subset of the generators being used for control in place of reactive losses or reactive generation. The transfer level is increased until consecutive solutions are obtained and a control is used that is nearer to the center of the consecutive solution set. Removing active power on these paths with large reactive losses can be quite effective in obtaining loadflow solutions.

A combination of voltage rescheduling and active rescheduling can also be performed to achieve robust control for a any contingency and postured control that is robust for a subset of the contingencies that cause voltage instability, voltage collapse or local blackout. The desire is to use the smallest level control actions on the minimum number of generators in the control set possible to obtain consecutive solutions for incremental changes in control. It should be noted that voltage decrease on generators with active power decrease and voltage increase on generators with active power increase can even more dramatically reduce reactive losses and obtain loadflow solutions. The coordination of voltage rescheduling control for outages where control is undertaken in different control set of generators belonging to agents in different control regions is anticipated since obtaining a solution for equipment outages affecting more than one family line may work well but be deleterious to obtaining solutions for outages affecting more than one family line as well as but where one or more family lines overlap. What works well in one control set of generators in one control region for the outages where control obtains solutions may complicate obtaining solutions for outages impacting another control region set of agents. The posturing control would possibly provide a modest change in voltage setpoint on a shared subset of the control set for the two control regions that does not cause too much harm for one control region in obtaining solutions and perhaps much benefit to the other control region in finding solutions. Coordination of voltage control can be performed to produce a posturing control where the controls in the control set for shared family lines can be on active power for one subset of controls in the control set in one control region and voltage setpoint for the other subset of controls in control set in the shared family lines of two control regions The posturing control can also be effective for a subset of the contingencies that have no loadflow solution and utilize this control region or a similar one with fewer or additional agents in each family line. A single posturing control would enable robust preventive control for an entire set of contingencies belonging to multiple similar control regions by adding additional members of different family lines to the control region and the active power and voltage of these generators of these agents to the control set. One can expand the control regions for each set of outages with somewhat different control regions and hopefully overcome the problem in that manner as well. The techniques for active power rescheduling, voltage rescheduling and even load shedding can be performed in various different combinations that are apparent to the skilled artisan.

In addition to identifying the solutions for one particular contingency, the present invention is directed toward developing a postured control for a subset of contingencies that cause voltage instability, voltage collapse, or local blackout by selecting specific contingencies and agents which need to be fortified for proper operation of the voltage control system. The solutions to these specific outages may provide solutions to outages that affect the same agents, family lines and families. The number of outages typically found that have no solution when simulated by removal of the equipment in small steps is large. There can be solutions that require very little control in a very small control region of agents and a small set of controls. These outages are called parametric outages that suggest that the blackout is not severe as measured by the contingency measure and the control change is not large so it can be ignored as a cause of blackout. This is particularly true if one can show that when controls are found in large control regions for a few outages with severe contingency measures, the use of those controls as a posturing control for the system as prototype controls can lead to solutions of all other outages that cause voltage collapse for less severe outages using controls in a subset of the larger control set. One would be developing a posturing control rather than a preventive, corrective and emergency control for each outage that has no loadflow solution. The posturing control would also add agents in family lines and families, add control from additional agents in the control region to the control set, coordinate voltage control or active power rescheduling control so only effective control in one or both control regions with no deleterious effect in the other control region is used when there are shared family lines in two control regions, and where power rescheduling control is used for one control region and voltage control is used in the other control region from controls in shared family lines in the two control regions. The removal of the Base Case Blackout Region through posturing by rescheduling of generators, voltage rescheduling and active power rescheduling is another application of posturing. The inventors of the present invention have recognized that the interrelationship between the severity of the outage in producing reactive losses in certain agents and the groups of buses, or agents, and their generators that experience exhaustion of reactive reserves are many times responsible for determining how far the cascading occurs. This would suggest why a posturing control could be successful.

Accordingly, the vulnerability region for an agent can be defined as all of the buses associated with that agent combined with all of the buses associated with all of the children of that agent or with the family of that agent. For example, in the illustration depicted in FIG. 5, the vulnerability region for agent 1, which is the voltage instability regions of all agents in all agents in all family lines leading to that agent, includes all of the buses in agents 1, 2, 3, 4, and 5. Now referring to Table 2, the buses that comprise the vulnerability region for agent 1 are therefore, 1, 2, 3, 4, 5, 6, 7 and 12.

For a large system, however, which may include tens of thousands of buses, agents and generators, determination of the critical agents in predicted control region, vulnerability regions and critical generators is not very easy. Accordingly, determining the correct solution as to which generators, which agents or other components should be fortified may be difficult. Therefore, the inventors of the present invention have determined that the algorithm as set forth below may be used to identify critical contingencies and critical agents.

$$C_i = \sum j \frac{P_j(-1 + \% \ reactivereservesremaining_{ij})}{1 - \% \ outageremaining_i} \quad \text{Eq. 2}$$

$$A_j = \sum i \frac{P_j(-1 + \% \ reactivereservesremaining_{ij})}{1 - \% \ outageremaining_i} \quad \text{Eq. 3}$$

The factor $\frac{(-1 + \% \ reactivereservesremaining_{ij})}{1 - \% \ outageremaining_i}$ at the boundary case solution is a projection of the reactive reserves remaining in agent j for contingency i if the full removal of the equipment, which is impossible to lack of a loadflow solution, is presumed to result in a linear exhaustion of the reactive reserves of agents. One could limit the factor to the maximum of $$-1 \ \text{and} \ \frac{P_j(-1 + \% \ reactivereservesremaining_{ij})}{1 - \% \ outageremaining_i}$$

so that the factor never is less than −1. The Blackout Region for a contingency are the set of agents where the factor is less than −1 and the Projected Blackout Region or Impact Region is all agents where the factor is less than −0.5. The Projected Blackout Region is less conservative than the estimate of the agents belonging to the Blackout Region where the estimate is linear despite the knowledge that as the system approaches the boundary case solution the reactive losses and the reduction of reactive reserves in agents occurs nonlinearly. Since one presumes that reactive losses would increase nonlinearly beyond the Boundary Case Solution where the projection is made because there is no loadflow solution beyond this point, the Projected Blackout Region is possibly more accurate reflection of the agents that would experience blackout for that contingency.

The numerator of the term being summed is equal to the reactive reserve reduction in agent j due to contingency i and is generally negative but can be positive for agents where the reactive reserves are totally or near totally exhausted either because there is very little reactive supply in the agent or the reactive voltage scheduling causes almost total exhaustion of the reactive reserves. These positive terms have very little effect on a contingency measure that is very negative for the worst outages that exhaust a far larger percentage of the reactive reserves than the percentage of the outage removed that is the denominator of the terms being summed in equations 2 and 3. The outages or contingencies that are most severe quickly exhaust a large percentage of the reactive reserves in several agents for the part of the outage removed, and thus the terms being summed can be quite negative for agents affected by the outage i. In Eq. 2, $C_i$ represents the measure ranking of the contingency i, and $P_j$ is the total power generation or load associated with the agents. The load is the preferred implementation since it indicates which agents have load since the agents with no load have no contribution to the contingency measure and have no agent measures. The worst contingencies project a large negative multiple of $P_j$ for the term that is summed on agents.

The measure $A_j$ can be quite positive for some agents, indicating the agents with very little reactive supply or that have very little reactive reserves due to scheduling on generators, voltage setpoint, active power, etc. This is called the Base Case Blackout Region and makes a region vulnerable to outages that have no solution and can cause cascading voltage instability along a family line because its reserves are exhausted in the base case. The cascading instability is expected to be initiated in family lines containing these agents. Posturing control via unit commitment rescheduling, voltage and reactive rescheduling, active power rescheduling, and shunt capacitor rescheduling can (1) remove the vulnerability of this Base Case Blackout Region as well as (2) prevent blackout for all equipment outages that cause blackout by sequentially exhausting the reactive supply on all agents in a family line that is impacted by a large number of equipment outages or very severe outages as measured by $C_i$. The agent measures that are very negative are far larger in absolute magnitude than those that have positive magnitude. The agents that have extremely negative measures indicate regions that incur very large reactive losses compared to the reactive reserves associated with the agent and thus quickly cause a lack of solution when a small percentage of the outage is removed. The agents with very negative measures require either more reactive supply through unit commitment changes to match the reactive losses incurred, active power rescheduling and voltage rescheduling to reduce the reactive losses, additional FACTS (Flexible AC Transmission System) or switchable shunt capacitors to reduce reactive losses via better voltage control through maintaining reserves and increasing reserves on existing generators in those agents, improved transmission to reduce voltage and phase changes that cause reactive losses, or additional active generation to reduce reactive losses on supply reactive and active power to the agent. The agent with positive reactive values needs more reactive supply and the same type of enhancements may be necessary as are required for agents with very negative measures.

In Eq. 2, $C_i$ represents the measure ranking of the contingency, and $P_j$ is the total power generation or load associated with the agents. In Eq. 3, $A_j$ is the measure for ranking of the agent. As such, $C_i$ is used to form a matrix for determining the critical contingencies, which are the contingencies that have the most dramatic effect on the electrical power system. $A_j$ is used to form a matrix to identify the critical agents that experience and produce the most dramatic effect of voltage instability on the electrical power system. The contingency measure and agent measure are proportional to load and thus are an economic measure proportional to dollars lost per blackout or dollars lost for outages that cause blackout due in part to agent i. If the Contingency measure is multiplied by the probability of the outage, one has a risk measure. With the Agent measure, which is summed over the existing consequence measure for the agent for that contingency times the probability of the equipment outage, one has a risk measure for that agent. These economic risk measures could help make decisions on where and when to make enhancements to the system through rescheduling or investment. The agents in the Base Case Blackout Region also require enhancement either through scheduling changes or through investment.

Available Transfer Capability

An Available Transfer Capability is an active power security constraint that indicates when too much power is being imported into a load bearing agent, a control region, or load pocket that is vulnerable to voltage collapse, local blackout and voltage instability if pre-specified single and double outages occurred. A security constraint is a constraint on the operation of a utility that, if satisfied, will prevent a thermal overload voltage limit violation, or prevent a voltage instability, voltage collapse or blackout from occurring in response to one or more contingencies.

Each load pocket has its own Available Transfer Capability Security Constraint based on the equipment outages or contingencies that cause it to experience voltage collapse, local blackout, or voltage instability. An Available Transfer Security Constraint is a security constraint that requires that ATC (available transfer capability) for a particular loadpocket be greater than zero.

Rather than attempting to find the security constraint for each equipment outage that can cause voltage collapse, local blackout, or voltage instability, an Available Transfer Capability Security Constraint is computed for the change in flow possible into the load pocket, The Available Transfer Capability is obtained from the Total Transfer Capability for the Load Pocket by subtracting the firm and non-firm transfer into the load pocket and the Transmission Reliability Margin and the Capacity Benefit Margin for the load pocket. Capacity Benefit Margin is the amount of transmission transfer capability reserved by load serving entities to ensure access to generation from interconnected systems to meet generation reliability requirements (in case generation is lost in the load serving entity, it can obtain power from other generation in the utility or outside the utility). A Transmission Reliability Margin is the amount of transmission transfer capability necessary to ensure that the interconnected transmission network is secure under a reasonable range of uncertainties and system conditions.

These ATC constraints for each load pocket are easily incorporated in the Security Constrained Dispatch and Security Constrained Unit Commitment that computes Locational Marginal Prices for each hour of the day for the Day Ahead Market. The Available Transfer Capability could be computed and updated hourly and used in the Hour Ahead Market and used to compute an hourly updated Locational Marginal Price for congestion for each voltage collapse load pocket. The congestion prices can provide incentives for customers of the transmission system to commit additional generators in load pockets that are experiencing congestion, increasing generation on existing generators in the load pockets, installing additional lines into the load pocket, installing additional generation in the load pocket, or adding FACTS or Special Protection Control for relieving congestion of the load pocket. The Preventive Voltage Rescheduling, Preventive Active Rescheduling and preventive load shedding can increase ATC and thus eliminate the congestion and possibly the need for adding generation, transmission capacity, FACTS, or Special Protection Control for any load pocket. The Voltage Collapse Diagnostic and Preventive Control indicates the single and single outage components of double outages that could cause blackout for each control region, the control region set of agents where Preventive Control Load Shedding Control can prevent the blackouts for these outages, and the control region where an incremental increase in load can cause blackout in that control region, which can be used to compute the Incremental Transfer Capability (ITC) for the control region or load pocket. The Incremental Transfer Capability (ITC) for the control region is the minimum increase in transfer (load minus generation) into that control region after any single contingency from the set of component single contingencies that in combination cause blackout in that control region. The Control Region is chosen for computing the Incremental Transfer Capability because the Preventive Load Shedding Control performs load shedding in those agents of the control region to obtain load flow solutions for the double equipment outage combinations of the single outages used to compute the Incremental Transfer Capability. The Total Transfer Capability for the control region is the Incremental Transfer Capability for the control region plus the existing load minus the generation within the control region. The Non-Recallable Available Transfer Capability (NRATC) is then the Total Transfer Capability minus the Transmission Reliability Margin (TRM) minus the firm transmission reservation for that control region. The Recallable Transfer Capability is the Total Transfer Capability minus a percentage of the Transmission Reliability Margin, the firm transmission reserved for that Control Region, and the non-firm transmission reserved for point to point transfer into that control region.

The single outages that are components of double equipment outages that cause voltage collapse and that are corrected via control in a particular control region (problematic contingencies) are the outages required to compute ATC for that control region or load pocket. There are two methods to calculate the ATC value for a particular control region and both must use the results from Voltage Collapse Diagnostic and Preventive Control. One method is used when only double contingencies and no single outages can cause blackout in the control region and the second method is used when single outages cause blackout in the control region. The second method has precedence on control regions where there are one or more single outages that cause voltage instability voltage collapse, or local blackout. The first and most straightforward approach involves finding Preventive Load Shedding Controls for all equipment outages that were unable to reach a maximum percentage of the outage remaining in the network equal to zero. These, as explained previously, are the equipment outages that will cause voltage instability, local blackout, or voltage collapse in the electrical system. It is important to note that the preventive loadshedding control may require multiple loadbearing agents or loadpockets be added to the control region to reach a suitable remedial action for a problematic contingency and also that each problematic contingency may require a different amount of load shedding on either the same, a similar or a completely different set of agents. An example calculation for double contingencies is set forth below.

EXAMPLE 2

Referring now to the tables illustrated below, a hypothetical non-limiting example is illustrated that will use the agents as defined in Table 2 and diagrammed in FIG. 5 as well as a set of single contingencies that are defined by the letters A-F as discussed above. Each letter represents a single contingency or piece of electrical equipment that can be switched off and effectively removed from the electrical system. This example asserts that the (1) Voltage Collapse Diagnostic is performed as outlined in previous sections to obtain the agents from Table 2 and FIG. 5, (2) single contingency analysis is performed to find if any single outages cause voltage collapse and find those outages that are used to find the double outages that will be simulated, (3) double contingency analysis is performed for determining the set of double outages to be simulated by selecting X and N and (4) by simulation of the resulting set of double contingencies produced out of single outage combinations, and finding control regions for every double outage that has no solution. A full discussion of this procedure is outlined in the previous sections.

The double outages that have no solution when simulated by removing the equipment in one step and in several small steps are saved and used to compute ATC (available transfer capability) for each control region. From this analysis, it is determined that the following combinations of double contingencies do not reach solutions to the load flow equations when the maximum percentage of the outage remaining in the network is equal to zero and are thus problematic contingencies. The combinations are: {A,C}, {A,D}, {B,D}, {C,D} and {C,E}.

Next, loadshedding preventive controls are sought using the procedure outlined above referencing Table 6. After one or more attempts at loadshedding solutions, suitable values for loadshedding control are reached and the control region of load bearing agents for each double contingency is determined. The percentages of load shed at each agent in the control region for each contingency are enumerated in Table 10. This example assumes that generation is decreased at the swing bus or at generators outside the control region based on a governor load flow using the Preventive Load Shedding Control.

TABLE 10

Percentage Load shed on each agent to obtain a solution for double equipment outages with no loadflow solution.

|  | {A, C} | {A, D} | {B, D} | {C, D} | {C, E} |
|---|---|---|---|---|---|
| Agent 1 | 0 | 25 | 10 | 5 | 0 |
| Agent 2 | 0 | 25 | 10 | 5 | 0 |
| Agent 3 | 0 | 25 | 10 | 5 | 25 |
| Agent 4 | 0 | 0 | 0 | 0 | 0 |
| Agent 5 | 0 | 0 | 0 | 0 | 0 |
| Agent 6 | 20 | 25 | 10 | 0 | 0 |
| Agent 7 | 0 | 0 | 0 | 0 | 0 |
| Agent 8 | 20 | 25 | 10 | 5 | 0 |

The numbers in Table 10 represent the Percentage Load Shed on Each Agent that is required in order to reach a solution to the load flow equations for each hypothetical problematic double contingency.

Each column in Table 10 represents a set of load pockets in a control region where Preventive Load Shedding Control was successful in reducing stress on the electrical system with respect to that particular double contingency. As such, it stands to reason that, if only one component was outaged, the stresses produced by the other component may be reproducible by increasing load on the set of load pockets that were stressed due to the original outage combination. Load stress is applied in the control region agents for each double equipment outage shown in Table 10 after removal of one component of each problematic double contingency and then again after removal of the second component of that same problematic double contingency. The load stress is simulated with a governor loadflow. If there are generators that lie in the control region, the generation increase on those generators may be subtracted from the load added by scaling load in the control region since it reduces the stress on the boundary of the control region where reactive losses can cause voltage instability, voltage collapse, and local blackout. The exhaustion of reactive reserves on the agents in the control region also cause the blackout and the governor loadflow models the system response to the load increase and thus the fact that generators in the control region pick up part of the load is properly accounted for by using the magnitude of the load increase without subtracting the increase in generation in the control region. The example will ignore the affects of generator governor response. The procedure for one problematic double contingency is described below.

The control region set of load pockets for contingency {A,C} as defined by Table 10 is agents 6 and 8, and the components of the double contingency are A and C. The buses associated with agents 6 and 8, as defined by Table 2, are 8, 9 and 10. An artificial stress, as defined below, is applied to these buses by scaling the load at these buses in steps of increasing percentage while simultaneously outaging one component A of the (A,C) double contingency. The percentage increase in load that can be added to these buses while still reaching a solution to the load flow equations, translated into the actual MW change, is equal to the Incremental Transfer Capability value for contingency A and load pocket set 6 and 8. For the purposes of this example, this percentage is 30% which translates to an Incremental Transfer Capability for control region composed of agents 6 and 8 for outage A of 81 MW. Similarly, the set of load pockets is subjected to the same increasing pattern of stresses while simultaneously outaging component C to result in the Incremental Transfer Capability of component C and control region set of load pockets 6 and 8, which in this example is 25% and which translates to an Incremental Transfer Capability for control region composed of agents 6 and 8 for outage C of 67.5 MW. These two values are presented along with others in Table 11. Note that the same single contingency using the same control region required the same percentage load change but the same contingency using different control region load bearing agents required a different percentage load change to reach the Boundary Case Solution.

Repeating this procedure for each problematic double contingency will result in measures for each respective set of load pockets for each respective contingency component, the hypothetical results of which are outlined in Table 11 same for problematic double contingencies {A,D} and {B,D}, there are three independent percentages of increased load associated with three single contingencies, A, B and D. These three values can be used to calculate Incremental Transfer Capability for the set of load pockets described by 1, 2, 3, 6 and 8 by finding the minimum value, which in this case is 15% (that translates to a 405.times.15%=60.75 MW value of ITC for that control region). Column "A of {A,D}" shows that a 15% increase in load will result in load flow non-solution when taken in combination with outage A. If an increase in load greater that 15% occurs, and contingency A

TABLE 11

Largest Percentage Increase in Control Region agents load possible after a single component of the double outage is removed.

|         | A of {A, C} | C of {A, C} | A of {A, D} | D of {A, D} | B of {B, D} | D of {B, D} | C of {C, D} | D of {C, D} | C of {C, E} | E of {C, E} |
|---------|-------------|-------------|-------------|-------------|-------------|-------------|-------------|-------------|-------------|-------------|
| Agent 1 |             |             | 15          | 19          | 120         | 19          | 20          | 45          |             |             |
| Agent 2 |             |             | 15          | 19          | 120         | 19          | 20          | 45          |             |             |
| Agent 3 |             |             | 15          | 19          | 120         | 19          | 20          | 45          | 80          | 80          |
| Agent 4 |             |             |             |             |             |             |             |             |             |             |
| Agent 5 |             |             |             |             |             |             |             |             |             |             |
| Agent 6 | 30          | 25          | 15          | 19          | 120         | 19          |             |             |             |             |
| Agent 7 |             |             |             |             |             |             |             |             |             |             |
| Agent 8 | 30          | 25          | 15          | 19          | 120         | 19          | 20          | 45          |             |             |

Table 11 is the Largest percentage of increase in agent active power load in a control region in combination with a single outage that was able to obtain load flow solutions for each single outage that is a component of a double outage where load shedding provides a robust solution. The artificial stresses that are applied could be a Q-V style loading, a P-V style loading or an S-V style loading simulated via a governor loadflow that simulates the generation response in the system due to load reduction. The preferred embodiment uses P-V, or real load, increase to simulate the stress because an ATC is desired that can be expressed in active power change across a control region boundary that can be incorporated in a dc loadflow based Security Constrained Unit Commitment or a Security Constrained Dispatch. If one used Q-V or S-V curves to determine Incremental Transfer Capability, a very different ITC measure is produced for any Control Region. The stress is applied incrementally to all agents in the stressed control region until there is no solution to the loadflow equations for every single equipment outage that is a component of a double outage that has a solution through Load Shedding Control in that Control Region. One could also add load to the vulnerability regions of agents 6 and 8 (the specific buses within agents in the family associate with each agent in the Control Region for the contingency) and not just to the load pockets (agents) themselves to produce possibly a slightly more robust picture of ITC (Incremental Transfer Capability) for all of the outages that cause blackout on a control region set of load pockets. In this example the vulnerability regions of agents 6 and 8 include agents 5, 6, and 8, which does not change the number of load bearing agents in the control region.

Using Table 11, all prospective Incremental Transfer Capabilities are listed. The table shows each percentage of increased load is-required to reach the boundary case solution for each load pocket and single contingency. There are two applications for Table 11. The first is to find the minimum percentage change in load that can be added in a particular control region set of load pockets in combination with any single contingency that will result in no solution to the load flow equations. Since the control region loading pattern is the unexpectedly occurs due to equipment failure, maintenance, or other reason, the electrical system would be anticipated to experience voltage stability, local blackout or voltage collapse problems. The same procedure is applied to every unique control region set of load pockets to derive a similar incremental transfer capability for each control region set of load pockets.

Another measure of Incremental Transfer Capability is based on single load pockets rather than control regions composed of more than one load pocket. Despite the fact that a load flow non-solution is obtainable by exhausting reactive supply on a single agent or by adding load on a single agent in combination with a single contingency, the minimum addable load found in each row of Table 11 can be considered a measure of Incremental Transfer Capability for that individual load pocket when it is understood that such an ITC is evaluated for every load pocket in the system. The Table shows the load increase in a specific load pocket that could cause voltage instability that if accompanied by load increase in other load pockets would produce voltage instability in some control region. In the case of agent 8, this value can be observed to be 15% (that translates to 30 MW referring to Table 2) and is the minimum percentage across the agent 8 row in Table 11.

A similar measure of reliability can be determined for the case when the Voltage Collapse Diagnostic procedure has determined that there are single contingencies that are unable to reach a load flow solution when the maximum percentage of the outage remaining in the system is equal to zero. This indicates that the power system is vulnerable to voltage instability, voltage collapse, or local blackout in the event of a single contingency, which is considered an emergency situation. In such a critical situation, it is desirable to have a method of finding the geographic locations of the power system that are most vulnerable to collapse as a result of the single contingency. The single contingency ATC procedure outlined in Example 3 can determine the amount of loadshedding in a control region or in specific load pockets that will avert the emergency and restore normal operating conditions.

EXAMPLE 3

This hypothetical-non-limiting example will also use the agents as defined in Table 2 and diagrammed in FIG. 5 as well as a set of single contingencies that are defined by the letters A-F. As in Example 2, each letter represents a single piece of electrical equipment that can be switched off and effectively removed from the electrical system. These single contingencies are intended to be a set independent of those in Example 2. This example asserts that the Voltage Collapse Diagnostic is performed as outlined in previous sections to obtain the agents from Table 2 and FIG. 5, and single contingency analysis is performed. From this single contingency analysis, it is determined that the single contingencies represented by the set A, C and E do not reach solutions to the load flow equations when the maximum percentage of the outage remaining in the system is equal to zero and are thus problematic single contingencies. Preventive Loadshedding Control is then performed on these single outages similarly to those in Example 2. The loadshedding is simulated by governor load flow, which would cause reduction in generation on generators under governor control. This reduction in generation can be used to reduce the load shed for any contingency or its effects can be ignored as discussed for the case where there are no single contingencies that cause voltage instability, voltage collapse or local blackout. The results of suitable hypothetical loadshedding are shown in Table 12.

TABLE 12

Percentage of load shed in control region agents for each single outage contingency that has no loadflow solution.

|  | Contingency A | Contingency C | Contingency E |
| --- | --- | --- | --- |
| Agent 1 |  |  |  |
| Agent 2 |  |  |  |
| Agent 3 | 45 |  | 50 |
| Agent 4 |  |  |  |
| Agent 5 |  |  |  |
| Agent 6 |  | 16 | 50 |
| Agent 7 |  |  |  |
| Agent 8 |  | 16 |  |

Table 12—Percentage Load Shed on Each Agent that Is Required in order to reach a solution to the load flow equations for each hypothetical problematic single contingency.

From the results in Table 12, it can be observed that a 45% reduction of load in agent 3 will obtain a loadflow solution to contingency A. Similarly, 50% load reduction in agents 3 and 6 will also obtain a solution for contingency E (50 MW). This is the ITC value for one control region of 6 and 3. A 16% load reduction in agents 6 and 8 will obtain a solution for contingency C. The ITC for the control region of 6 and 8 is 16% of the total load in the control region loadpockets 6 and 8 and is 43.5 MW. The ITC for the control region of agent 3 is 45% (75)=30 MW. The ITC is thus computed by control region. The results show one of the issues is that the control regions for single outages may not be control regions for double contingencies. The ITC values are negative rather than positive for the case where there are no single outages that have no loadflow solution when the maximum percentage of the outage remaining in the network is zero but are positive for all control regions where there are no single contingencies that cause voltage instability, voltage collapse or local blackout, but only double contingencies that cause voltage instability, voltage collapse and local blackout.

The ITC can be computed for agents (load pockets) rather than control regions by taking the maximum percentage change in Table 12 for any load pocket that has no zero rows in the Table to determine the percentage change in load corresponding to any load pocket where load shedding is needed to obtain a solution for any single outage. When ITC is computed for every load pocket in a control region for every single outage and ITC is the maximum load shed in each load pocket for all single outages that have that load pocket in its control region, the ITC values for all load pockets should assure stability for all single outages that have no loadflow solution. To assure that the electrical system will be stable if either contingency C or contingency E occurs, a skilled operator would shed 50% of the load in agents 3 and 6 and expect that either contingency A or E could occur and the electrical system would not experience voltage instability, voltage collapse, or local blackout. Similarly, if 50% of the load is shed in agents 3 (12.5 MW) and 6 (37.5 MW) as well as 16% (32 MW) in agent 8, a skilled operator would expect that the electrical system would be unaffected by voltage instability in the event any single contingency A, C or E occurred. Since it was previously determined that these single contingencies were the only single contingency threats to voltage instability, the above mentioned shedding schedule is expected to posture the electrical system against voltage instability for any single contingency. The negative value of the active power values in MW (that correspond to percentage values in Table 12) for each loadpocket are defined as the Incremental Transfer Capability for that load pocket for the set of single contingencies.

The procedure for computing TTC and ATC from ITC for a control region is

TTC=ITC+net power flow into the control region
NATC=TTC−TRM−NRES
RATC=TTC−a TRM−NRES−RRES a<1 when the control region set of loadpockets is used to compute Recallable ATC and Non Recallable ATC. If there are no single outages then ITC is positive for all control regions and TTC is positive for all control regions. ATC values depend on the firm (NRES) and non-firm (RRES) reservations for transfer into the control region. If ITC is negative for control regions that prevent blackout for one or more of the single outages, it does not necessarily imply TTC is negative and ATC is negative but would if the flow over the control region boundary equals the firm (NRES) and non-firm (RRES) transfer for the control region. If ATC is computed on load pockets, the ITC values in MW, flow into the load pocket, TRM, RRES, and NRES are load pocket values and not control region values.

The ATC is determined by increasing load through a conformal scaling within the load pocket and computing ITC using a governor loadflow response of generation in the region of interest. This governor loadflow permits computing the power imported across the boundary of the load pocket boundary for each of the single equipment outages identified as being a component of a double outage that has no solution without the preventive control in that control region. The Incremental Transfer Capability is the minimum of the total net import across the boundary of the load pocket after each of these single outages if there is no single outage that can cause voltage collapse in that loadpocket. The Total Transfer Capability adds the Incremental Transfer Capability and the base case or current import across the boundary of the load pocket and is positive. The Available Transfer Capability is negative for control regions where single equipment outage can cause voltage collapse and the firm and non-firm transfer reservation equals the actual import into the loadpocket. The negative value of ATC measures the total transfer reduction into the control region or load pocket to allow the worst single equipment outage that causes voltage collapse in that control region or load pocket to obtain a loadflow solution. This value of the negative ITC for each single outage with no loadflow solutions is computed from the Preventive Load Shedding control for each single outage that causes voltage collapse in that control region.

Once the VCD determines all of the single and double outages that cause voltage collapse and the preventive load shedding control finds the control regions for all of the single and double outages that cause voltage instability, voltage collapse, or local blackout, the particular single and double outages where PC arrest blackout via load shedding in that load pocket are known and the single outages that are components of these double outages are known. The positive value Incremental Transfer Capability for any of the control regions can be determined by computing a P-V curve by increasing the load into the control region or load pocket until no governor load flow solution exists for the load flow equations after each single equipment that is a component of the double outages that cause voltage collapse on that load pocket. The minimum value of transfer of power into the control region for all of these P-V curves is the Incremental Transfer Capability for the control region. The Incremental Transfer Capability for a control region where load shedding is effective in obtaining loadflow solutions is the maximum load required shed in any control region for any of the single equipment outages. For control regions affected by single and double outages, the value of ITC for single outages is used. For control region affected by solely single or solely by double outages, the ITC value is obviously the ITC calculated for the outages affecting the control region. The Available Transfer Capability is then computed by adding the current power flow into the control region and subtracting the current net firm and non-firm transfer reservations into the control region plus a Capacity Benefit Margin for providing power to Load Serving Entities and a Transmission Reserve Margin for assuring that there is transmission capacity for variation in the network and generation response to the load change. The Available Transfer Capability is a measure of the import transfer reserves available in that control region before voltage collapse, local blackout, or voltage instability will occur. Control regions or loadpockets which export power could have an ATC value, but in general such regions have such an abundance of reactive reserves and they will not be as vulnerable to voltage collapse as control regions that import active and reactive power. It should be noted that there could be an import and export ATC value for any control region or load pocket.

Depending on the amount of Available Transfer Capability of the load pocket, the load pocket may be characterized in different ways. The first type of load pocket is an active load pocket, which is vulnerable to single outages. Such a load pocket is in a critical state and immediate response is needed. A second type of load pocket is referred to as a vulnerable load pocket. Such a load pocket is not vulnerable to single outages as it does have some capacity, which may be capacity that may be overbooked. A third type of load pocket is an emergent load pocket, which may require double or more outages before any constraints are obtained.

The second step is to compute TRM and CBM for each load pocket or control region. The identification of paths with significant reactive losses can be identified from the Preventive Control algorithm and is important because these reactive losses can greatly change the nose of the P-V curve and the value of ITC. Computing TRM may reflect the difference between the best and worst methods of importing active and reactive power into the control region or load pocket. Once this is obtained, a third step is to specify the net import and the possible variation of the imports of power into the control region, the various change in the load variation, and the various changes in the network impedances and admittances that may have affect on the P-V curve computed by the governor loadflow. These variations are needed to compute the Transmission Reliability Margin. The Capacity Benefit Margin is that capacity of the boundary of the loadpocket reserved for use by Load Serving Entities. This CBM measure may be discontinued as a separate component in ATC and incorporated in NRES for TRM if FERC Standard Market Design is approved. The CBM is generally computed using a generation reliability method that would be applied to the control region or loadpocket.

What is claimed is:

1. A voltage collapse diagnostic method for an electrical power system, comprising:
    A) defining a network of a plurality of interconnected busses and sources of reactive reserves;
    B) defining groups of busses within said network such that when a reactive load is applied to any bus within a first group of said groups of busses, a same at least one source generally completely exhausts its reactive reserves:
    C) establishing each group of busses defined in step B) as a respective voltage instability region, each of which is represented by a respective agent;
    D) performing simulation of a plurality of single contingencies using equations that define the network;
    E) selecting a count N of a number of agents to be considered;
    F) determining a variable threshold value for a reactive remaining exhaustion Factor;
    G) identifying each single contingency that results in the reactive remaining exhaustion factor for N number of agents being less than the threshold value, wherein the reactive remaining exhaustion factor is a value representing an amount of reactive power available in the respective agent in response to a contingency;
    H) performing a multiple contingency analysis by combining single contingencies identified in step G); and
    I) using results of the single contingencies and multiple contingency analysis to analyze a voltage response of at least a portion of the network.

2. The voltage collapse diagnostic method of claim 1, further comprising:
    applying load incrementally to the network.

3. The voltage collapse diagnostic method of claim 1, further comprising:
    J) for each at least one source exhausted in step B), associating that at least one source with every group within said groups of busses that cause exhaustion of the at least one source.

4. The voltage collapse diagnostic method according to claim 3, further comprising:
    establishing each at least one source associated in step J) as a reactive reserve zone, wherein the network includes a plurality of reactive reserve zones.

5. The voltage collapse diagnostic method according to claim 1 wherein the network is a mathematical model of an existing electrical power system and the load is a simulated electrical load.

6. The voltage collapse diagnostic method according to claim 4, further comprising:
    organizing the agents into a hierarchy based on the plurality of reactive reserve zones.

7. The voltage collapse diagnostic method according to claim 6 wherein agents at a higher level in the hierarchy include more sources of reactive reserves than agents at a lower level in the hierarchy.

8. The voltage collapse diagnostic method according to claim 6 wherein agents at a higher level in the hierarchy are at a higher voltage level than agents at a lower level in the hierarchy.

9. The voltage collapse diagnostic method according to claim 6, further comprising:
    defining a control region including at least one load pocket based on the hierarchy; and
    determining an available transfer capability for the control region for each single contingency that has no loadflow solution.

10. The voltage collapse diagnostic method according to claim 9 wherein the step of determining an available transfer capability comprises:
    identifying each single contingency that results in no loadflow solution;
    performing preventative load shedding in the control region until a loadflow solution exists for each single contingency;
    determining a maximum amount of load that is shed over all single contingencies that utilize the control region for load shedding; and
    defining of a minimum remaining amount of reactive reserves after each contingency and the load shedding for the control region as a possible incremental transfer capability for the control region.

11. The voltage collapse diagnostic of claim 10 where the maximum amount of load that is shed is another possible incremental transfer capability for the control region.

12. The voltage collapse diagnostic method according to claim 7, wherein agents at a higher level in the hierarchy are electrically proximate to a source of electrical power generation, and wherein agents at a lower level in the hierarchy are electrically distal to the source of electrical power generation.

13. The voltage collapse diagnostic method according to claim 7 wherein at least some of the agents at lower levels in the hierarchy have reactive reserve zones that are subsets of the sources of reactive reserves contained in reactive reserve zones for agents at higher levels in the hierarchy; and wherein family lines of agents are defined based on agents at the lower levels in the hierarchy having the subsets of the sources of reactive reserves contained in agents at the higher levels in the hierarchy.

14. A voltage collapse diagnostic method of claim 13 wherein exhaustion of reactive reserves at a lower hierarchical level begins an accelerated exhaustion of the reactive reserves at a higher level in each family; wherein applying a reactive load at a bus in the voltage instability region of a patriarchal agent sequentially exhausts reactive reserves of every agent in every family line in the family from a lowest hierarchical level to a highest hierarchical level, which is the patriarchal agent; wherein applying an active power load at all buses in a vulnerability region of the family of the patriarchal agent exhausts the reactive reserves of every agent in every family line in the family from the lowest hierarchical level to the highest hierarchical level; wherein applying a contingency incrementally sequentially exhausts reactive reserves from a lower hierarchical level to a higher hierarchical level in more than one family line in one or more families; wherein exhaustion of reactive reserves in an agent can cause instability in that agent; the method further comprising:
    reducing active and reactive load and reducing reactive losses in a vulnerability region of an agent lower than the patriarchical agent in the family line to reduce the occurrence of voltage instability, voltage collapse and local blackout using knowledge that cascading exhaustion of reactive reserves for agents can cause progressive cascading instability in family lines including those agents;
    wherein a family of agents is defined as all agents in all family lines emanating from the patriarchal agent to which the family belongs;
    wherein the vulnerability region of the family of the patriarchal agent is defined as those busses belonging to a collection of voltage instability regions of all agents in the family.

15. The voltage collapse diagnostic method according to claim 13, wherein performing a plurality of single contingencies includes applying to the network a single contingency that has a solution, the method further comprising:
    monitoring a change in power output of the sources of reactive reserves of at least one family line of agents.

16. The voltage collapse diagnostic method according to claim 15, further comprising:
    calculating the reactive remaining exhaustion factor for each agent for the single contingency; and
    ranking each of the agents according to its respective exhaustion factor calculated in the calculating step.

17. The voltage collapse diagnostic method according to claim 16 wherein the reactive remaining exhaustion factor for each agent is calculated based on either:

$$\text{exhaustion factor 1} = \left(\frac{Q\max - QgenOutage}{Q\max - QgenBase}\right) \cdot 100; \text{ or}$$

$$\text{exhaustion factor 2} = \left(\frac{Q\max - QgenOutage}{Q\max - QgenBase}\right) \cdot 100 \cdot \langle QgenOutage - QgenBase \rangle$$

wherein:
    Qmax is a maximum power that can be generated in the reactive reserve zone for each agent;
    QgenOutage is power generated by the reactive reserve zone for each agent in response to the single contingency; and
    QgenBase is a base power output generated by the reactive reserve zone for each agent.

18. The voltage collapse diagnostic method according to claim 15, wherein performing the multiple contingency analysis comprises:
    applying a combination of two single contingencies identified in step G) that each had a solution in step D), the method further including:
    monitoring a change in power output of the sources of reactive reserves of at least one family line of agents.

19. The voltage collapse diagnostic method according to claim 18, further comprising:
    determining the reactive remaining exhaustion factor for each agent in the at least one family line of agents for a multiple contingency that has a loadflow solution or where a maximum percentage of the multiple contingency remaining in service is zero; and
    ranking each agent according to the reactive remaining exhaustion factor.

20. The voltage collapse diagnostic method according to claim 19, wherein the reactive remaining exhaustion factor for each agent is calculated based on:

$$\text{exhaustion factor 1} = \left(\frac{Q\max - QgenOutage}{Q\max - QgenBase}\right) \cdot 100$$

$$\text{exhaustion factor 2} =$$
$$\left(\frac{Q\max - QgenOutage}{Q\max - QgenBase}\right) \cdot 100 \cdot \langle QgenOutage - QgenBase \rangle$$

wherein:
- Qmax is a maximum power that can be generated in the reactive reserve zone for each agent;
- QgenOutage is power generated by the reactive reserve zone for each agent in response to the multiple contingency; and
- QgenBase is a base power output generated by the reactive reserve zone for each agent.

21. The voltage collapse diagnostic method according to claim 17, further comprising:
- grouping the agents into control regions based on the ranking;
- determining an available transfer capability for a control region based on those single contingencies that lack a loadflow solution in step D) or that are components of a respective multiple contingency that lacks a loadflow solution in step H) such that preventative load shedding control in that control region is required.

22. The voltage collapse diagnostic method according to claim 21 wherein determining the available transfer capability for the control region comprises:
- identifying each combination of single contingencies that results in no loadflow solution in step H) and has the preventative load shedding control that sheds load in the control region;
- determining a remaining amount of reserves for the control region available after simulating a combination that has no loadflow solution in step H) but has a solution when the preventative load shedding control sheds load in the control region; and
- defining the remaining amount of reserves for the control region or a maximum amount of load shed in the control region over all single contingencies that lack the loadflow solution in step D) as the incremental transfer capability for the control region.

23. The voltage collapse diagnostic method according to claim 22 wherein determining the remaining amount of reserves for the control region comprises:
- applying only one contingency of each combination where the preventative load shedding control is required to obtain the loadflow solution;
- determining an additional load that can be applied to the control region after applying the only one contingency before no loadflow solution exists as the remaining amount of reserves; and
- taking the minimum of the additional load that can be applied over all single contingencies that are components of each combination as the incremental transfer capability for the control region.

24. The voltage collapse diagnostic method according to claim 23 where an incremental transfer capability for a load pocket belonging to several control regions is the minimum of the additional load that can be applied over all control regions that contain that load pocket.

25. The voltage collapse diagnostic method according to claim 22 where the incremental transfer capability for a load pocket belonging to several control regions is the maximum amount of load shed over all control regions that contain that load pocket.

26. The voltage collapse diagnostic method according to claim 1 wherein the plurality of busses in said network define a region of interest and a buffer zone.

27. The voltage collapse diagnostic method according to claim 26 wherein at least one of the busses in the region of interest is associated with a load.

28. The voltage collapse diagnostic method according to claim 26 wherein at least one bus in the region of interest or in the buffer zone is located within a sub-transmission level or a distribution level of the network.

29. The voltage collapse diagnostic method according to claim 28 wherein the at least one bus is at a voltage level of 34 KV or less.

30. The voltage collapse diagnostic method according to claim 29, further comprising:
- identifying the reactive remaining exhaustion factor of each of the agents by monitoring a change in power output of reactive reserves for each of the agents while separately performing each of the plurality of single contingencies in step D).

31. The voltage collapse diagnostic method according to claim 1, further comprising:
- ranking the plurality of single contingencies in order of most critical contingencies.

32. The voltage collapse diagnostic method according to claim 31 wherein ranking the plurality of single contingencies is calculated according to:

$$C_i = \sum_j \frac{P_j(-1 + \% \ reactivereservesremaining_{ij})}{1 - \% \ outageremaining_i};$$

wherein
- $C_i$ is a contingency measure of a contingency i;
- $P_j$ is a total power generation or load associated with each of the agents j affected by contingency i;
- % outageremaining $_i$ is a fractional percentage of contingency i that is remaining in service at the time of the calculation; and
- % reactivereservesremaining $_{ij}$ is the fractional percentage amount of reactive reserves remaining in each of the agents j affected by contingency i; and
  - wherein the contingency measure predicts the load that will experience blackout and the agents j are those agents in a blackout region, a predicted impact region, or all agents, wherein the contingency measure is multiplied by the probability of the outage or the cost of power or both to produce at least one of an economic measure, a risk measure or an economic risk measure.

33. The voltage collapse diagnostic method according to claim 32, further comprising:
- ranking each of the agents for at least one of contingencies that have no solution using a boundary case solution with a nonzero percentage outage remaining or contingencies that solve or contingencies that solve with a zero percentage outage remaining according to:

$$A_j = \sum_i \frac{P_j(-1 + \% \; reactivereservesremaining_{ij})}{1 - \% \; outageremaining_i};$$

wherein $A_j$ is an agent measure of the agent j; and $P_j$ is a total power generation or load associated with each of the agents j affected by contingency i.

34. The voltage collapse diagnostic method according to claim 30, further comprising:

ranking the agents in order of most critical agents based on the plurality of single contingencies.

35. The voltage collapse diagnostic method according to claim 1 wherein step B) comprises:

i) establishing the equations that define said network;

ii) incrementally applying said load to a first bus within said network;

iii) calculating a power output from each source within said sources of reactive reserves in response to the incrementally applied load;

iv) computing a load curve at said first bus for each incremental load; and v) identifying a first reactive power minimum at said first bus, or identifying a maximum load terminal point if a first reactive power minimum cannot be identified due to lack of a solution to the equations.

36. The voltage collapse diagnostic method according to claim 35 wherein step B) further comprises:

vi) determining those sources that fully exhaust reserves at the first reactive power minimum or at the maximum load terminal point if the first reactive power minimum cannot be identified due to the lack of a solution to the equations;

performing steps i) through vi) for busses within said network; wherein step C) further comprises:

clustering the groups of busses as the respective agent such that each agent contains those busses that exhaust the same sources in step vi).

37. The voltage collapse diagnosis method according to claim 1, further comprising:

establishing the equations that define said network; and applying said load in an incremental manner whenever the equations fail to solve.

38. The voltage collapse diagnostic method of claim 1 wherein step D) comprises:

simulating each of the plurality of single contingencies as a series of snapshots approximating a dynamic simulation or as a governor or automatic generation control (AGC) loadflow.

39. The voltage collapse diagnostic method of claim 1, wherein at least certain single contingencies in said plurality of single contingencies are applied incrementally.

40. The voltage collapse diagnostic method according to claim 1, further comprising:

iteratively selecting the number of agents N, a maximum percentage X % of reactive reserves of an agent unexhausted after a contingency, and a maximum number of double contingencies that will be simulated based on values for N and X to find a largest number of outages with no loadflow solution;

computing a matrix for discrete equally spaced values of a variable Y %, which is equal to 100-X % and is a minimum percentage of the reactive reserves of the agent exhausted by the contingency on one axis and a number of agents exhausted for the contingency on the other axis, wherein each cell of the matrix contains a number M of single contingencies that satisfy the criteria of having at least the number of agents exhausted for the contingency experience at least Y % of their reactive reserves exhausted, wherein an increase in the number M of single contingencies occurs as the variable Y % is reduced and the number of agents exhausted for the contingency is held fixed;

wherein a number of double contingencies that the number M of single contingencies would produce is M(M−1)/2 wherein an exponentially declining curve formed by cells of the matrix requires simulating approximately a same number of double contingencies; and wherein the exponentially declining curve defines options for values of maximum percentage X % and N number of agents.

41. The voltage collapse diagnostic according to claim 40, wherein if all double contingencies formed by the number M of single contingencies for any specific cell are simulated by at least one simulation method, a number of the double contingencies that have no solution for all simulation methods for the cell of the matrix is given as part of the information contained for the cell.

42. The voltage collapse diagnostic according to claim 40, further comprising:

iteratively updating the matrix to provide a number of double contingencies that do not solve for simulation of all double contingencies formed by the number M of single contingencies for cells located along the exponential declining curve that is specified given a maximum number of double contingencies to be simulated.

43. The voltage collapse diagnostic according to claim 40, further comprising:

selecting the values of N number of agents and the variable Y % on a particular exponential declining curve that will change a set of double contingencies to be performed in the multiple contingency analysis of step H) but will keep a total number of double contingencies simulated approximately the same and will not significantly change a percentage of double contingencies simulated that have no loadflow solution.

44. The voltage collapse diagnostic method of claim 1 wherein step H) comprises:

subjecting the network to at least one double contingency, which is defined as applying generally simultaneously, two single contingencies; and for all double contingencies applied in the subjecting step that have no solution, reapplying each double contingency incrementally.

45. The voltage collapse diagnostic method of claim 44, further comprising:

interpreting all double contingencies that have a solution when reapplied incrementally and a percentage of the equipment of the double contingencies remaining in service is zero as those outages that drive the network to, or close to, at least one of voltage instability, voltage collapse or local blackout.

46. The voltage collapse diagnostic method of claim 38, further comprising:

determining at least one of preventive, corrective, or emergency measures to support power flow on the network based on each single contingency and combinations of two single contingencies performed in the multiple contingency analysis of step H) at a boundary case solution, wherein a boundary case solution defines a percentage of a respective single contingency or combination of two single contingencies remaining in the network that is not equal to zero but is a threshold value such that a very slight increase in the percentage of the respective single contingency or combination of two single contingencies results in no solution for the equations.

47. The voltage collapse diagnostic method of claim 38, further comprising:

determining at least one of preventive, corrective or emergency measures to support power flow on the network based on each single contingency and each double contingency defined by combinations of those single contingencies that have a solution to the equations that define the network when a percentage of a contingency i remaining in the system is zero or at a boundary case solution when the percentage of the contingency i remaining is not equal to zero, in order to reduce severity and proximity to voltage collapse as measured by a contingency measure:

$$C_i = \sum_j \frac{P_j(-1 + \% \ reactivereservesremaining_{ij})}{1 - \% \ outageremaining_i};$$

wherein $C_i$ is the contingency measure of the contingency i;

$P_j$ is a total power generation or load associated with each of the agents j affected by contingency i;

% outageremaining$_i$ is a fractional percentage of contingency i that is remaining in service at the time of the calculation; and % reactivereservesremaining$_{ij}$ is the fractional percentage amount of reactive reserves remaining in each of the agents j affected by contingency i;

wherein the contingency measure is negative for outages that blackout a largest region when $P_j$=1 and impacts a largest load when $P_j$ equals the load in the agent j; and wherein the contingency measure is ranked based on absolute magnitude or on the most negative values.

48. The voltage collapse diagnostic method of claim 47, wherein agents j with a factor $$\frac{(-1 + \% \ reactivereservesremaining_{ij})}{1 - \% \ outageremaining_i}$$

of −1 or smaller for the contingency i that has no solution at the boundary case solution with a nonzero percentage of the contingency i remaining or that solves or that solves at the boundary case solution with a zero percentage of the contingency i remaining are associated with a predicted blackout region; and wherein agents j with a factor $$\frac{(-1 + \% \ reactivereservesremaining_{ij})}{1 - \% \ outageremaining_i}$$

of −0.5 or smaller for the contingency i that has no solution at the boundary case solution with a nonzero percentage of the contingency i remaining or that solves or that solves at the boundary case solution with a zero percentage of the contingency i remaining are associated with a predicted impact region;

wherein predicted blackout region is a conservative estimate of a region of the network that is anticipated to experience blackout; and wherein the contingency measure $C_i$ is an estimate of the total load that would experience blackout for the contingency i.

49. The voltage collapse diagnostic method of claim 13 wherein a base case blackout region is defined by agents in family lines of an entire family where their reactive reserves zones are completely exhausted in a base solution in the absence of any contingencies and cause a region to be vulnerable to at least one of voltage instability, voltage collapse or local blackout; wherein a family is defined as all agents in all family lines emanating from a same highest agent.

50. The voltage collapse diagnostic method of claim 46, further comprising:

ranking load bearing agents according to an exhaustion factor that is based on an amount of reactive reserves available to each of the load bearing agents after the respective one of the contingencies; wherein a predicted control region includes all load bearing agents where the exhaustion factor at the boundary case solution for the respective one of the contingencies is less than a predetermined threshold;

selecting at least some of the load bearing agents for load shedding control and placing them in a control set in an order based on the ranking; and shedding active and reactive load at all buses bearing load in the control set in the same increasing percentages until consecutive solutions are obtained, active generation response would cause generation decrease on generators via governor loadflow or automatic generation control (AGC) loadflow or would cause generation decrease from a swing bus;

wherein, if the consecutive solutions are obtained, control is chosen near a center of the consecutive solutions or when reactive reserves on generators or control devices in the control set exceed a given percentage of their reactive supply capability;

wherein, if the consecutive solutions are not obtained, then another load bearing agent is added to the control set based on the ranking and the load shedding is repeated in an attempt to obtain the consecutive solutions;

wherein, if the consecutive solutions are not obtained after repeating the load shedding and all agents from the predicted control region are added to the control set, there is no preventive, corrective or emergency load shedding control for the respective one of the contingencies.

51. The voltage collapse diagnostic method of claim 46, further comprising:

ranking load bearing agents according to an exhaustion factor that is based on an amount of reactive reserves available to each of the load bearing agents after the respective one of the contingencies; wherein a predicted control region includes all load bearing agents where the exhaustion factor at the boundary case solution for the respective one of the contingencies is less than a threshold;

selecting at least some of the load bearing agents for load shedding control based on the ranking and placing them in a control set;

shedding reactive load from buses bearing load in the control set in the same increasing percentages until consecutive solutions are obtained or until reactive reserves on generators or control devices in the control set exceed a given percentage of their reactive supply capability;

if the consecutive solutions are obtained, choosing control near a center of the consecutive solutions; and if the consecutive solutions are not obtained as the percentage of reactive load shed is increased above a predetermined percentage, adding another load bearing agent to the control set based on the ranking and repeating the load shedding in an attempt to obtain the consecutive solutions;

wherein, if the consecutive solutions are not obtained after repeating the load shedding and all agents from the predicted control region are added to the control set, there is no emergency reactive load shedding control for the respective one of the contingencies.

52. The voltage collapse diagnostic method of claim 46, further comprising:

ranking load bearing agents according to an exhaustion factor that is based on an amount of reactive reserves available to each of the load bearing agents after the respective one of the contingencies, wherein a predicted control region is all load bearing agents where the exhaustion factor at the boundary case solution for the respective one of the contingencies is less than a threshold;

selecting at least some of the load bearing agents for load shedding control based on the ranking and placing them in a control set;

shedding active load from buses bearing load in the control set in the same increasing percentages until consecutive solutions are obtained or until reactive reserves on generators or control devices exceed a given percentage of their reactive supply capability;

if the consecutive solutions are obtained, choosing control near a center of the consecutive solutions; and if the consecutive solutions are not obtained as the percentage of active load shed is increased above a predetermined percentage, adding another load bearing agent to the control set based on the ranking and repeating the load shedding in an attempt to obtain the consecutive solutions;

wherein, if the consecutive solutions are not obtained after repeating the load shedding and all agents from the predicted control region are added to the control set, there is no preventive or corrective distributed generation control for the respective one of the contingencies.

53. The voltage collapse diagnostic method according to claim 39, further comprising:

determining a presence of a boundary operating region for all single contingencies that have a solution when a percentage of equipment forming a contingency remaining in the system is zero and for all single contingencies that do not have a solution when the percentage of the equipment forming the contingency remaining in the system is non-zero.

54. The voltage collapse diagnostic method of claim 39, further including employing a divide and conquer technique, comprising:

grouping agents into families, wherein a family comprises a plurality of family lines of agents having a common patriarchal agent and wherein a family line includes a child agent supported by a subset of the sources of reactive reserves supporting a parent agent;

wherein the single contingencies are selected based on small effects that exhaust reactive reserves on agents in the same family or based on small effects that exhaust reactive reserves on agents in one or more of the same families.

55. The voltage collapse diagnostic method of claim 54, further comprising:

determining a class of double contingencies that have no loadflow solution when the double contingency is applied in a single step using different loadflow solutions, but that have a loadflow solution when the double contingency is applied incrementally and all equipment associated with the double contingency is removed; wherein the class of double contingencies place the network in, or close to, a state of at least one of voltage instability, voltage collapse or blackout.

56. A voltage collapse diagnostic and preventive or corrective voltage rescheduling control system, comprising:

A) defining a network of interconnected busses and sources of reactive reserves;

B) defining groups of busses within said network such that when a load is placed on any bus within a first group of said groups of busses, a same at least one source generally completely exhausts its reactive reserves;

C) establishing each group of busses defined in step B) as a respective agent, each agent having a respective set of reactive sources formed by the same at least one source exhausted in step B);

D) performing a plurality of single and double contingencies using equations that define the network;

E) simulating a contingency of the plurality of single and double contingencies by a process that (i) uses different loadflow simulation processes in an effort to obtain a loadflow solution; and (ii) lacking the loadflow solution in step (i), incrementally removes equipment associated with the contingency and performs a loadflow analysis after each incremental removal until the loadflow analysis shows that no loadflow solution exists, which is a boundary case solution;

F) ranking the agents according to an exhaustion factor for the contingency at the loadflow solution or at a solution based on the boundary case solution, wherein the exhaustion factor is a value representing an amount of reactive power required from the set of reactive sources of the respective agent in response to the contingency;

G) grouping the agents into one or more predicted control regions wherein the exhaustion factor at the loadflow solution or the solution based on the boundary case solution for the contingency is less than a predetermined threshold; and H) predicting a response of the predicted control region to at least one of preventative voltage rescheduling control, preventative active power rescheduling control or preventative load shedding control for the contingency using the ranking of the agents within the predicted control region.

57. The voltage collapse diagnostic and preventive or corrective voltage rescheduling control system of claim 56, wherein step G) further comprises:

placing the agents and the sources of reactive reserves in the predicted control region based on the ranking established in step F).

58. The voltage collapse diagnostic and preventive or corrective voltage rescheduling control system of claim 56, further comprising:

adding the set of reactive sources associated with each agent of the predicted control region to a control set of sources in an order based on one of active or reactive capacity, loading factor, or reactive reserve losses incurred due to a small change of voltage set point or active generation set point.

59. The voltage collapse diagnostic and preventive or corrective voltage rescheduling control system of claim 58, wherein predicting the response of the predicted control region comprises:

i) increasing the voltage set point on a source within the control set in small percentage increasing steps while concurrently seeking consecutive loadflow solutions to the equations that define the network during the contingency;

ii) if the consecutive loadflow solutions are found in step i), selecting control to be at a point where a reactive reserve level on the sources in the control set exceed a certain percentage of their reactive capability or at an approximate center of the consecutive solutions, which is termed a robust solution;

iii) if the consecutive loadflow solutions are not found in step i), increasing the voltage set point on the source until a total reactive reserve in the control set no longer increases or until source reaches its control limits;

iv) while performing step i), holding at its control limit any one of the sources in the control set that has reached its control limit;

v) continuing steps i) through iv) for each source of the control set until the consecutive loadflow solutions are found or until all the sources in the control set have been used in steps i) through iv); and vi) in response to step v), if the consecutive loadflow solutions are not found and all the sources in the control set have been used, performing additional control.

60. The voltage collapse diagnostic and preventive or corrective voltage rescheduling control system of claim 59, further comprising:

if the consecutive loadflow solutions are not found using all sources of all agents in the predicted control region, placing an additional agent into the predicted control region and repeating steps i) through vi) using the using the sources of the additional agent in the control set.

61. The voltage collapse diagnostic and preventive or corrective voltage rescheduling control system of claim 59 wherein the sources of reactive reserves include generators and further comprising:

implementing preventative control by modifying the voltage set point on at least one of the sources of the control set or by adding a shunt capacitor close to a generator of the control set that experiences an increase in its reactive reserves for the robust solution if at least one of a voltage decreases sufficiently in the control region, if the contingency is a single contingency and it occurs or the system is known to be vulnerable to voltage collapse for the single contingency, or if the contingency is a double contingency and a first contingency component of the double contingency occurs.

62. The voltage collapse diagnostic and preventive or corrective voltage rescheduling control system of claim 58 wherein the sources in the control set comprise generators and wherein predicting the response of the predicted control region includes:

increasing a voltage set point on all of the generators in the control set simultaneously in small percentage steps while concurrently seeking consecutive loadflow solutions to the equations that define the network during the contingency until any given generator reaches it voltage rating limit, thereafter, holding any given generator that has reached its voltage rating limit at its voltage rating limit while simultaneously increasing the voltage set point on any remaining generators in the control set and concurrently seeking the consecutive loadflow solutions to the equations that define the network during the contingency; and if the consecutive loadflow solutions are found, ending the step of increasing the voltage set point and selecting control to be at a point where a reactive reserve level on the generators in the control set exceed a certain percentage of their reactive capability or at an approximate center of the consecutive loadflow solutions.

63. The voltage collapse diagnostic and preventive or corrective voltage rescheduling control system of claim 56 wherein the sources of reactive reserves for the predicted control region comprise a plurality of generators belonging to the set of reactive sources for each agent of the predicted control region and wherein predicting the response of the predictive control region comprises:

progressively decreasing a voltage set point on generators of the predicted control region that have high loading factors and progressively increasing the voltage set point on generators of the predicted control region with small loading factors wherein the voltage set point of a respective generator is increased no higher than a voltage rating of the respective generator and wherein progressively decreasing the voltage set point on respective generator is stopped when a total reactive generation of the plurality of generators or on those of the plurality of generators with the largest reactive generation levels or loading factors no longer reduced;

concurrently seeking consecutive loadflow solutions to the equations that define the network during the contingency while progressively decreasing and progressively increasing the voltage set points; and wherein there is no preventive and corrective voltage rescheduling control using a combination of voltage increase and voltage decrease if no consecutive loadflow solutions are found after all generators of all agents in the predicted control region have been processed through either progressively increasing or progressively decreasing its voltage set point.

64. The voltage collapse diagnostic and preventive or corrective voltage rescheduling control system of claim 56 wherein the sources of reactive reserves for the predicted control region comprise a plurality of generators belonging to the set of reactive sources for each agent of the predicted control region and wherein predicting the response of the predictive control region comprises:

i) progressively decreasing an active power generation on generators of the predicted control region that have high loading factors and progressively increasing the active power generation on generators of the predicted control region with small loading factors while voltage and active power generation limits on each generator is maintained and while a total of reactive reserves on the plurality of generators in the control set is increased:

ii) concurrently seeking consecutive loadflow solutions to the equations that define the network during the contingency while progressively decreasing and progressively increasing the active power generation;

iii) adding additional generators of an additional agent to the predicted control region based on the exhaustion factor of the additional agent if no consecutive of loadflow solutions are found or the total of reactive reserves does not increase and repeating steps i) and ii); and iv) performing steps i) through iii) until at least one of (a) consecutive loadflow solutions are found or (b) no consecutive loadflow solutions are found and reactive reserve levels on generators in the predicted control region exceed a percentage of their reactive supply capability or iii) no consecutive loadflow solutions are found and all the agents have been added to the predicted control region; and wherein if in step iv), no consecutive loadflow solutions are found and reactive reserve levels on generators in the predicted control region exceed the percentage of their reactive supply capability or no consecutive loadflow solutions are found and all the agents have been added to the predicted control region, there is no preventive and corrective voltage and active rescheduling control for the contingency.

65. The voltage collapse diagnostic and preventive or corrective voltage rescheduling control system of claim 64 further comprising:

applying preventive load shedding if there is no preventive voltage and active rescheduling control for the contingency.

66. The voltage collapse diagnostic and preventive or corrective voltage rescheduling control system of claim 56 wherein the sources of reactive reserves for the predicted control region comprises a plurality of generators belonging to the set of reactive sources for each agent of the predicted control region and wherein predicting the response of the predictive control region comprises:

decreasing voltage and power generation on a first set of generators of the plurality of generators and increasing voltage and power generation on a second set of generators of the plurality of generators while concurrently seeking consecutive loadflow solutions to the equations that define the network during the contingency, wherein if consecutive loadflow solutions are not obtained, then other measures are taken.

67. The voltage collapse diagnostic and preventive or corrective voltage rescheduling control system according to claim 56, further comprising:

determining at least one of preventive, corrective or emergency measures to support power flow on the network by performing steps E) through H) for a plurality of contingencies lacking a loadflow solution.

68. The voltage collapse diagnostic and preventive or corrective voltage rescheduling control system according to claim 67, further comprising:

executing the at least one of preventive, corrective or emergency measures.

69. The voltage collapse diagnostic and preventive or corrective voltage rescheduling control system according to claim 68 wherein the preventive measures include at least one of shedding load, adding new generation within unit commitment, constructing new generation, rescheduling active power on at least certain of the sources of reactive reserves or rescheduling voltage set points on at least certain of the sources of reactive reserves.

70. The voltage collapse diagnostic and preventive and corrective control of active rescheduling comprising the steps of:

A) ranking agents according to an exhaustion factor for a boundary case solution for that outage;

B) defining a predicted control region which includes all agents that experience an exhaustion factor less than a predetermined threshold;

C) selecting associated generators defined in step B) belonging to the predicted control region and placing said generators in the control set for active rescheduling control based on a generator or control device ranking of an exhaustion factor;

D) adding the generators associated with any agent selected to be added to the control region to the generators or control devices in the control set simultaneously;

wherein the generators with the largest exhaustion factor in the control set will generate less power by a participation factor proportional to the variable such as reactive and active loading factor or reactive losses incurred for a slight increase in active generation or voltage setpoint and the generators with the smallest variables will increase power using a participation factor that is inversely proportional to this variable such that the sum of the amount of power increased and decreased on generators in the control set is always zero or equal to the change in active losses incurred by the control change, wherein transfer of power is produced within the control set of generators that is progressively increased;

wherein the active power setpoint on any generator is changed as part of the transfer level increase until reactive reserves on the generators in the control set no longer increase or until they reach the maximum or minimum active power capability limit on the generator and then they are held at that maximum or minimum active power capability limit;

wherein the transfer of power within the set generators in the control set using the participation factors is progressively increased until reactive generation levels on generators in the control set or control region exceed a certain percentage of their reactive supply capability by increase in transfer or until a consecutive set of solutions is obtained, wherein no solution is found then another generator or control device is added to the control set based on the ranking of generators and control devices in the predicted control region are added to the control set, wherein process of increasing transfer within the control set of generators in an attempt to find consecutive loadflow solutions and increasing reactive reserves on generators or control devices in the control set or control region by increasing transfer levels on generators in the control set and if unsuccessful then adding an additional generator or control device to the control set is continued until there are no more generators or control devices in the predicted control region, wherein consecutive solutions are found, the control is selected to be nearer the centered of the consecutive set of solutions or where the reactive reserves on the generators and control devices exceed a certain percentage of their reactive supply capability, wherein no control is found after all agents in the predicted control region are placed in the control region, there is no preventive and corrective active rescheduling control for this contingency, wherein the Preventive Control could be implemented by modifying the active power generation setpoints if the first of a double contingency occurs with no solution, or if the system is known to be vulnerable to voltage collapse for this single contingency before it actually occurs on the system.

71. A method of posturing control for a system including a base case blackout region, comprising:

defining a control region of agents and a control set of reactive sources by:

A) defining a network of interconnected busses and sources of reactive reserves;

B) defining groups of busses within said network such that when a load is placed on any bus within a first group of said groups of busses, a same at least one source generally completely exhausts its reactive reserves;

C) establishing each group of busses defined in step B) as a respective agent, each agent having a respective set of reactive sources formed by the same at least one source exhausted in step B);

D) simulating a plurality of single and double contingencies using equations that define the network by a process that (i) uses different loadflow simulation processes in an effort to obtain a loadflow solution; and (ii) lacking the loadflow solution in step (i), attempts to obtain a solution by incrementally removing equipment associated with the contingency until the loadflow analysis shows that no loadflow solution exists, which is a boundary case solution;

E) determining a blackout region for each contingency of the plurality of single and double contingencies where agents have reactive resources that are completely exhausted by the contingency; and wherein the control region of agents is formed by combining agents in the blackout region for each contingency with agents in the base case blackout region where the base case blackout region comprises those agents having no reactive reserves in a base case loadflow solution; and wherein the control set of reactive sources are those sets of reactive sources of each agent in the control region of agents;

performing at least one of the following steps for the control region of agents:
adding generators to the control set in order to add reactive reserves to the control region;
adding switchable shunt capacitors to the control set in the control region to a location where there is an existing generator;
performing preventative voltage and reactive rescheduling by increasing a respective voltage set point of certain reactive sources of the control set and by decreasing a respective voltage set point of other reactive sources of the control set to add reactive reserves to the control region;
performing preventative active rescheduling by increasing a respective active power generation level of certain reactive sources of the control set and by decreasing a respective active power generation level of other reactive sources of the control set to add reactive reserves to the control region; or
if the network experiences a contingency that makes blackout imminent, performing preventative or emergency load shedding to add reactive reserves to the control region.

72. A method of posturing control for a set of equipment outages that have no solution, comprising:
defining a network of interconnected busses and sources of reactive reserves;
defining groups of busses within said network such that when a load is placed on any bus within a first group of said groups of busses, a same at least one source generally completely exhausts its reactive reserves, each of the groups of busses established as a respective agent;
performing a plurality of single and double contingencies using equations that define the network;
defining the set of equipment outages as those contingencies of the plurality of single and double contingencies for which no loadflow solution results when performing the contingency;
finding at least one of a preventative voltage rescheduling control or preventative active rescheduling control for each contingency for which no loadflow solution results that obtains a robust solution by:
for each contingency for which no loadflow solution results, performing at least one of i) increasing voltage set points of certain sources of at least one agent and decreasing or holding constant voltage set points of other sources of the at least one agent or ii) increasing active power generation of certain sources of at least one agent and decreasing active power generation of other sources of the at least one agent until a loadflow solution results for the contingency wherein the increasing and the decreasing occurs in an order based on the effect of the contingency on the at least one agent; and
defining a control region for the contingency as the at least one agent whose sources are increased or decreased;
finding those of the contingencies with identical control regions so as to form a single control region; and
utilizing a coordinated voltage control for finding a posturing control for all contingencies for the single control region by utilizing different control sets of sources and different levels of voltage control to obtain solutions for all contingencies for the single control region.

73. The method of claim 72, further comprising:
utilizing a coordinated active power control for finding a posturing control for all contingencies for the single control region by utilizing different control sets of sources and different levels of active power control to obtain solutions for all contingencies for the single control region.

74. The method of claim 72 wherein each agent is defined to include a set of reactive sources including the same at least one source, the method further comprising:
arranging the agents in a hierarchical structure based on the respective set of reactive sources for each agent such that an agent lower in the hierarchical structure includes a subset of the reactive sources of the set of reactive sources for an agent higher in the hierarchical structure, such a relationship defining a family line wherein a family includes at least two family lines of agents with a same patriarchal parent; and
adding an agent in families and family lines belonging to the an agent in the single control region that is not currently in the single control region but exhausts a significant percentage of its reactive reserves and retrying coordinated voltage control if an effective postured control could not be obtained without the additional agent.

75. The method of claim 72, further comprising:
locating groups of control regions that have postured control once postured control has been found for each single control region.

76. The method of claim 72, further comprising:
selecting a prototype postured control for a largest control region in a group of control regions.

77. The method of claim 72, further comprising:
utilizing a coordinated voltage and active power control that attempts to find a posturing control for all contingencies for all control regions in a group of control regions by utilizing different control sets of sources and different levels of voltage and active power control change to obtain solutions for all contingencies for all control regions.

78. The method of claim 72, further comprising:
implementing and coordinating postured controls for different groups of single control regions.

79. The method of claim 73 wherein, if no posturing control is found for all contingencies for the single control region, applying preventive control individually to those contingencies for which the posturing control is not effective in obtaining robust solutions.

80. A method for determining criticality of a plurality of contingencies, comprising:
applying a voltage collapse diagnostic to an electrical power system, wherein a plurality of contingencies are applied to the electrical power system and responses from a plurality of agents are monitored; and
ranking the plurality of contingencies according to criticality by:

$$C_i = \Sigma j \frac{P_j(-1 + \% \ reactivereservesremaining_{ij})}{1 - \% \ outageremaining_i};$$

wherein
$C_i$ is a contingency measure of a contingency i;
$P_j$ is a total power generation or load associated with each of the agents j affected by contingency i;
% outageremaining, is a fractional percentage of contingency i that is remaining in service at the time of the calculation; and
% reactivereservesremaining $_{ij}$ is the fractional percentage amount of reactive reserves remaining in each of the agents j affected by removal of the contingency i;
wherein each contingency is ranked using the contingency measure for contingencies that have a solution, for contingencies where a percentage of the outage remaining is zero, or for contingencies where the percentage of the outage is not zero and is at the boundary case solution or some combination or all such contingencies.

81. A method for determining criticality of a plurality of contingencies, comprising:
applying a voltage collapse diagnostic to an electrical power system, wherein a plurality of contingencies are applied to the electrical power system and responses from a plurality of agents are monitored; and
ranking the plurality of contingencies according to criticality by:

$$A_j = \sum_i \frac{P_j(-1 + \% \ reactivereservesremaining_{ij})}{1 - \% \ outageremaining_i};$$

wherein
$A_j$ is a measure ranking of an agent j;
$P_j$ is a total power generation or load associated with each of the agents j affected by contingency i;
% outageremaining, is a fractional percentage of contingency i that is remaining in service at the time of the calculation; and
% reactivereservesremaining $_{ij1}$ is the fractional percentage amount of reactive reserves remaining in each of the agents j affected by removal of the contingency i;
wherein the outages used can be all outages that have no solution and are evaluated at the boundary case solution, all outages that have a solution when the percentage of the outage is zero, or all outages that have loadflow solution or some combination or all such contingencies.

82. A method for determining an available transfer capability, comprising:
determining an amount of power that is available for transfer into or out of a load pocket where the set of importing and the set of exporting generators and their participation factors are design parameters; wherein the determining step is a function of firm and non-firm transfer into the load pocket and a Transmission Reliability Margin (TRM) and a Capacity Benefit Margin (CBM) for the load pocket wherein:
TTC = ITC + net power flow into the load pocket;
NATC = TTC − TRM − NRES;
RATC = TTC − a TRM − NRES − RRES; and
a<1; wherein
TTC is a Total Transfer Capability for the load pocket;
ITC is an Incremental Transfer Capability for the load pocket;
NRES is the non-recallable or firm transmission reservation for the load Pocket;
RRES is the recallable or non firm reservation for the load pocket;
NATC is the Non Recallable Available Transfer Capability; and
RATC is the Recallable Available Transfer Capability.

* * * * *